United States Patent
Nemet et al.

(10) Patent No.: US 9,135,544 B2
(45) Date of Patent: *Sep. 15, 2015

(54) SYSTEM AND METHOD FOR QUALITY MANAGEMENT UTILIZING BARCODE INDICATORS

(71) Applicant: VARCODE LTD, Rosh Ha'ayin (IL)

(72) Inventors: Yaron Nemet, Kedumim (IL); Ephraim Brand, Givatayim (IL)

(73) Assignee: Varcode Ltd., Rosh Ha'ayin (IL)

( * ) Notice: Subject to any disclaimer, the term of this patent is extended or adjusted under 35 U.S.C. 154(b) by 129 days.

This patent is subject to a terminal disclaimer.

(21) Appl. No.: 13/958,893

(22) Filed: Aug. 5, 2013

(65) Prior Publication Data

US 2013/0334301 A1    Dec. 19, 2013

Related U.S. Application Data

(63) Continuation of application No. 12/743,209, filed as application No. PCT/IL2008/001495 on Nov. 13, 2008, now Pat. No. 8,500,014.

(60) Provisional application No. 61/131,644, filed on Jun. 10, 2008.

(30) Foreign Application Priority Data

Nov. 14, 2007 (IL) .......................................... 001411

(51) Int. Cl.
*G06K 7/10* (2006.01)
*G06K 19/06* (2006.01)
(Continued)

(52) U.S. Cl.
CPC .............. *G06K 19/0614* (2013.01); *G01D 7/00* (2013.01); *G06K 19/0615* (2013.01); *G06K 19/06028* (2013.01); *G06Q 30/06* (2013.01)

(58) Field of Classification Search
USPC .......... 235/383, 385, 462.01, 462.07, 462.11, 235/462.13
See application file for complete search history.

(56) References Cited

U.S. PATENT DOCUMENTS

| 4,057,029 A | 11/1977 | Seiter |
| 4,059,407 A | 11/1977 | Hochstrasser |

(Continued)

FOREIGN PATENT DOCUMENTS

| CN | 1720180 | 1/2006 |
| CN | 1914621 | 2/2007 |

(Continued)

OTHER PUBLICATIONS

An Office Action dated Nov. 4, 2013, which issued during the prosecution of U.S. Appl. No. 13/323,906.

(Continued)

*Primary Examiner* — Daniel Hess
(74) *Attorney, Agent, or Firm* — Fish & Richardson P.C.

(57) ABSTRACT

A quality management system for products including a multiplicity of bar coded quality indicators each operative to provide a machine-readable indication of exceedance of at least one threshold by at least one product quality affecting parameter, a barcode indicator reader operative to read the barcoded quality indicators and to provide output indications, the barcoded quality indicators being readable by the barcode indicator reader at all times after first becoming readable, including times prior to, during and immediately following exceedance of the at least one threshold by the at least one product quality affecting parameter, and a product type responsive indication interpreter operative to receive the output indications and to provide human sensible, product quality status outputs.

8 Claims, 53 Drawing Sheets

(51) Int. Cl.
  *G06Q 30/06* (2012.01)
  *G01D 7/00* (2006.01)

(56) References Cited

U.S. PATENT DOCUMENTS

| | | |
|---|---|---|
| RE31,586 E | 5/1984 | Magnussen |
| 4,674,065 A | 6/1987 | Lange et al. |
| 5,053,339 A | 10/1991 | Patel |
| 5,084,143 A | 1/1992 | Smith |
| 5,085,802 A | 2/1992 | Jalinski |
| 5,146,405 A | 9/1992 | Church et al. |
| 5,254,473 A | 10/1993 | Patel |
| 5,369,577 A | 11/1994 | Kadashevich et al. |
| 5,485,372 A | 1/1996 | Golding et al. |
| 5,591,952 A | 1/1997 | Krichever |
| 5,600,119 A | 2/1997 | Dvorkis |
| 5,617,488 A | 4/1997 | Hong et al. |
| 5,634,195 A | 5/1997 | Sawyer |
| 5,659,771 A | 8/1997 | Golding |
| 5,752,227 A | 5/1998 | Lyberg |
| 5,805,245 A | 9/1998 | Davis |
| 5,822,728 A | 10/1998 | Applebaum et al. |
| 5,828,991 A | 10/1998 | Skiena et al. |
| 5,882,116 A | 3/1999 | Backus |
| 5,895,075 A | 4/1999 | Edwards |
| 5,899,973 A | 5/1999 | Bandara et al. |
| 5,902,982 A | 5/1999 | Lappe |
| 5,907,839 A | 5/1999 | Roth |
| 5,956,739 A | 9/1999 | Golding et al. |
| 6,006,221 A | 12/1999 | Liddy et al. |
| 6,009,400 A | 12/1999 | Blackman |
| 6,036,092 A | 3/2000 | Lappe |
| 6,085,206 A | 7/2000 | Domini et al. |
| 6,098,034 A | 8/2000 | Razin et al. |
| 6,154,722 A | 11/2000 | Bellegarda |
| 6,173,261 B1 | 1/2001 | Arai et al. |
| 6,190,610 B1 | 2/2001 | Goldsmith et al. |
| 6,214,623 B1 | 4/2001 | Simons et al. |
| 6,272,242 B1 | 8/2001 | Saitoh et al. |
| 6,314,400 B1 | 11/2001 | Klakow |
| 6,335,922 B1 | 1/2002 | Tiedemann et al. |
| 6,366,759 B1 | 4/2002 | Burstein et al. |
| 6,424,983 B1 | 7/2002 | Schabes et al. |
| 6,456,972 B1 | 9/2002 | Gladstein et al. |
| 6,479,016 B1 | 11/2002 | Goldsmith et al. |
| 6,495,368 B1 | 12/2002 | Wallach |
| 6,544,925 B1 | 4/2003 | Prusik et al. |
| 6,685,094 B2 | 2/2004 | Cameron |
| 6,751,584 B2 | 6/2004 | Bangalore |
| 6,758,397 B2 | 7/2004 | Catan |
| 6,920,420 B2 | 7/2005 | Lin |
| 6,982,640 B2 | 1/2006 | Lindsay |
| 7,017,806 B2 | 3/2006 | Peterson |
| 7,020,338 B1 | 3/2006 | Cumbee |
| 7,030,863 B2 | 4/2006 | Longe et al. |
| 7,053,777 B2 | 5/2006 | Allen |
| 7,054,293 B2 | 5/2006 | Tiedemann et al. |
| 7,057,495 B2 | 6/2006 | Debord |
| RE39,226 E | 8/2006 | Lappe |
| 7,092,567 B2 | 8/2006 | Ma et al. |
| RE39,266 E | 9/2006 | Lohray et al. |
| 7,117,144 B2 | 10/2006 | Goodman et al. |
| 7,156,597 B2 | 1/2007 | Goldsmith et al. |
| 7,157,048 B2 | 1/2007 | Goldsmith et al. |
| 7,165,019 B1 | 1/2007 | Lee et al. |
| 7,166,345 B2 | 1/2007 | Myers |
| 7,184,950 B2 | 2/2007 | Weise |
| 7,224,346 B2 | 5/2007 | Sheng |
| 7,262,792 B2 | 8/2007 | Shniberg |
| 7,277,088 B2 | 10/2007 | Robinson et al. |
| 7,295,965 B2 | 11/2007 | Haigh et al. |
| 7,295,968 B2 | 11/2007 | Bietrix et al. |
| 7,296,019 B1 | 11/2007 | Chandrasekar et al. |
| 7,340,388 B2 | 3/2008 | Soricut |
| 7,386,442 B2 | 6/2008 | Dehlinger et al. |
| 7,457,808 B2 | 11/2008 | Gaussier |
| 7,475,015 B2 | 1/2009 | Epstein et al. |
| 7,558,725 B2 | 7/2009 | Greenwald et al. |
| 7,562,811 B2 | 7/2009 | Nemet et al. |
| 7,584,093 B2 | 9/2009 | Potter et al. |
| 7,587,217 B1 | 9/2009 | Laakso et al. |
| 7,590,626 B2 | 9/2009 | Li et al. |
| 7,702,680 B2 | 4/2010 | Yih et al. |
| 7,747,427 B2 | 6/2010 | Lee et al. |
| 7,813,916 B2 | 10/2010 | Bean |
| 7,917,355 B2 | 3/2011 | Wu et al. |
| 8,005,664 B2 | 8/2011 | Hanumanthappa |
| 8,091,776 B2 | 1/2012 | Nemet |
| 8,196,821 B2 | 6/2012 | Nemet |
| 8,271,266 B2 | 9/2012 | Gallagher et al. |
| 8,321,786 B2 | 11/2012 | Lunati |
| 8,341,520 B2 | 12/2012 | Iakobashvili et al. |
| 8,365,070 B2 | 1/2013 | Song et al. |
| 8,473,278 B2 | 6/2013 | Futagi et al. |
| 8,500,014 B2 | 8/2013 | Nemet et al. |
| 8,528,808 B2 | 9/2013 | Nemet |
| 8,540,156 B2 | 9/2013 | Nemet |
| 8,579,193 B2 | 11/2013 | Nemet |
| 8,626,786 B2 | 1/2014 | Halcrow et al. |
| 8,807,422 B2 | 8/2014 | Nemet |
| 2002/0012332 A1 | 1/2002 | Tiedemann et al. |
| 2002/0032564 A1 | 3/2002 | Ehsani et al. |
| 2002/0056756 A1 | 5/2002 | Cameron et al. |
| 2002/0128821 A1 | 9/2002 | Ehsani |
| 2002/0169595 A1 | 11/2002 | Agichtein et al. |
| 2003/0187632 A1 | 10/2003 | Menich |
| 2003/0204569 A1 | 10/2003 | Andrews et al. |
| 2003/0210249 A1 | 11/2003 | Simske |
| 2003/0227392 A1 | 12/2003 | Ebert et al. |
| 2003/0233222 A1 | 12/2003 | Soricut et al. |
| 2004/0002849 A1 | 1/2004 | Zhou |
| 2004/0018641 A1 | 1/2004 | Goldsmith et al. |
| 2004/0030540 A1 | 2/2004 | Ovil et al. |
| 2004/0093567 A1 | 5/2004 | Schabes et al. |
| 2004/0138869 A1 | 7/2004 | Heinecke |
| 2004/0215514 A1 | 10/2004 | Quinlan et al. |
| 2004/0260543 A1 | 12/2004 | Horowitz |
| 2005/0043940 A1 | 2/2005 | Elder |
| 2005/0044495 A1 | 2/2005 | Lee et al. |
| 2005/0053900 A1 | 3/2005 | Kaufmann |
| 2005/0091030 A1 | 4/2005 | Jessee et al. |
| 2005/0108001 A1 | 5/2005 | Aarskog |
| 2005/0120002 A1 | 6/2005 | Behbehani |
| 2005/0139686 A1 | 6/2005 | Helmer et al. |
| 2005/0143971 A1 | 6/2005 | Burstein |
| 2005/0162274 A1 | 7/2005 | Shniberg et al. |
| 2005/0209844 A1 | 9/2005 | Wu et al. |
| 2005/0257146 A1 | 11/2005 | Ashcraft et al. |
| 2006/0003297 A1 | 1/2006 | Wiig et al. |
| 2006/0032427 A1 | 2/2006 | Ishii et al. |
| 2006/0048055 A1 | 3/2006 | Wu et al. |
| 2006/0057022 A1 | 3/2006 | Williams |
| 2006/0074655 A1 | 4/2006 | Bejar et al. |
| 2006/0081711 A1 | 4/2006 | Zhao et al. |
| 2006/0110714 A1 | 5/2006 | Symmes |
| 2006/0129381 A1 | 6/2006 | Wakita |
| 2006/0247914 A1 | 11/2006 | Brener et al. |
| 2006/0260958 A1 | 11/2006 | Brunner |
| 2007/0067177 A1 | 3/2007 | Martin |
| 2007/0094024 A1 | 4/2007 | Kristensson et al. |
| 2007/0106937 A1 | 5/2007 | Cucerzan et al. |
| 2007/0141544 A1 | 6/2007 | Nakane |
| 2007/0238084 A1 | 10/2007 | Maguire et al. |
| 2007/0265831 A1 | 11/2007 | Dinur et al. |
| 2007/0271089 A1 | 11/2007 | Bates et al. |
| 2008/0059151 A1 | 3/2008 | Chen |
| 2008/0077859 A1 | 3/2008 | Schabes et al. |
| 2008/0154600 A1 | 6/2008 | Tian et al. |
| 2008/0167858 A1 | 7/2008 | Christie et al. |
| 2008/0173712 A1 | 7/2008 | Nemet |
| 2008/0189106 A1 | 8/2008 | Low et al. |
| 2008/0195940 A1 | 8/2008 | Gail et al. |
| 2008/0208567 A1 | 8/2008 | Brockett et al. |
| 2008/0208582 A1 | 8/2008 | Gallino |

(56) References Cited

U.S. PATENT DOCUMENTS

| | | | |
|---|---|---|---|
| 2008/0249773 | A1 | 10/2008 | Bejar et al. |
| 2008/0270897 | A1 | 10/2008 | Jawerth et al. |
| 2009/0083028 | A1 | 3/2009 | Davtchev et al. |
| 2009/0198671 | A1 | 8/2009 | Zhang |
| 2009/0230182 | A1 | 9/2009 | Nemet et al. |
| 2009/0302102 | A1 | 12/2009 | Nemet et al. |
| 2009/0319257 | A1 | 12/2009 | Blume et al. |
| 2010/0020970 | A1 | 1/2010 | Liu |
| 2010/0050074 | A1 | 2/2010 | Nachmani et al. |
| 2010/0219235 | A1 | 9/2010 | Nemet et al. |
| 2010/0275118 | A1 | 10/2010 | Iakobashvili et al. |
| 2010/0286979 | A1 | 11/2010 | Zangvil et al. |
| 2011/0006109 | A1 | 1/2011 | Nemet |
| 2011/0006115 | A1 | 1/2011 | Nemet |
| 2011/0093268 | A1 | 4/2011 | Gorin et al. |
| 2011/0184720 | A1 | 7/2011 | Zangvil |
| 2012/0104105 | A1 | 5/2012 | Nemet |
| 2012/0104106 | A1 | 5/2012 | Nemet |
| 2012/0145781 | A1 | 6/2012 | Nemet |
| 2012/0305637 | A1 | 12/2012 | Nemet |
| 2013/0024185 | A1 | 1/2013 | Parikh |
| 2013/0138641 | A1 | 5/2013 | Korolev et al. |
| 2014/0001256 | A1 | 1/2014 | Nemet et al. |
| 2014/0110486 | A1 | 4/2014 | Nemet |
| 2014/0252096 | A1 | 9/2014 | Nemet et al. |

FOREIGN PATENT DOCUMENTS

| | | |
|---|---|---|
| EP | 936753 | 8/1999 |
| JP | 63-118894 | 5/1988 |
| JP | 3-53281 | 3/1991 |
| JP | 5-6470 | 1/1993 |
| JP | 5-19695 | 1/1993 |
| JP | 5-67253 | 3/1993 |
| JP | 9-504858 | 5/1997 |
| JP | 2001-502794 | 2/2001 |
| JP | 2002-040012 | 2/2002 |
| JP | 2002504684 | 2/2002 |
| JP | 2003-203210 | 7/2003 |
| JP | 2003525464 | 8/2003 |
| JP | 2005-518320 | 6/2005 |
| JP | 2006-18782 | 1/2006 |
| JP | 2006-522933 | 1/2006 |
| JP | 2004-184920 | 7/2007 |
| WO | 94/27144 | 11/1994 |
| WO | WO 97011535 | 3/1997 |
| WO | 98/14777 | 4/1998 |
| WO | WO 98035514 | 12/1998 |
| WO | WO 99042822 | 8/1999 |
| WO | 01/048680 | 7/2001 |
| WO | WO 01064430 | 9/2001 |
| WO | 03/060626 | 7/2003 |
| WO | 2004/038353 | 5/2004 |
| WO | WO 2004092697 | 10/2004 |
| WO | 2006-086053 | 8/2006 |
| WO | 2007-049792 | 5/2007 |
| WO | 2008/022140 | 2/2008 |
| WO | WO 2009/016631 | 2/2009 |
| WO | WO 2007129316 | 4/2009 |
| WO | WO 2008135962 | 4/2009 |
| WO | WO 2009063464 | 5/2009 |
| WO | WO 2009063465 | 5/2009 |
| WO | 2009-144701 | 12/2009 |
| WO | WO 2009150641 | 12/2009 |
| WO | WO 2010/013228 | 2/2010 |
| WO | 2010/134062 | 11/2010 |
| WO | WO 2010134061 | 11/2010 |

OTHER PUBLICATIONS

A Notice of Allowance dated Nov. 18, 2014, which issued during the prosecution of U.S. Appl. No. 13/323,906.
A Notice of Allowance dated Apr. 23, 2014, which issued during the prosecution of U.S. Appl. No. 13/323,906.
A Notice of Allowance dated Apr. 25, 2014, which issued during the prosecution of U.S. Appl. No. 13/490,705.
A Notice of Allowance dated Nov. 7, 2014, which issued during the prosecution of U.S. Appl. No. 13/490,705.
An English translation of an Office Action dated Feb. 3, 2014 which issued during the prosecution of Japanese Patent Application No. 2012-511407.
An English translation of an Office Action dated Aug. 26, 2014 which issued during the prosecution of Japanese Patent Application No. 2012-511407.
An English translation of an Office Action dated Jun. 25, 2013 which issued during the prosecution of Japanese Patent Application No. 2012-511406.
An Office Action dated Nov. 7, 2012, which issued during the prosecution of U.S. Appl. No. 12/743,209.
An English Translation of an Office Action dated Dec. 24, 2013 which issued during the prosecution of Chinese Patent Application No. 200980160387.4.
An Office Action dated Mar. 9, 2012, which issued during the prosecution of U.S. Appl. No. 12/743,209.
An Office Action dated Apr. 14, 2014, which issued during the prosecution of U.S. Appl. No. 13/657,185.
An Office Action dated Jan. 16, 2013, which issued during the prosecution of U.S. Appl. No. 12/598,979.
An Office Action dated Dec. 19, 2012, which issued during the prosecution of U.S. Appl. No. 12/742,650.
An Office Action dated Mar. 20, 2012, which issued during the prosecution of U.S. Appl. No. 13/321,477.
An English Translation of an Office Action dated Feb. 21, 2013 which issued during the prosecution of Japanese Patent Application No. JP2009-508663.
An English Translation of an Office Action dated Jan. 15, 2013 which issued during the prosecution of Japanese Patent Application No. JP2010-507054.
An Extended European Search Report dated Feb. 11, 2013, which issued during the prosecution of European Patent Application No. 08848845.
An Extended European Search Report dated Feb. 18, 2013, which issued during the prosecution of European Application No. 09762166.
An Office Action dated Nov. 7, 2011, which issued during the prosecution of U.S. Appl. No. 12/598,979.
An International Preliminary Report on Patentability dated Nov. 22, 2011 which issued during the prosecution of Applicant's PCT/IL10/00205.
U.S. Appl. No. 60/746,646, filed May 7, 2006.
U.S. Appl. No. 60/804,072, filed Jun. 6, 2006.
U.S. Appl. No. 61/231,799, filed Aug. 6, 2009.
U.S. Appl. No. 61/131,644, filed Jun. 10, 2008.
An Office Action dated Oct. 28, 2013, which issued during the prosecution of U.S. Appl. No. 14/017,545.
An Office Action dated Jun. 20, 2008, which issued during the prosecution of U.S. Appl. No. 11/852,911.
An International Search Report and a Written Opinion both dated Jul. 17, 2008, which issued during the prosecution of Applicant's PCTIL2007000547.
An International Preliminary Report on Patentability dated Mar. 10, 2009, which issued during the prosecution of Applicant's PCTIL2007000547.
An International Search Report and a Written Opinion both dated Jan. 9, 2009, which issued during the prosecution of Applicant's PCT/IL2007/001411.
An International Preliminary Report on Patentability dated Nov. 10, 2009, which issued during the prosecution of Applicant's PCT/IL2007/001411.
A Notice of Allowance dated Feb. 15, 2012, which issued during the prosecution of U.S. Appl. No. 12/471,798.
A European Search Report dated Aug. 18, 2011, which issued during the prosecution of European Patent Application No. 0 773 6287.
An Office Action dated Apr. 19, 2011, which issued during the prosecution of U.S. Appl. No. 12/469,309.
A Notice of Allowance dated Sep. 9, 2011, which issued during the prosecution of U.S. Appl. No. 12/469,309.

(56) References Cited

OTHER PUBLICATIONS

An Office Action dated May 3, 2011, which issued during the prosecution of U.S. Appl. No. 12/471,798.
An International Search Report and a Written Opinion both dated Aug. 31, 2009, which issued during the prosecution of Applicant's PCT/IL2009/000503.
An International Preliminary Report on Patentability dated Dec. 13, 2010, which issued during the prosecution of Applicant's PCT/IL2009/000503.
An International Search Report and a Written Opinion both dated Apr. 5, 2010, which issued during the prosecution of Applicant's PCT/IL2009/001167.
An International Preliminary Report on Patentability dated Nov. 22, 2011, which issued during the prosecution of Applicant's PCT/IL2009/001167.
A Notice of Allowance dated Apr. 2, 2013, which issued during the prosecution U.S. Appl. No. 12/743,209.
An English Translation of an Office Action dated Mar. 10, 2010 which issued during the prosecution of Chinese Patent Application No. 201082230956.6.
An Office Action dated Sep. 10, 2013, which issued during the prosecution of U.S. Appl. No. 13/657,185.
An English translation of an Office Action dated Sep. 10, 2013 which issued during the prosecution of Japanese Patent Application No. 2011-513110.
An English translation of an Office Action dated Aug. 27, 2013 which issued during the prosecution of Japanese Patent Application No. 2010-507054.
An Examiner Interview Summary Report dated Nov. 7, 2008, which issued during the prosecution of U.S. Appl. No. 11/852,911.
A Notice of Allowance dated Feb. 25, 2009, which issued during the prosecution of U.S. Appl. No. 11/852,911.
An Office Action dated Mar. 15, 2013, which issued during the prosecution of U.S. Appl. No. 13/321,467.
A Notice of Allowance dated Jul. 11, 2013, which issued during the prosecution of U.S. Appl. No. 13/321,477.
An Office Action dated Jul. 12, 2013, which issued during the prosecution of European Patent Application No. 07736287.9.
A Notice of Allowance dated May 16, 2013, which issued during the prosecution of U.S. Appl. No. 12/742,650.
An Office Action dated Sep. 18, 2014, which issued during the prosecution of U.S. Appl. No. 14/143,827.
A Notice of Allowance dated Oct. 15, 2014, which issued during the prosecution of U.S. Appl. No. 14/017,545.
A Notice of Allowance dated Apr. 17, 2009, which issued during the prosecution of U.S. Appl. No. 11/852,911.
An Office Action dated May 6, 2011, which issued during the prosecution of U.S. Appl. No. 12/469,309.
An Office Action dated Sep. 9, 2011, which issued during the prosecution of U.S. Appl. No. 12/471,798.
An Office Action dated Oct. 12, 2012, which issued during the prosecution of U.S. Appl. No. 12/669,175.
An Office Action dated Aug. 5, 2013, which issued during the prosecution of U.S. Appl. No. 12/669,175.
An Office Action dated Feb. 5, 2013, which issued during the prosecution of U.S. Appl. No. 12/669,175.
An Office Action dated Mar. 7, 2014, which issued during the prosecution of U.S. Appl. No. 12/669,175.
A Notice of Allowance dated Aug. 4, 2014, which issued during the prosecution of U.S. Appl. No. 12/669,175.
An English Translation of an Office Action dated Apr. 22, 2014 which issued during the prosecution of Israeli Patent Application No. 205687.
An English Translation of an Office Action dated Oct. 27, 2014 which issued during the prosecution of Israeli Patent Application No. 209901.
An Office Action dated Jul. 1, 2014, which issued during the prosecution of U.S. Appl. No. 13/576,330.
An English Translation of an Office Action dated Jun. 13, 2014 which issued during the prosecution of Chinese Patent Application No. 200880101405.7.
Letter submitted on Jul. 17, 2009 in U.S. Appl. No. 11/852,911.
An Office Action dated May 9, 2013, which issued during the prosecution of U.S. Appl. No. 12/937,618.
An English Translation of an Office Action dated Jan. 25, 2013 which issued during the prosecution of Chinese Patent Application No. 200880101405.7.
An English Translation of an Office Action dated Apr. 28, 2012 which issued during the prosecution of Chinese Patent Application No. 200880101405.7.
An Office Action dated Aug. 18, 2014, which issued during the prosecution of U.S. Appl. No. 14/461,778.
A Notice of Allowance dated Jun. 27, 2014, which issued during the prosecution of U.S. Appl. No. 14/017,545.
A Supplementary European Search Report dated Jul. 5, 2012, which issued during the prosecution of European Patent Application No. 08789727.
An English Translation of an Office Action dated Jun. 23, 2011 which issued during the prosecution of Chinese Patent Application No. 200880101405.7.
An International Search Report and a Written Opinion both dated May 25, 2011, which issued during the prosecution of Applicant's PCT/IL2011/00088.
An International Search Report dated May 11, 2009, which issued during the prosecution of Applicant's PCT/IL2009/00130.
An International Search Report dated Jun. 26, 2009, which issued during the prosecution of Applicant's PCT/IL2009/00317.
An International Preliminary Examination Report dated Oct. 19, 2010, which issued during the prosecution of Applicant's PCT/IL2009/00317.
Bick, E., "A Constraint Grammar Based Spellchecker for Danish with a Special Focus on Dyslexics" SKY Journal of Linguistics, vol. 19:2006 (ISSN 1796-279X), pp. 387-396 (retrieved Jan. 12, 2009 from the internet). <URL http://www.ling.helsinki.fi/sky/julkaisut/SKY2006_1/1.6.1.%20BICK.pdf>.
An International Search Report and Written Opinion both dated Feb. 3, 2009 which issued during the prosecution of Applicant's PCT/IL08/01051.
An Office Action dated Jan. 10, 2014, which issued during the prosecution of European Patent Application No. 08848845.
An Office Action dated Jun. 5, 2014, which issued during the prosecution of U.S. Appl. No. 14/017,545.
A Notice of Allowance dated Apr. 26, 2013, which issued during the prosecution of U.S. Appl. No. 12/598,979.
A Supplementary European Search Report dated Apr. 13, 2011, which issued during the prosecution of Applicant's European Patent Application No. EP07827384.
A Supplementary European Search Report dated Aug. 23. 2010. which issued during the prosecution of Applicant's European Application No. 08849330.9.
An English translation of an Office Action dated Feb. 7, 2012, which issued during the prosecution of JP Patent Application No. 2009-508663.
An International Preliminary Report on Patentability dated May 18, 2010 which issued during the prosecution of Applicant's PCT/IL08/001495.
An International Preliminary Report on Patentability dated May 18, 2010 which issued during the prosecution of Applicant's PCT/IL08/001494.
An International Search Report dated Jun. 3, 2009 which issued during the prosecution of Applicant's PCT/ IL08/001494.
An International Search Report dated Jun. 8, 2010 which issued during the prosecution of Applicant's PCT/IL 10/00205.
An International Search Report dated Mar. 9, 2009 which issued during the prosecution of Applicant's PCT/ IL08/001495.
An Office Action dated Apr. 25, 2012, which issued during the prosecution of U.S. Appl. No. 12/598,979.
An Office Action together with the English translation dated Oct. 25, 20112, which issued during the prosecution of Israel Patent Application No. 201958.

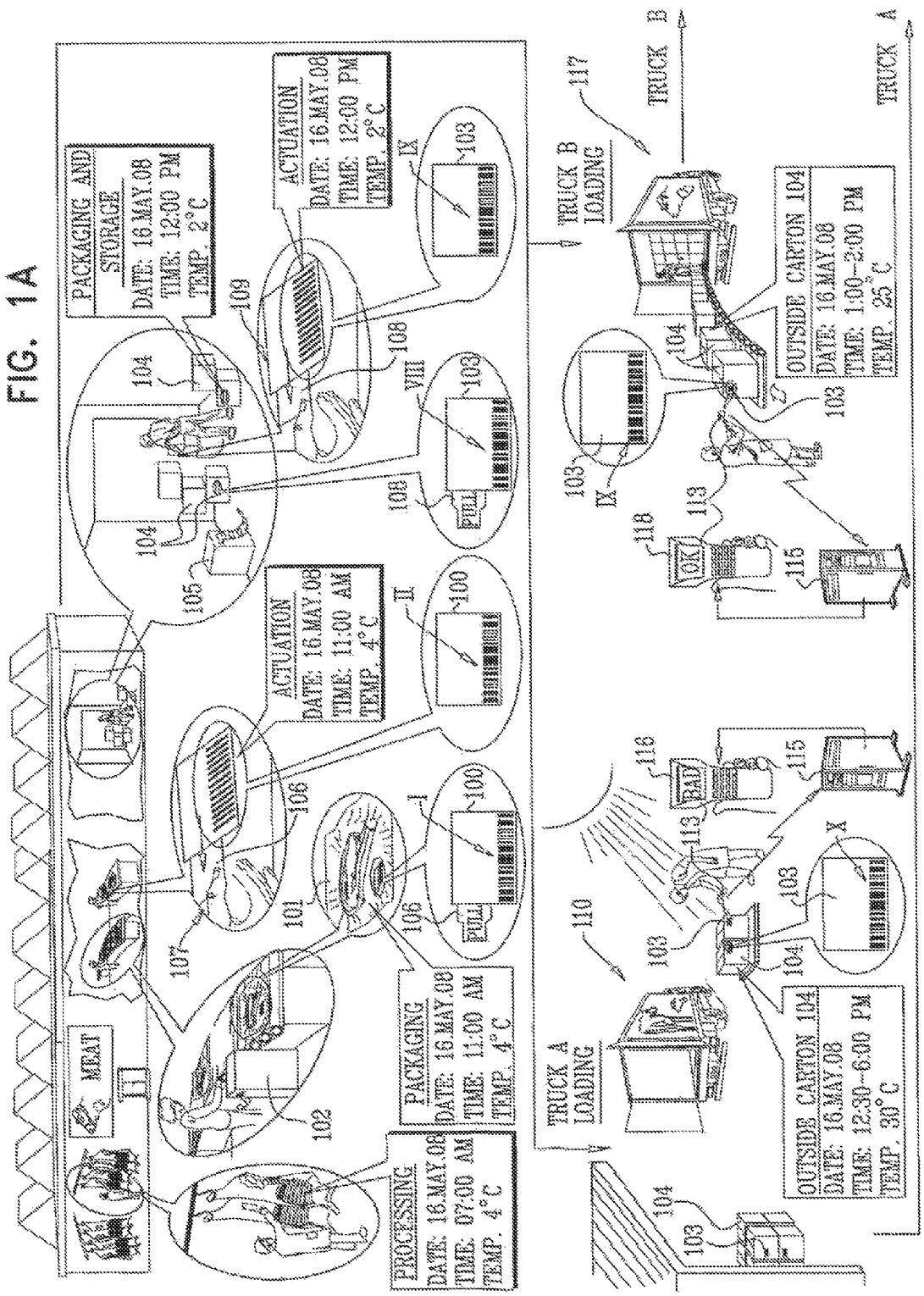

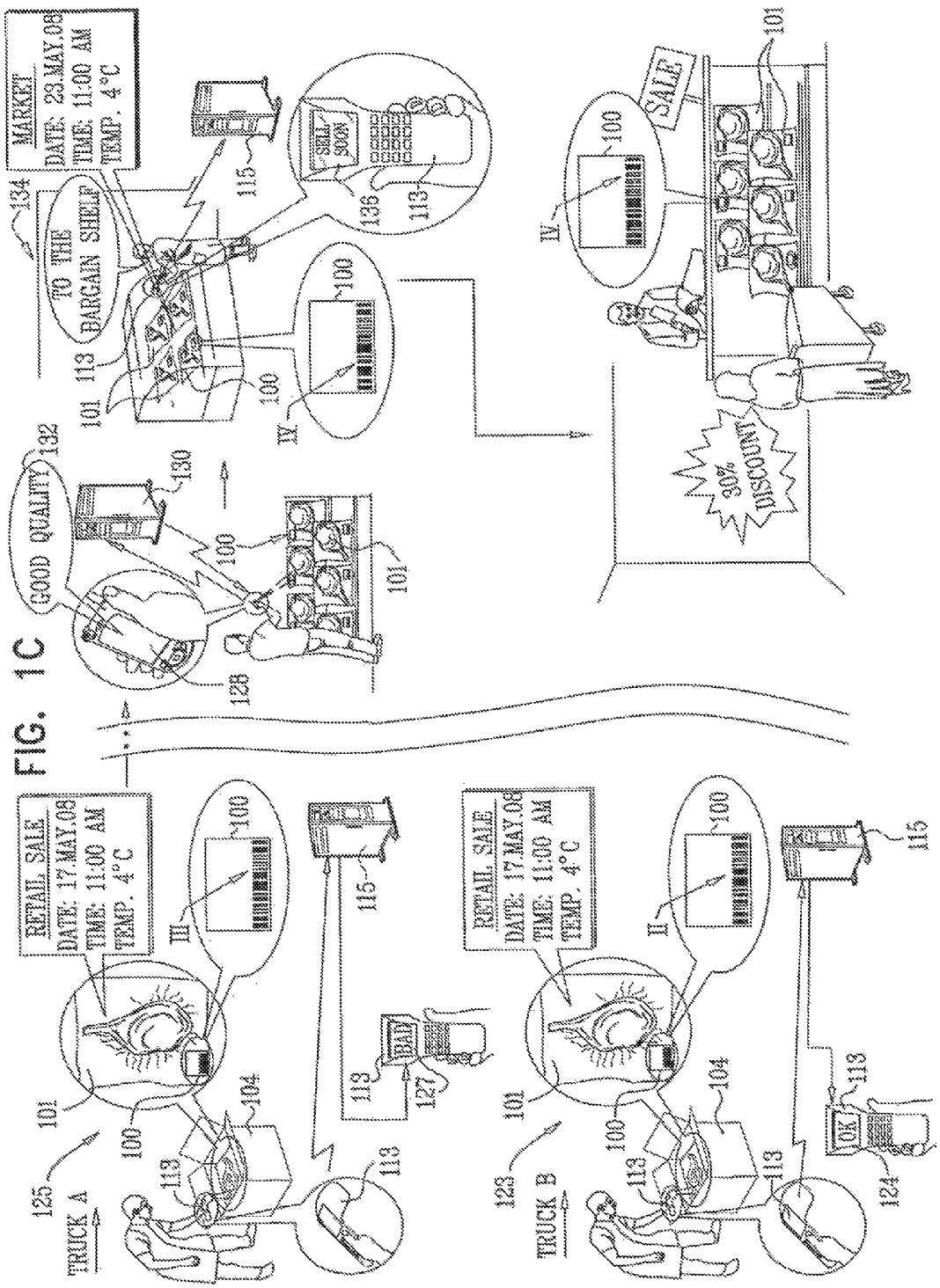

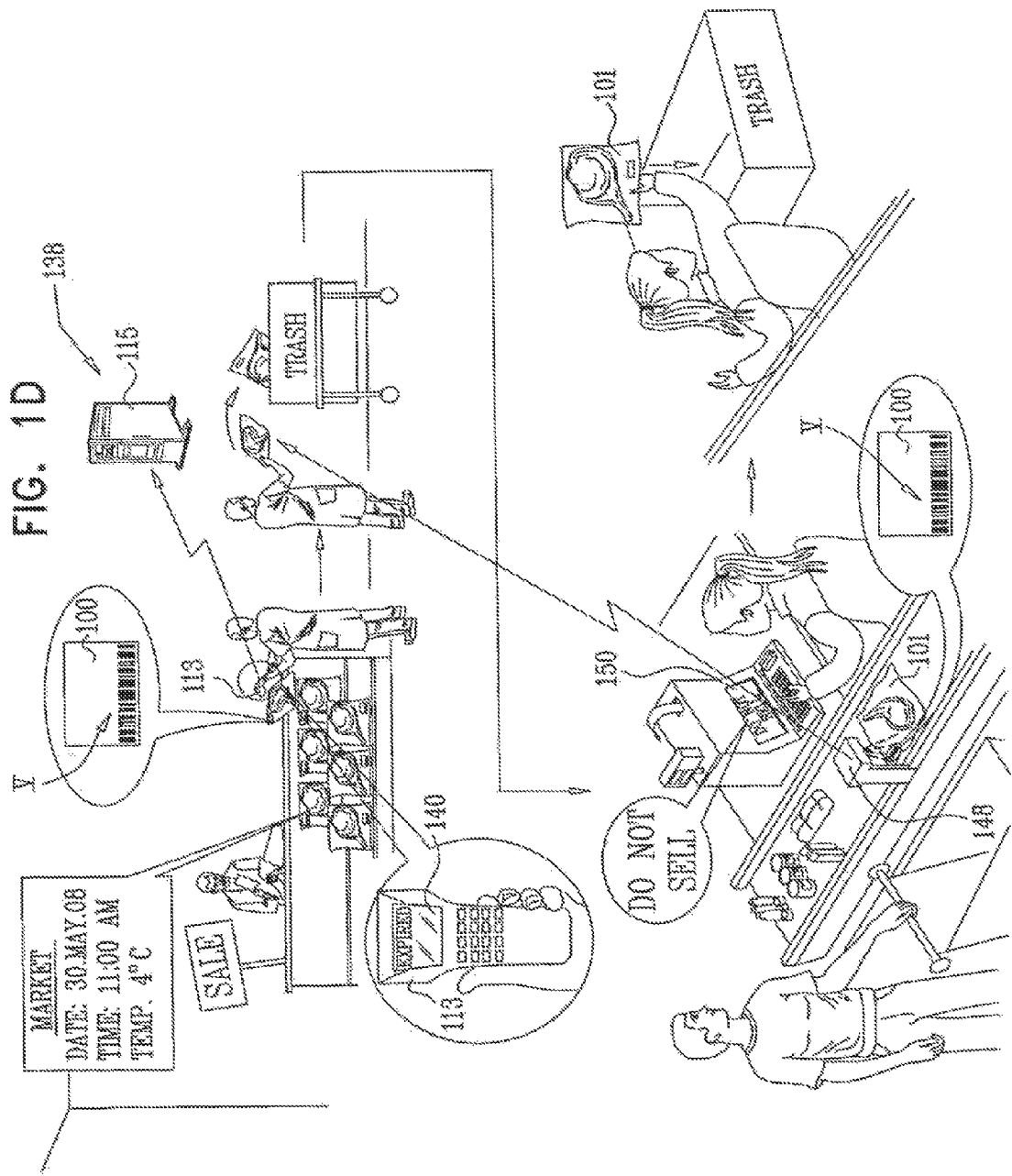

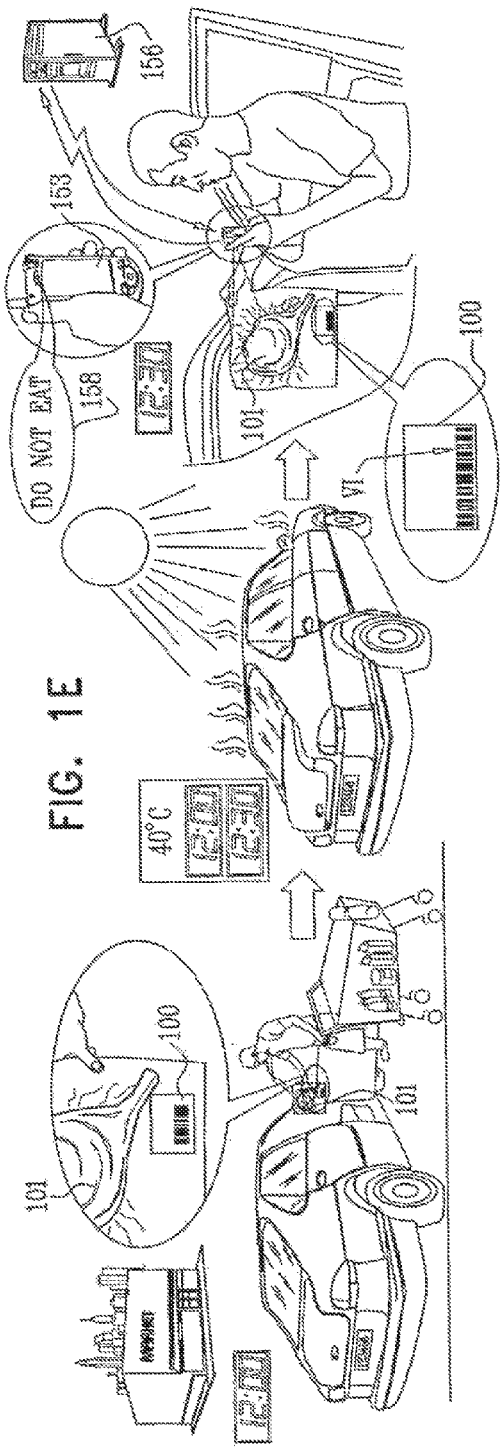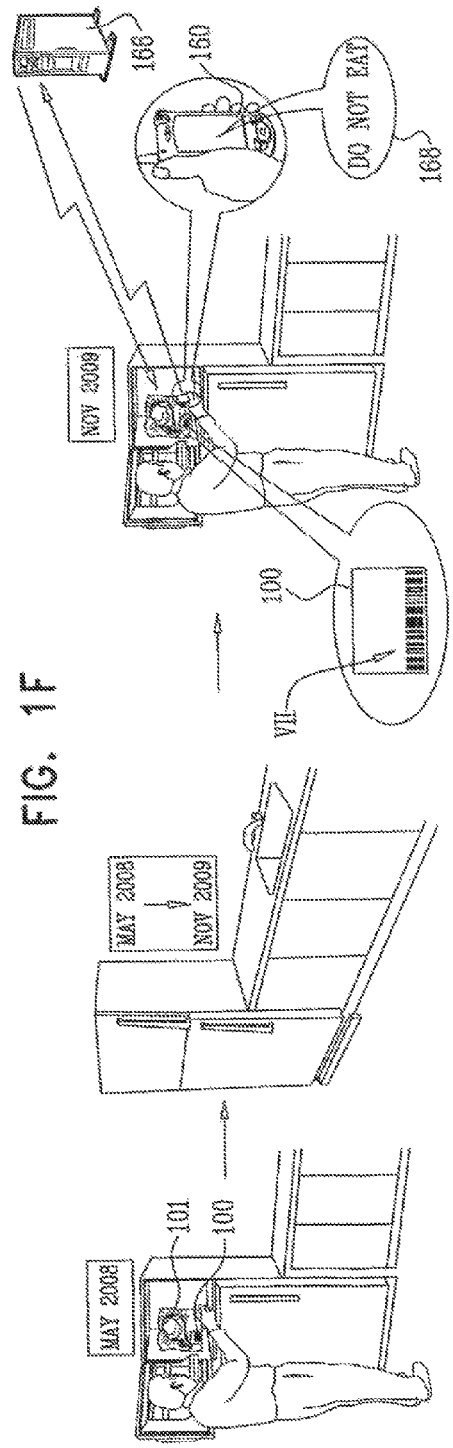

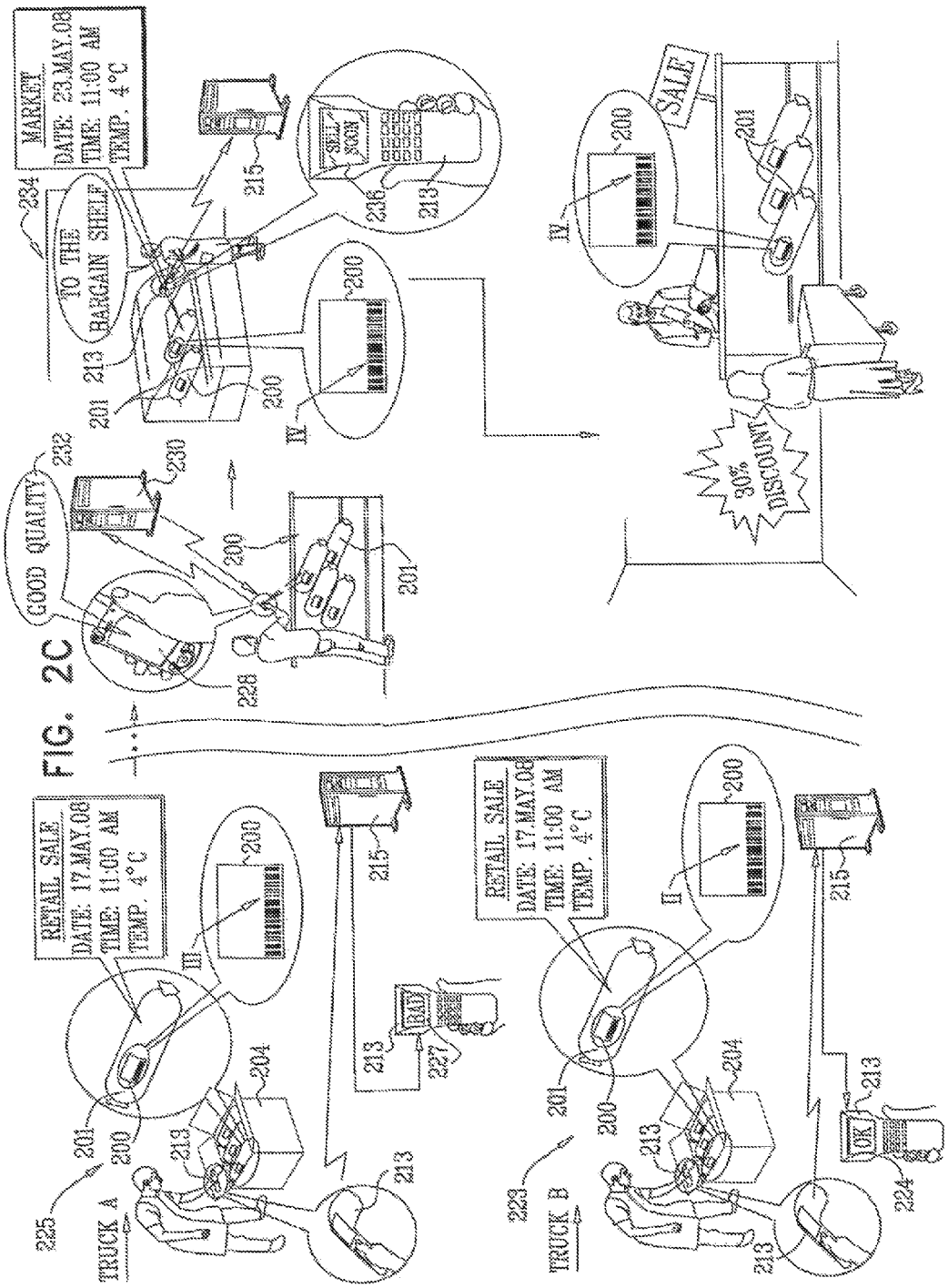

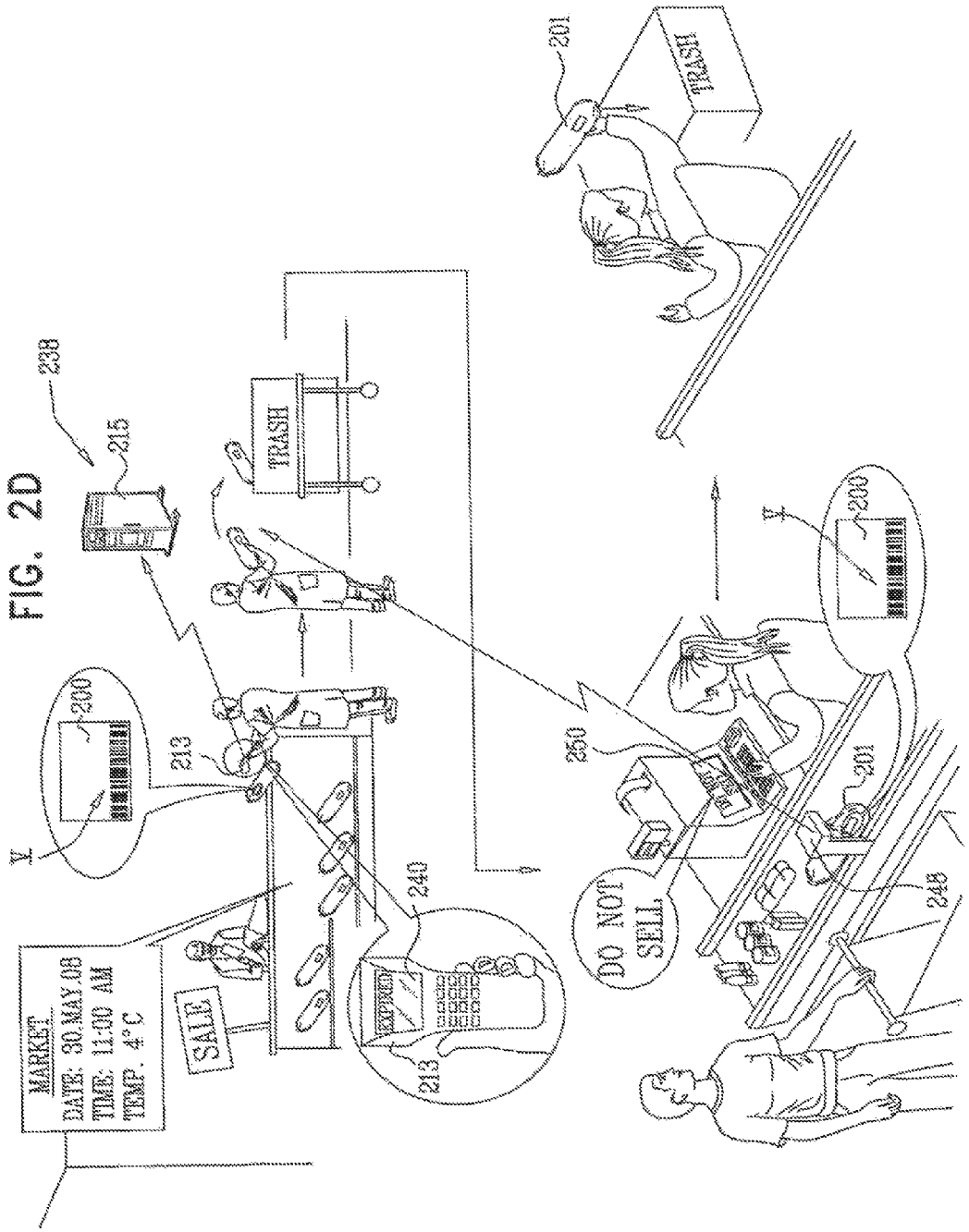

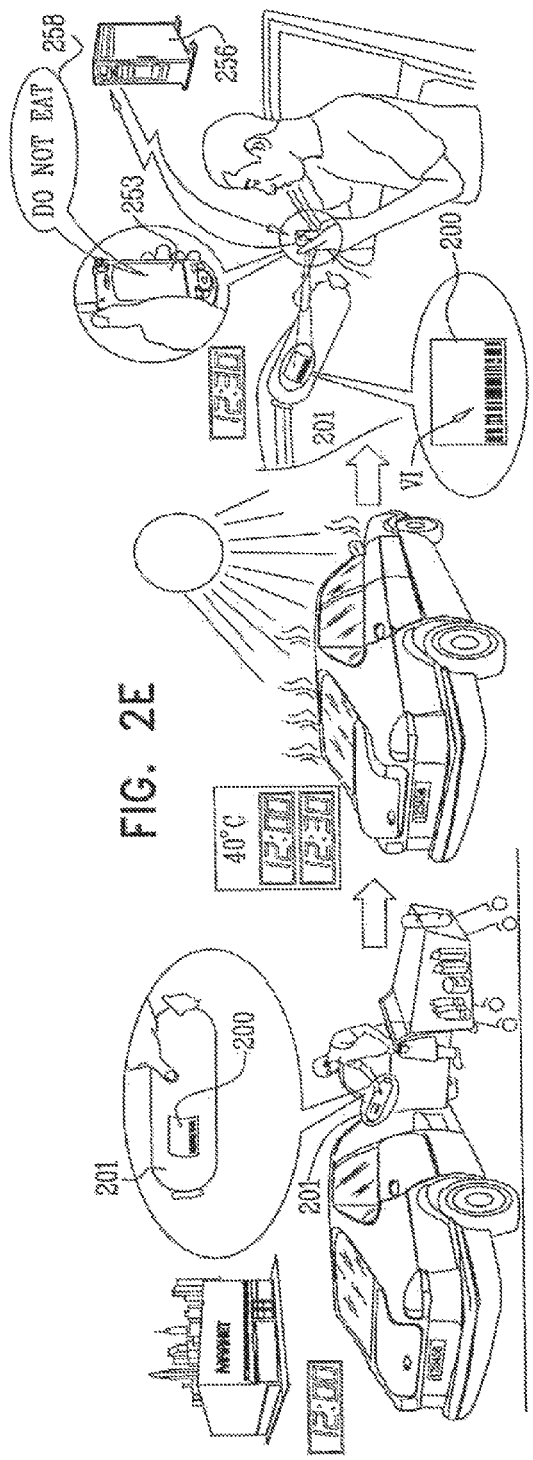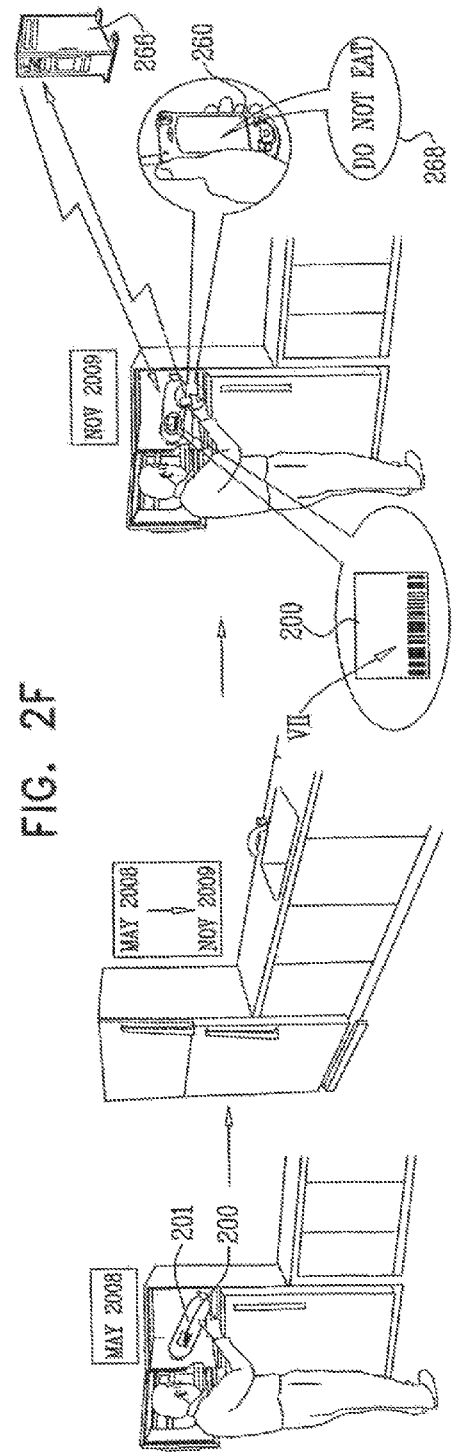

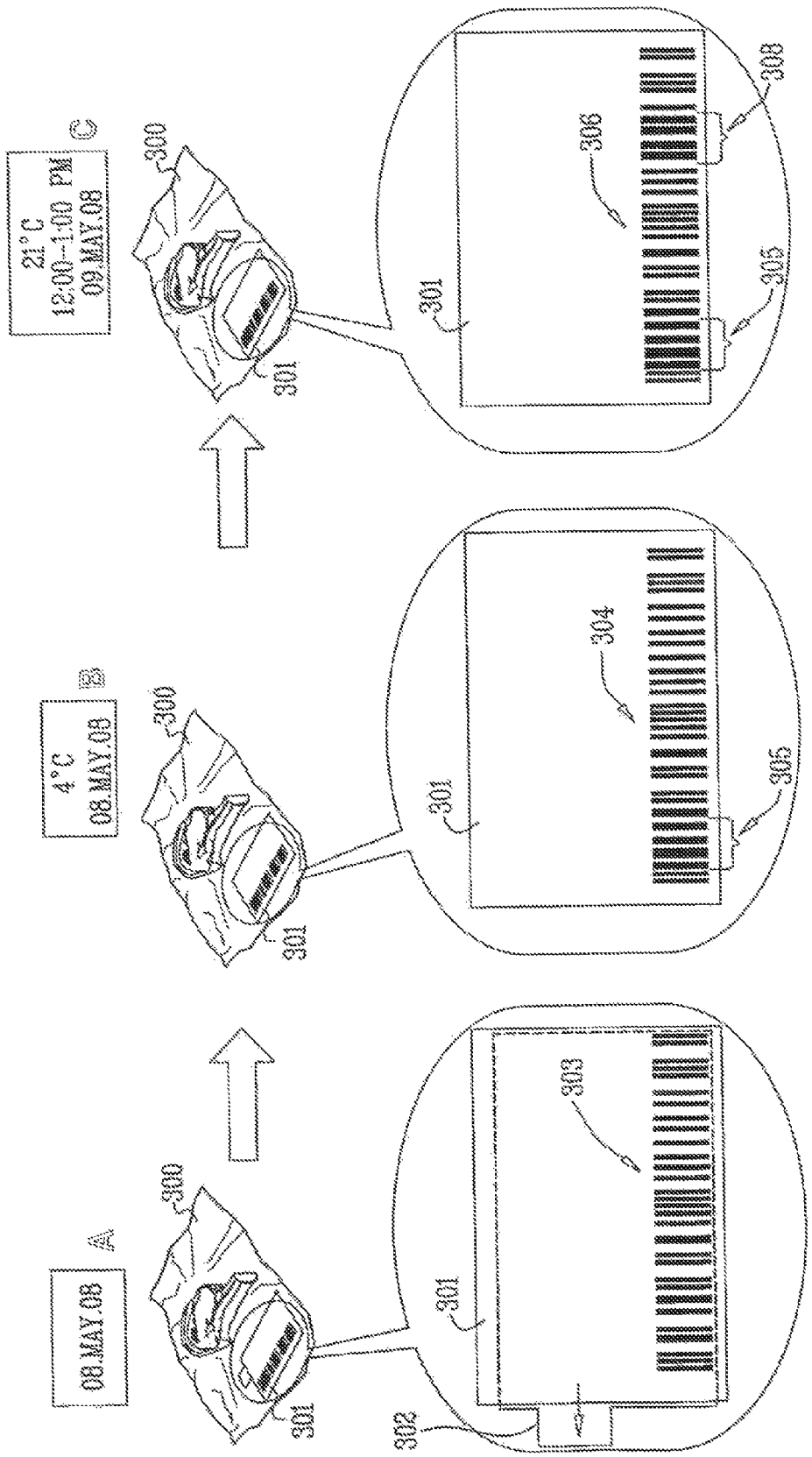

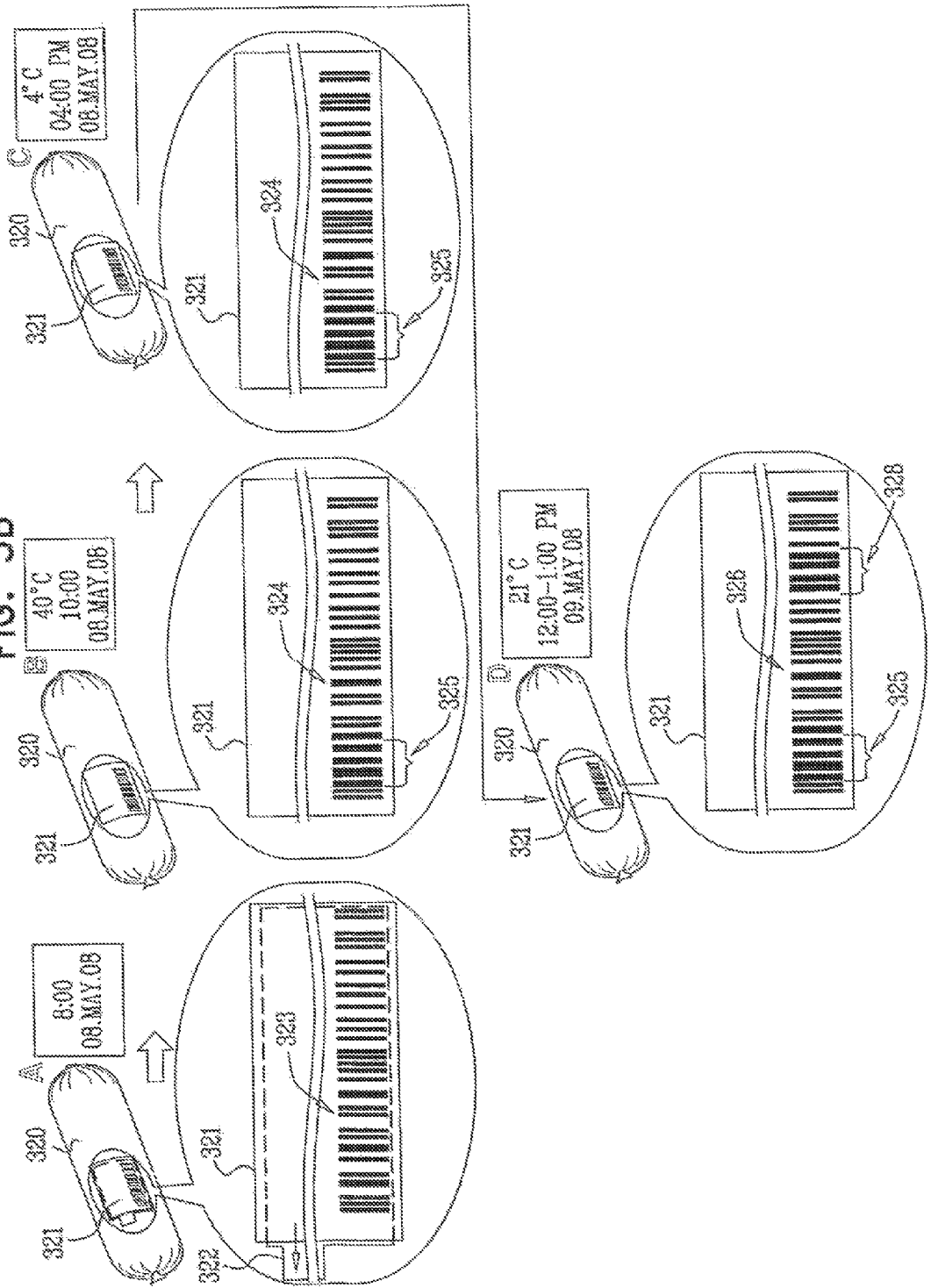

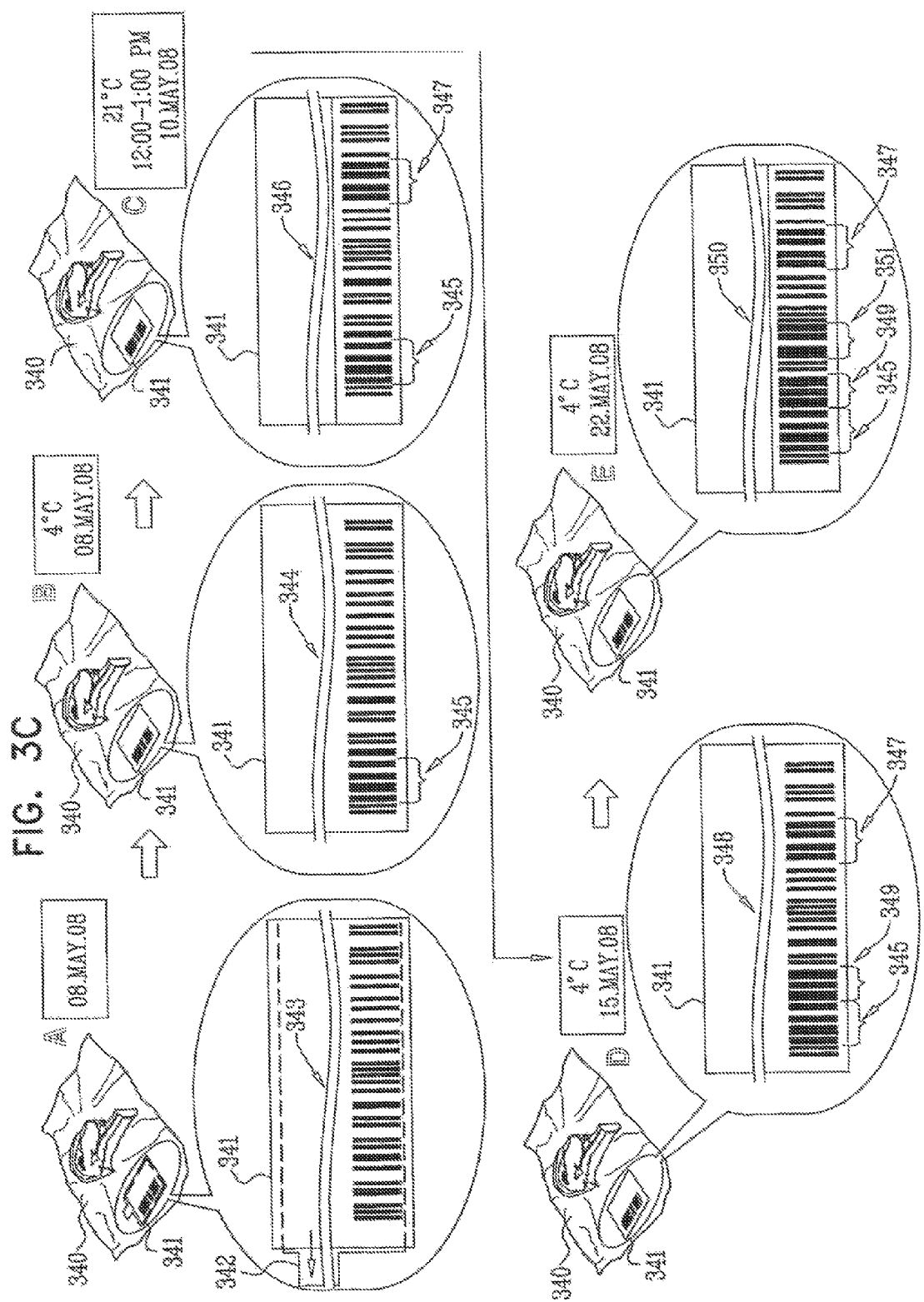

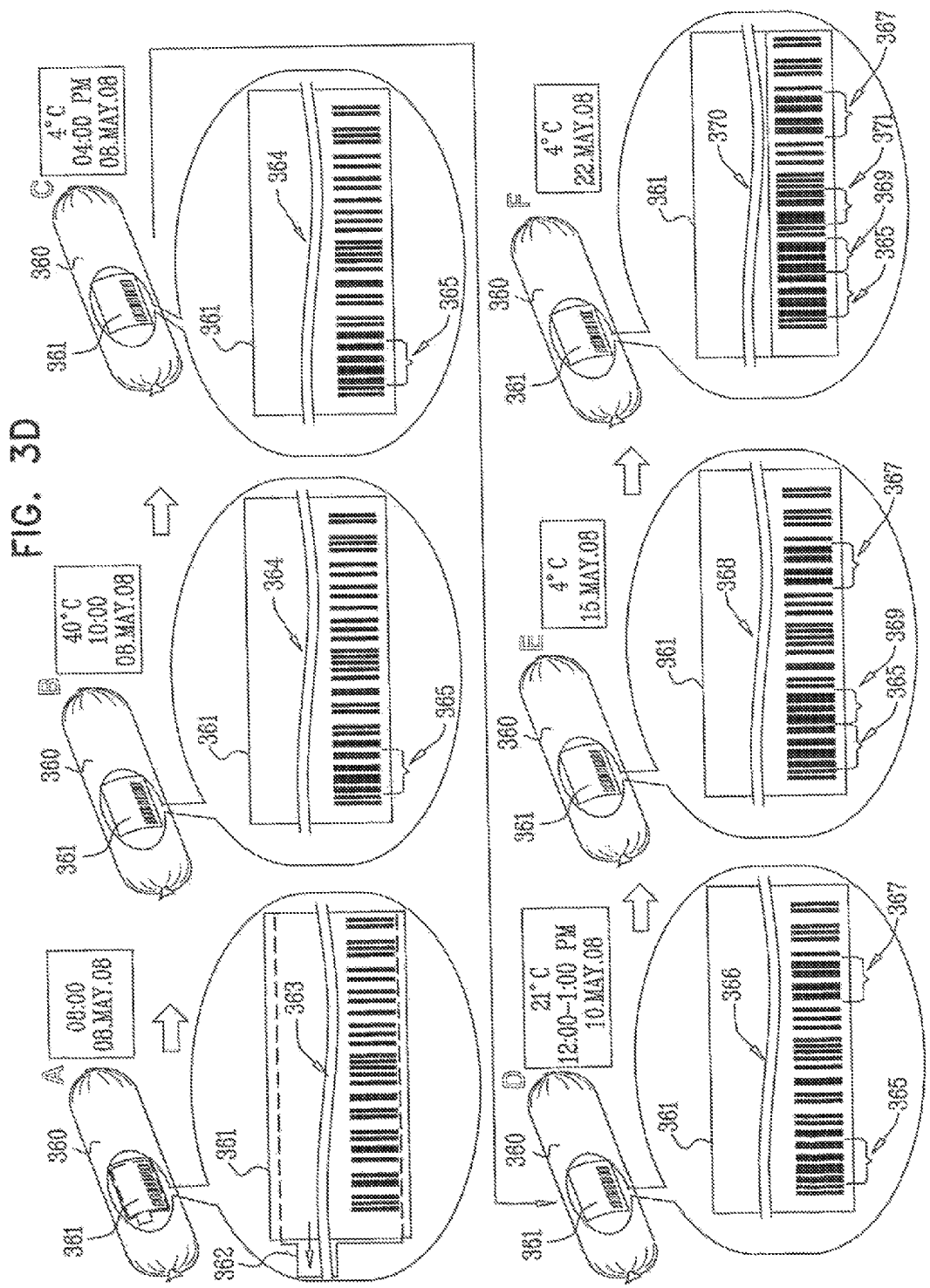

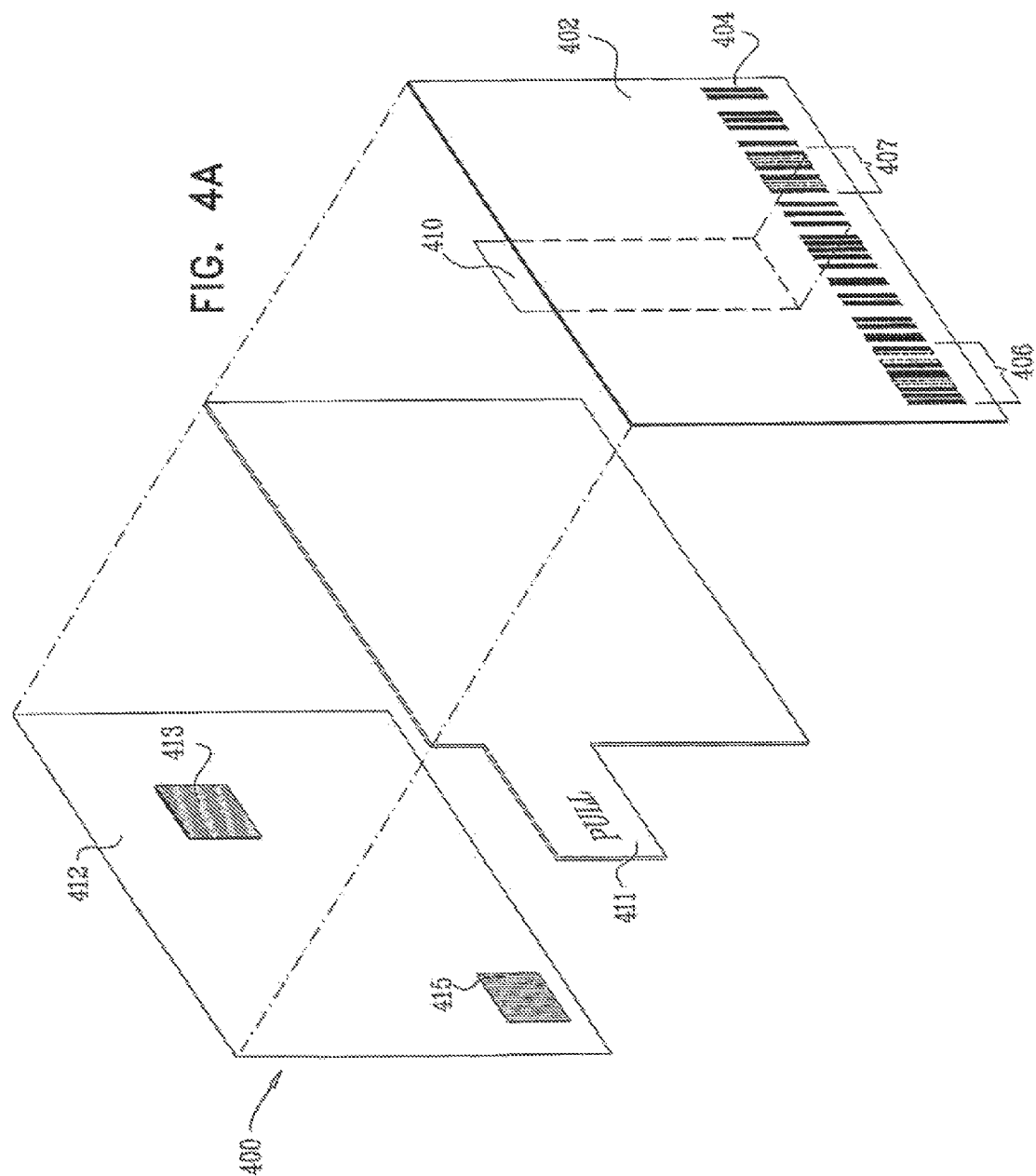

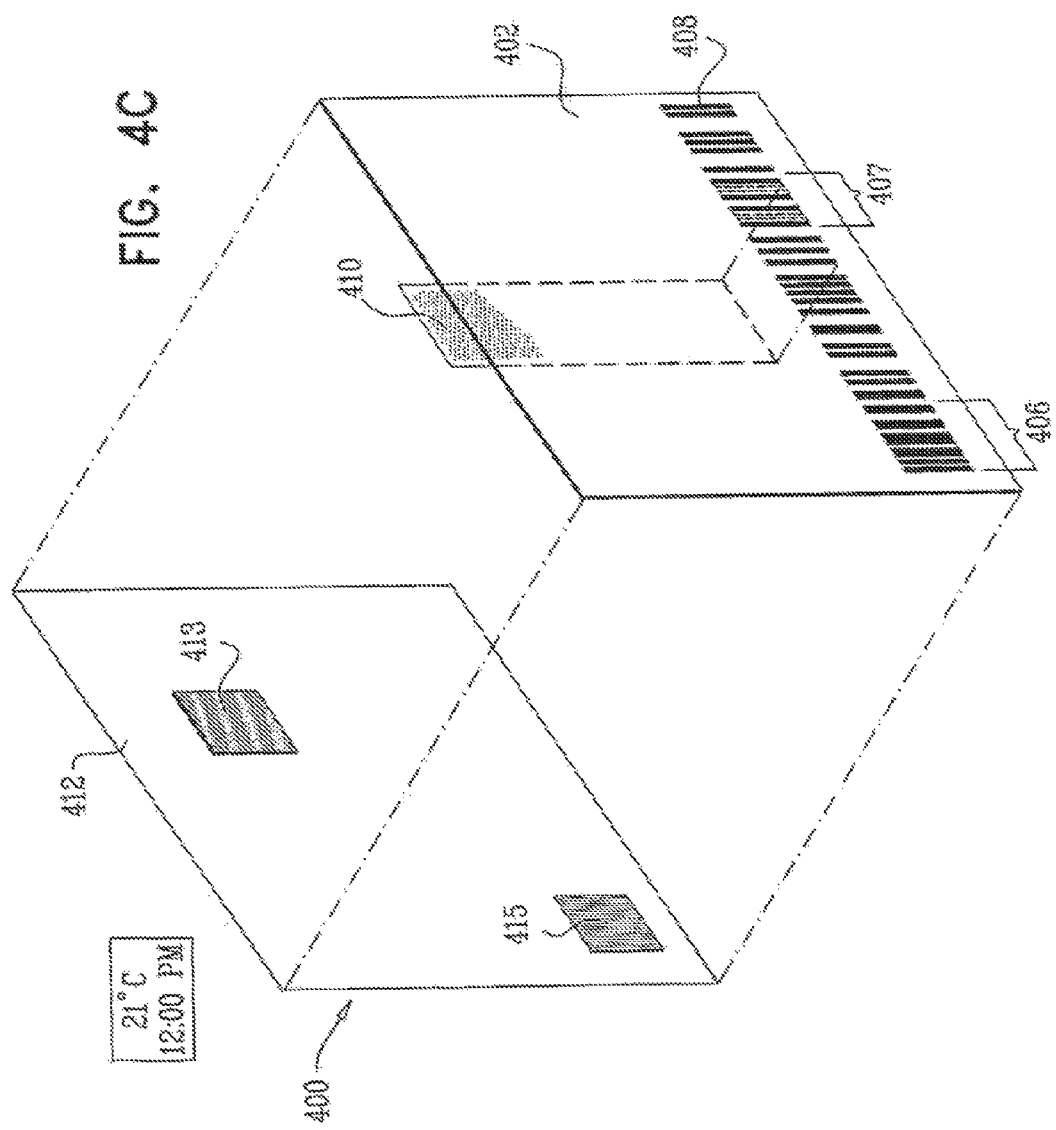

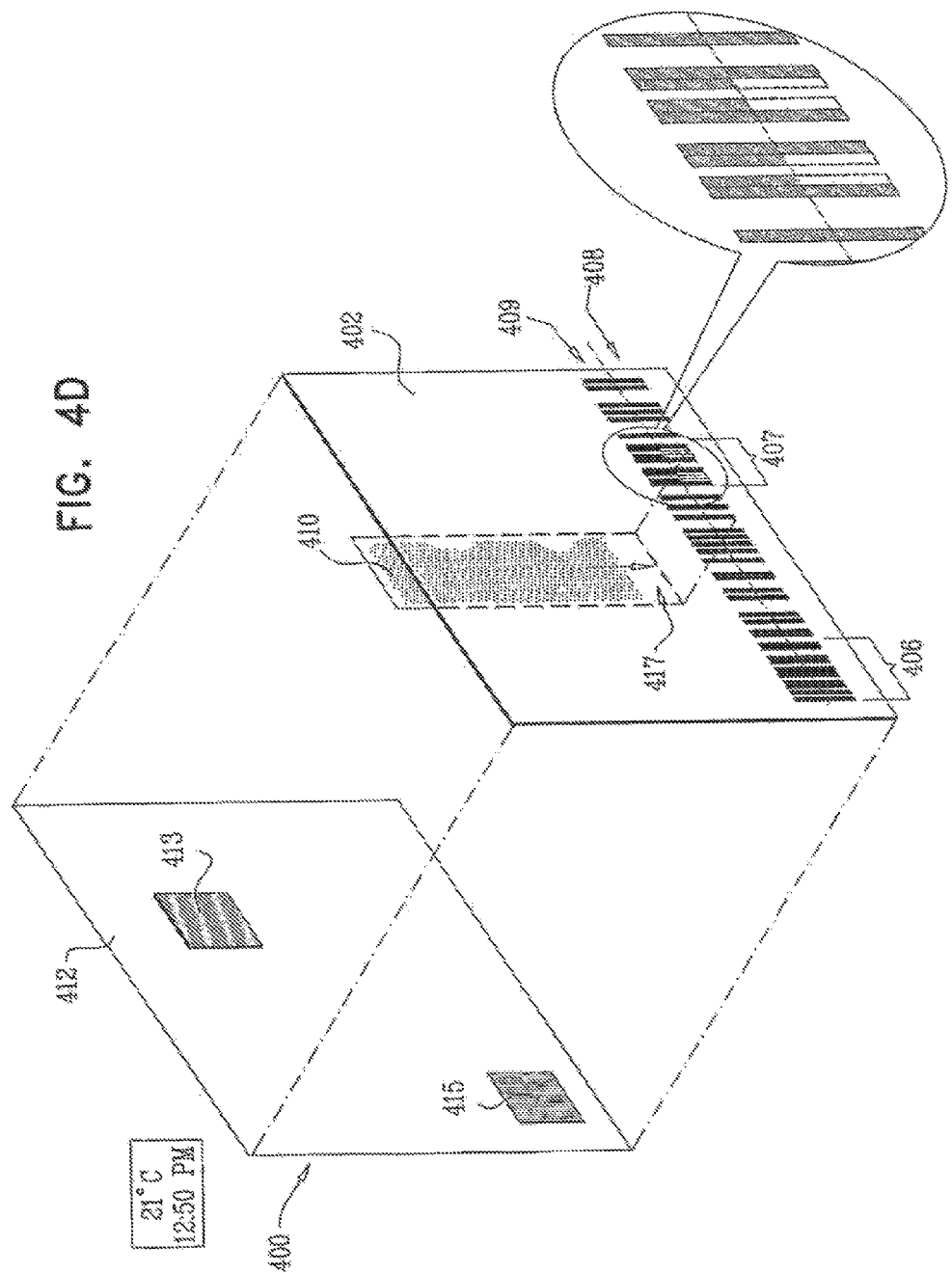

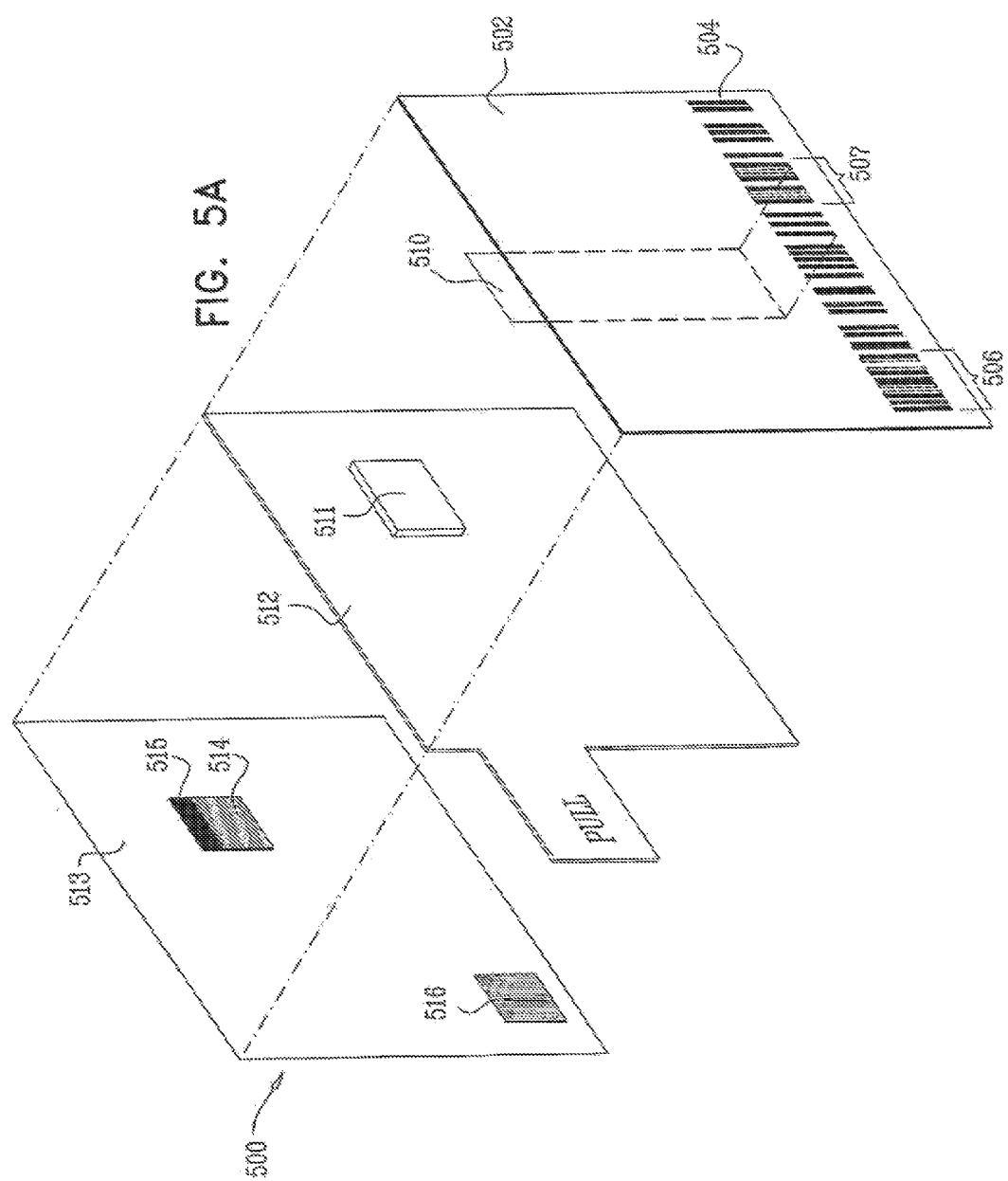

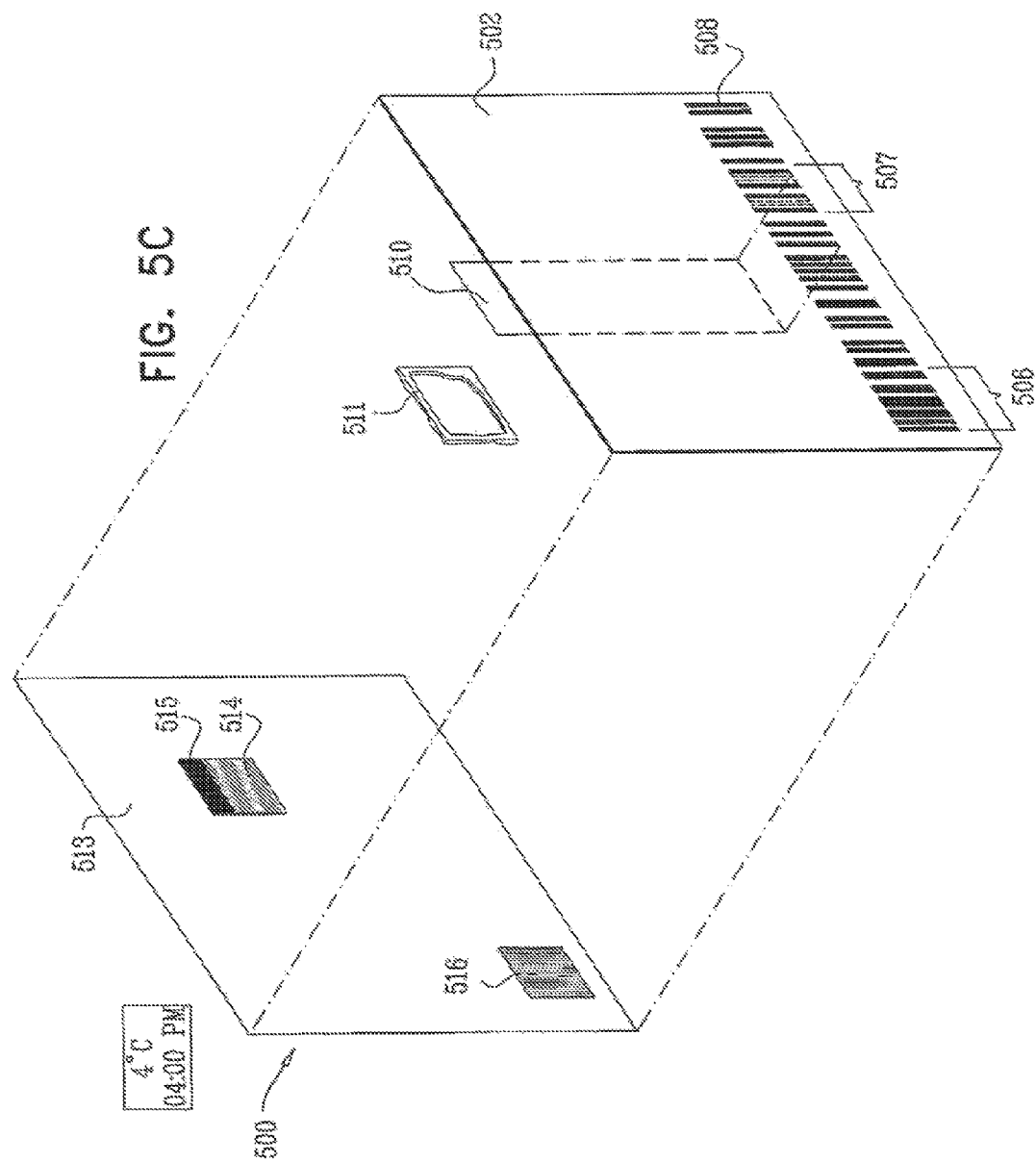

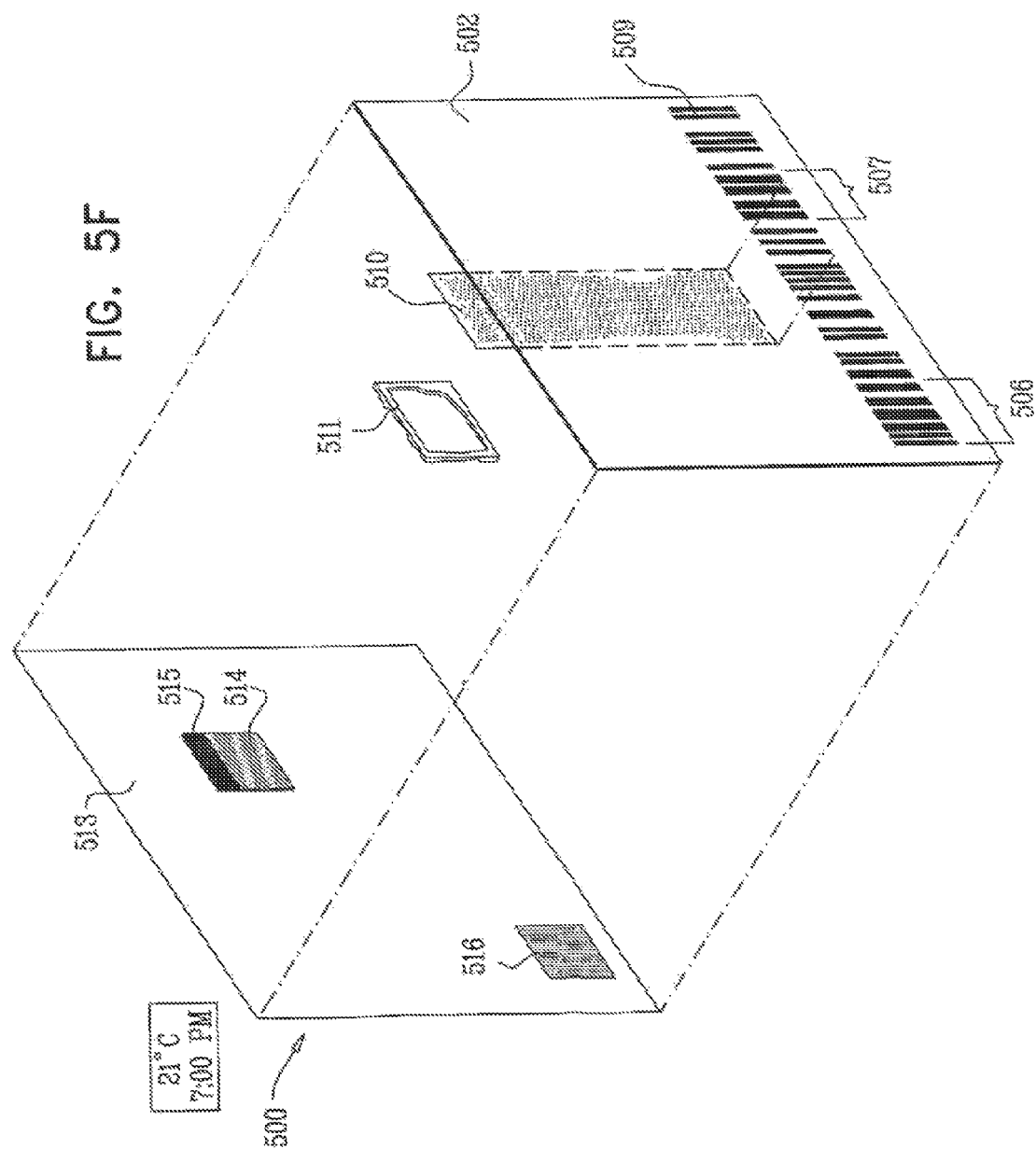

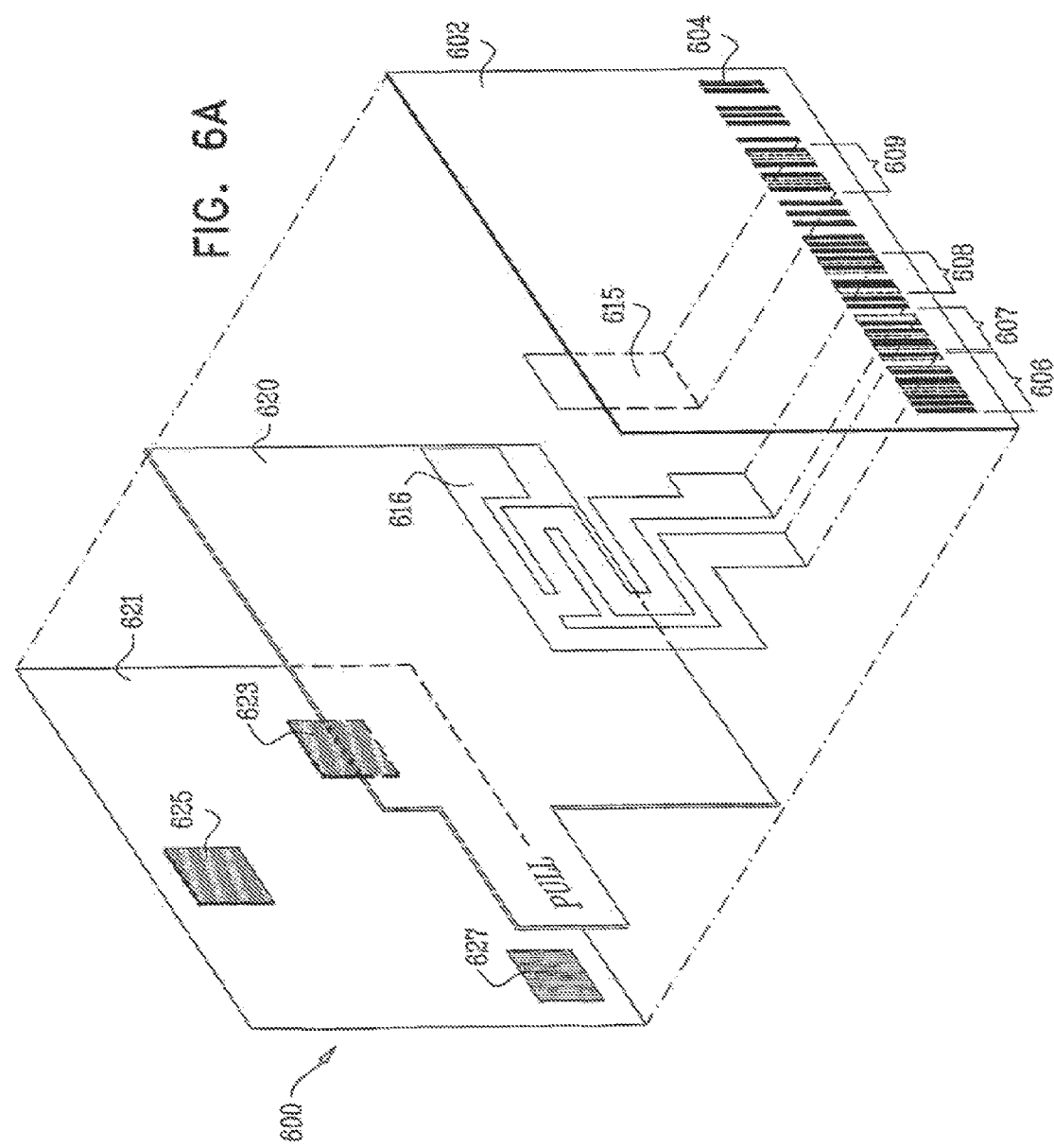

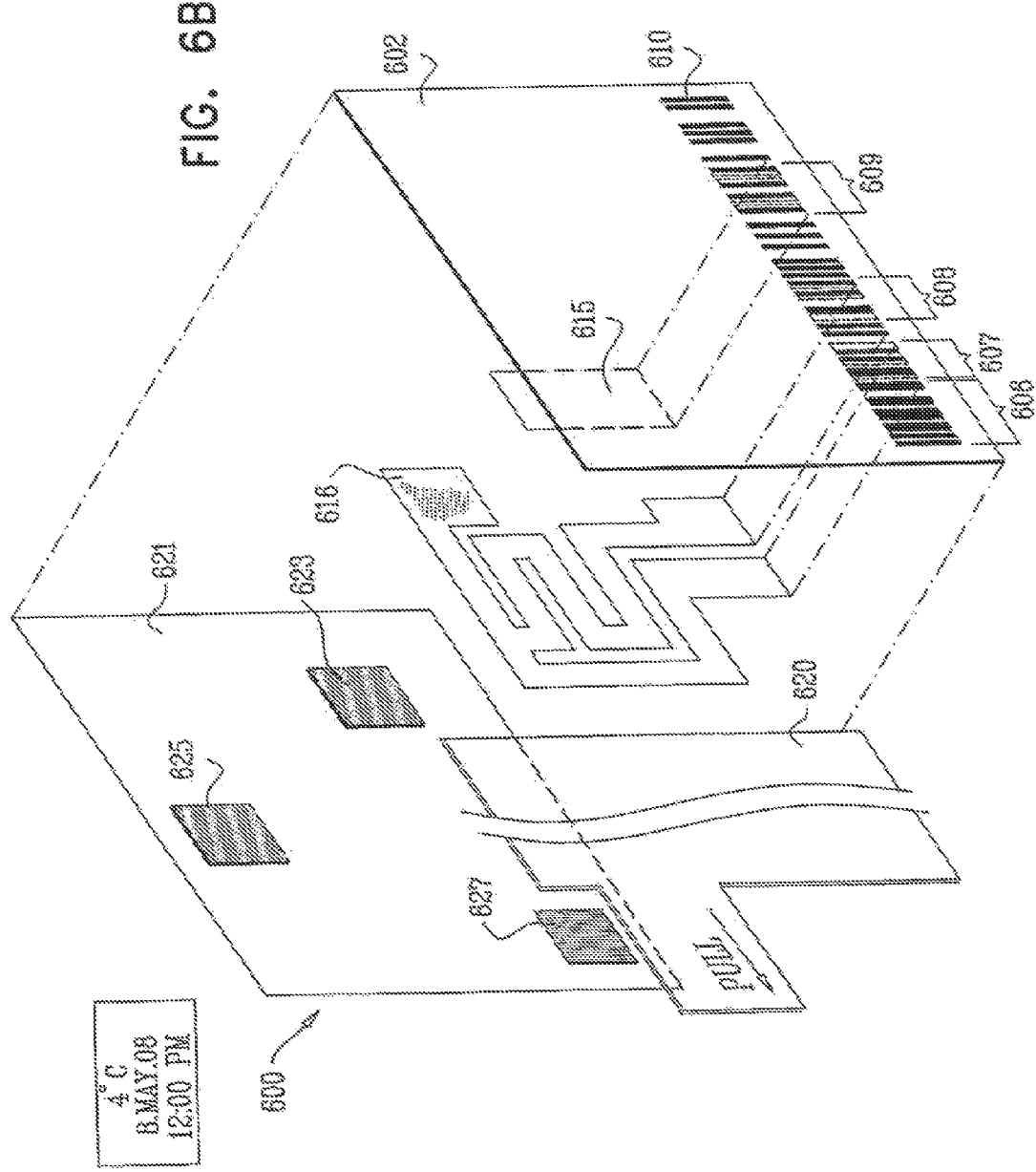

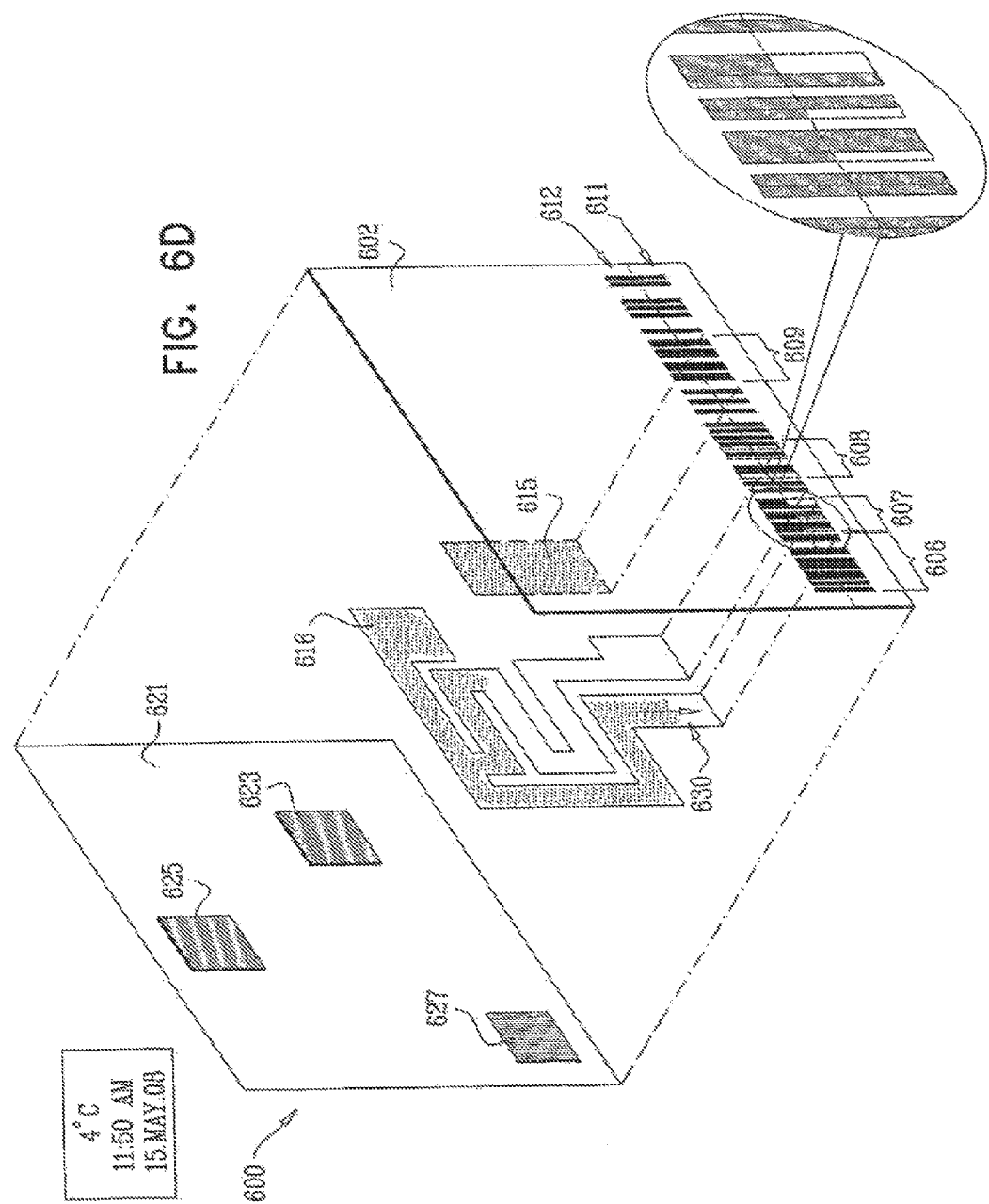

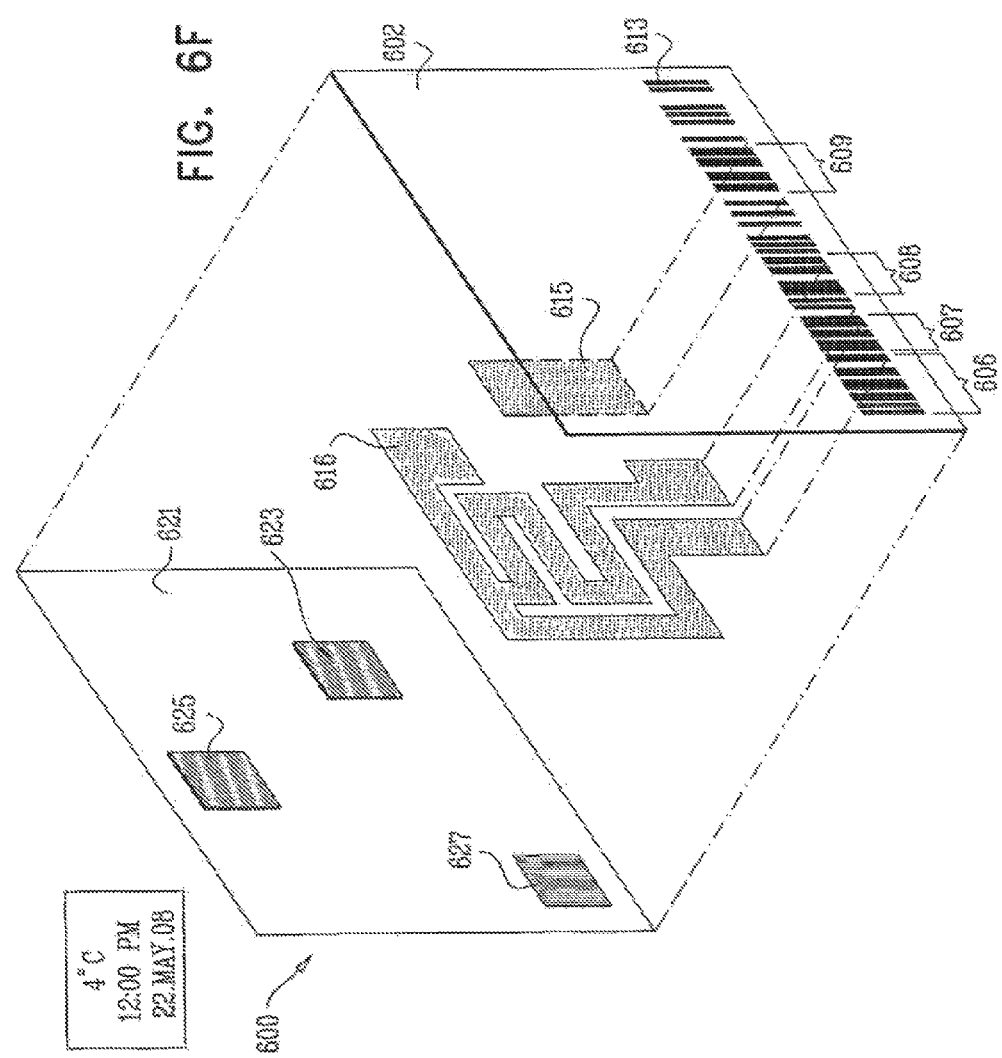

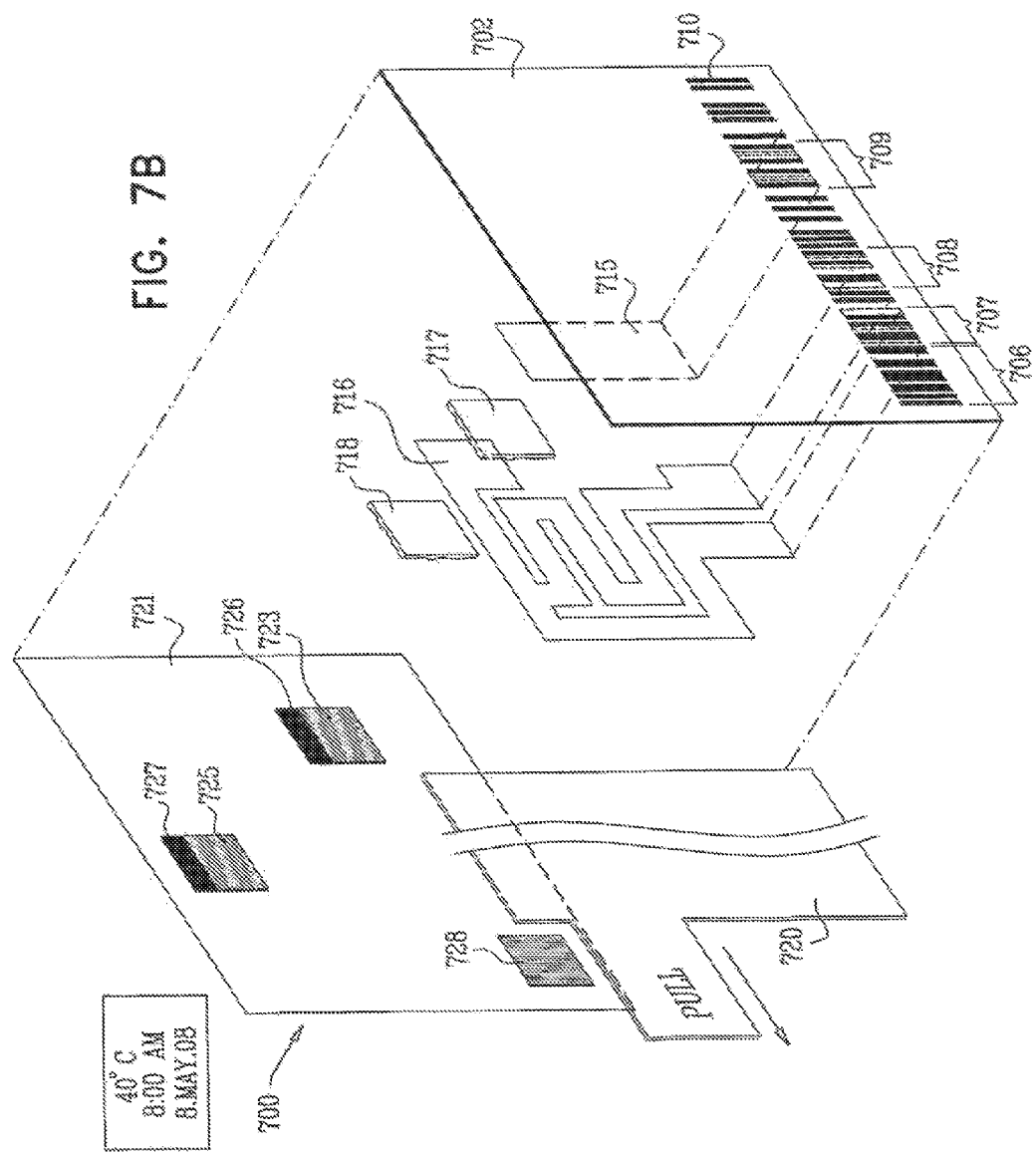

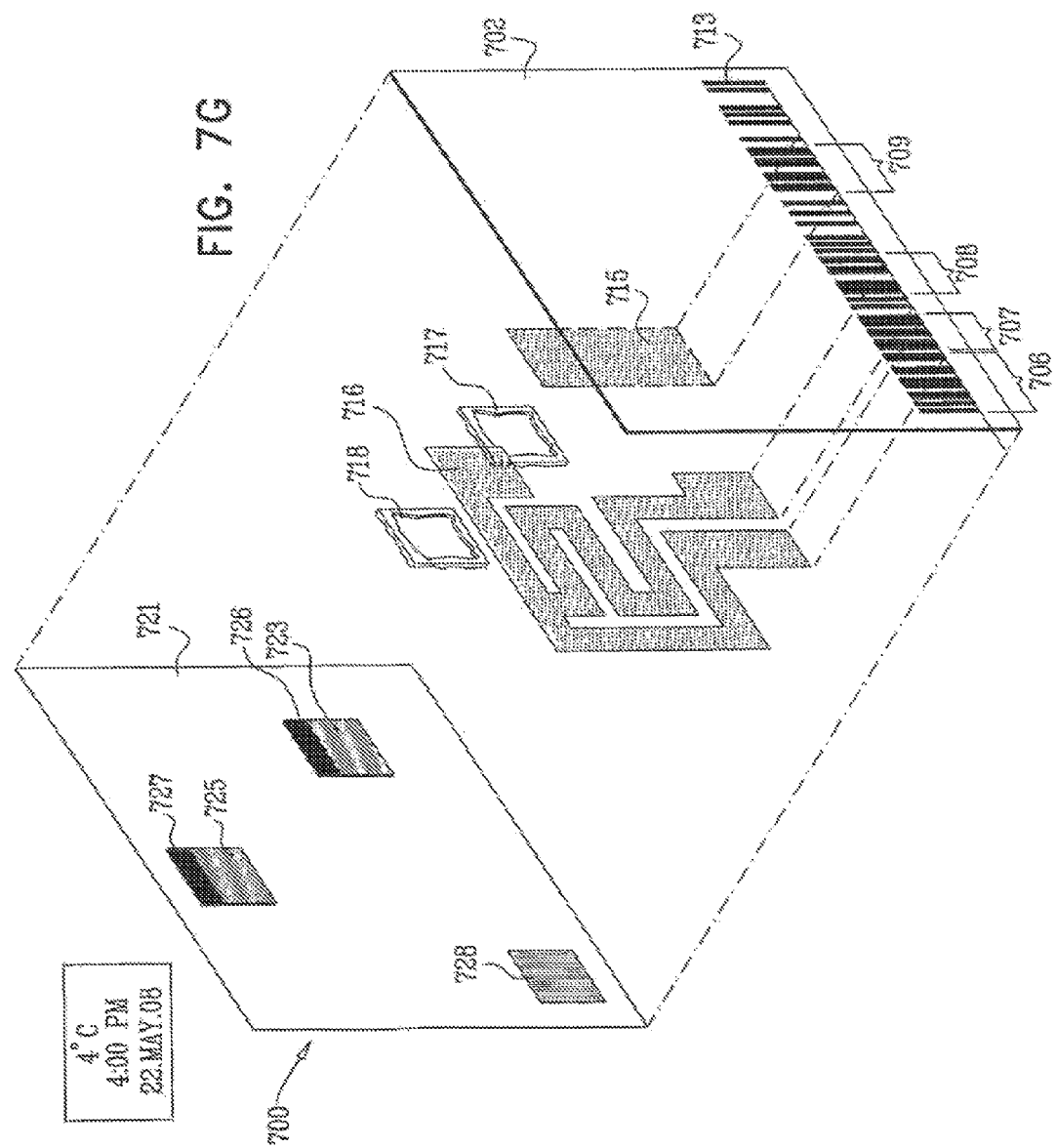

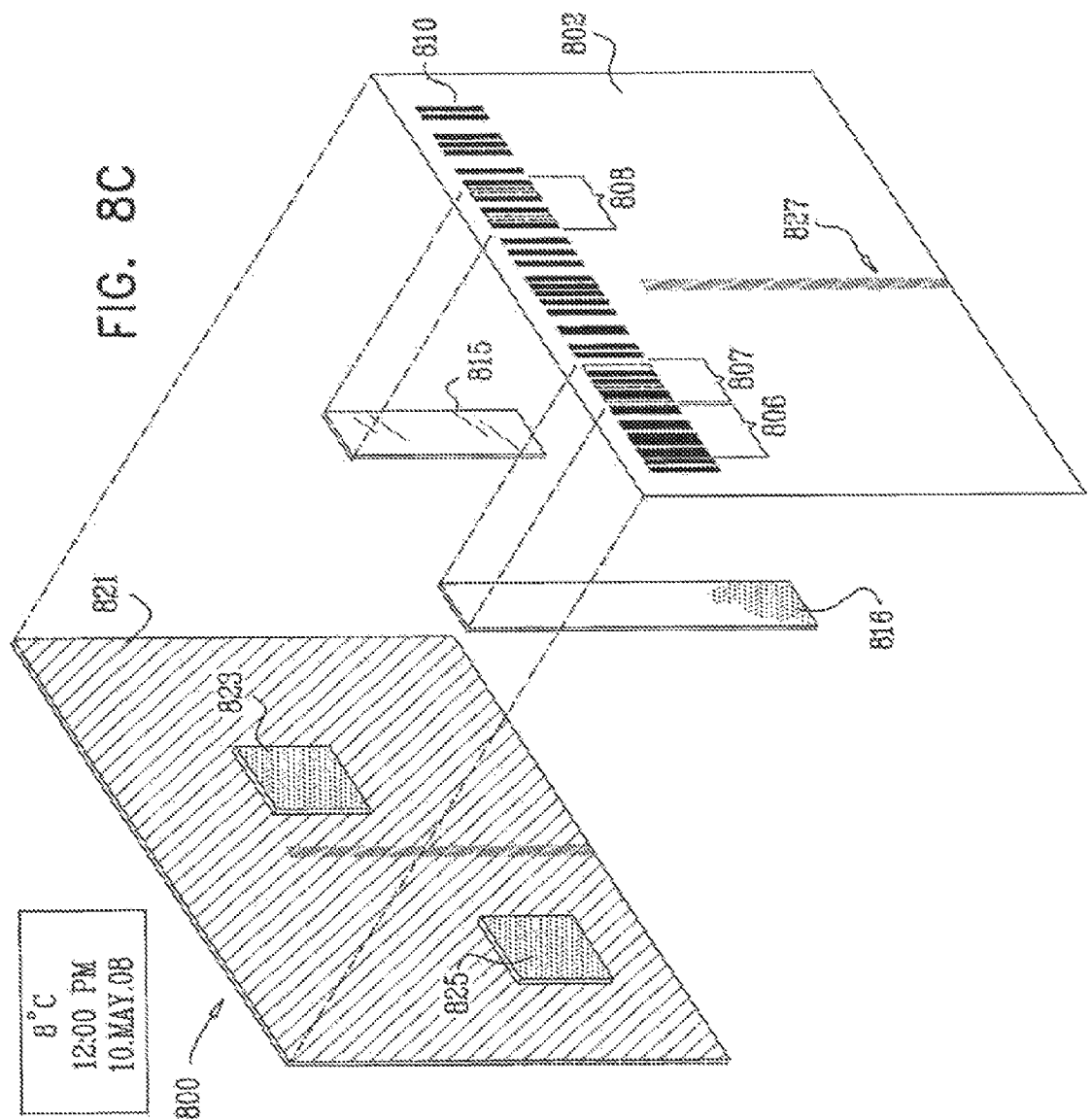

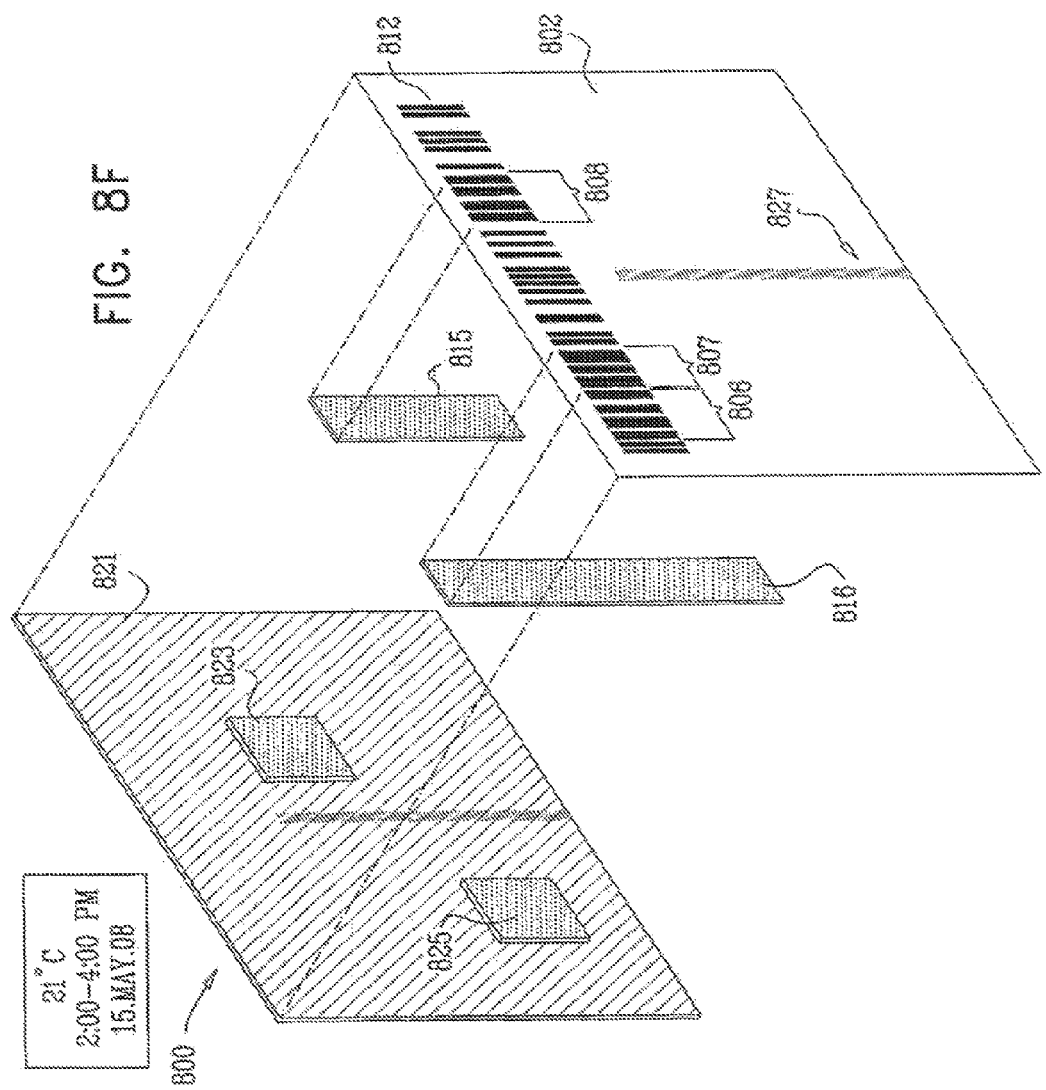

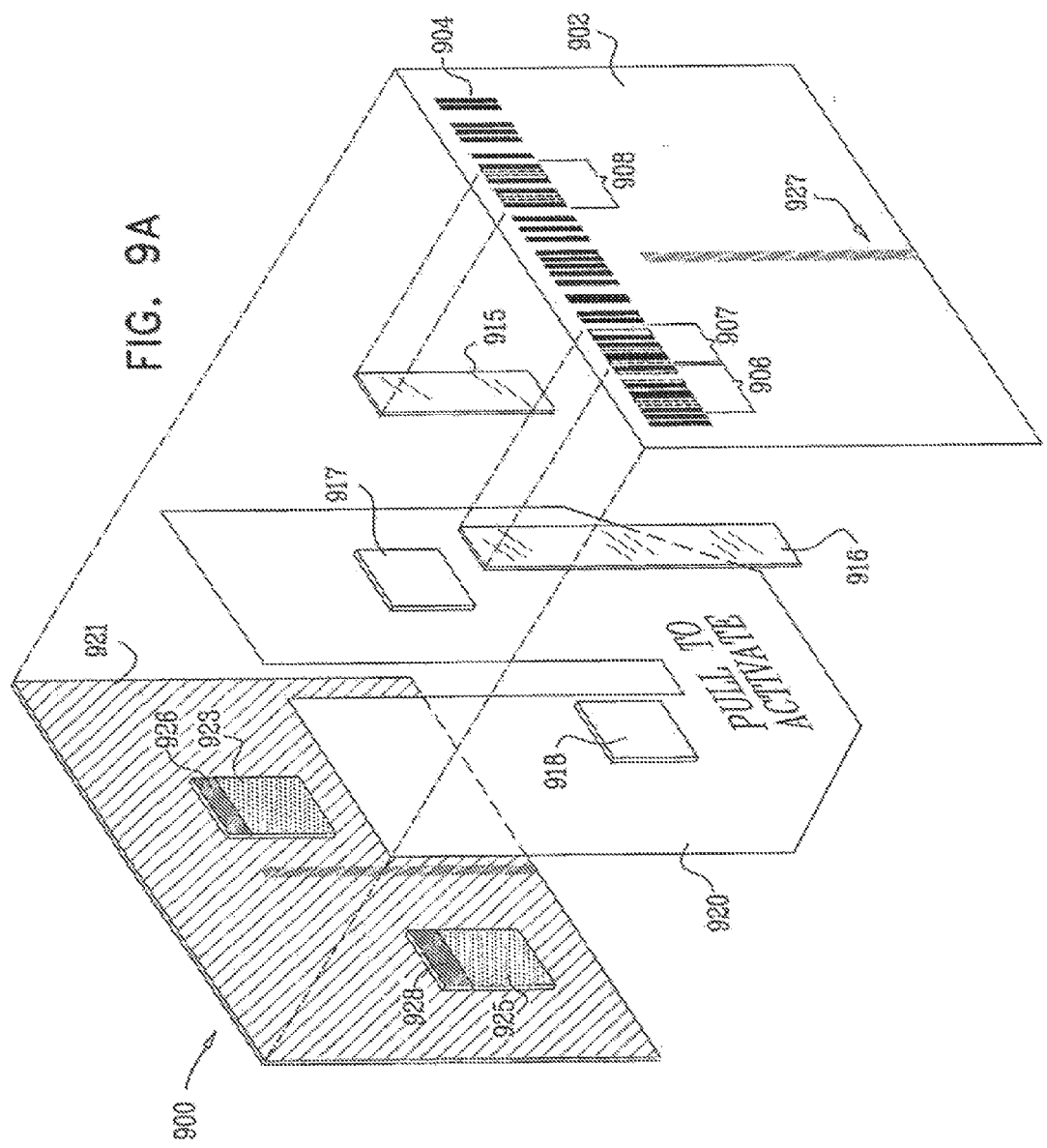

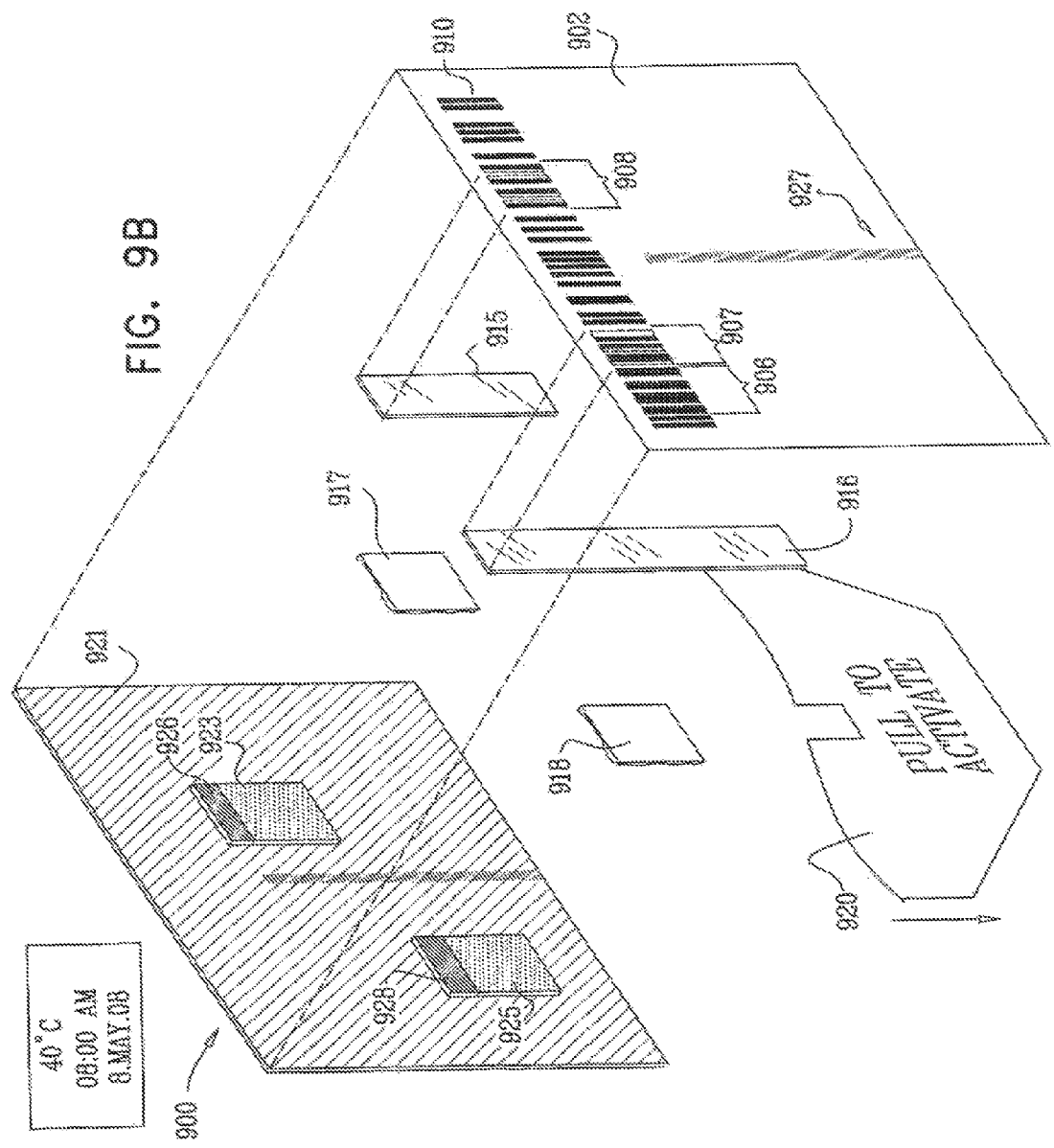

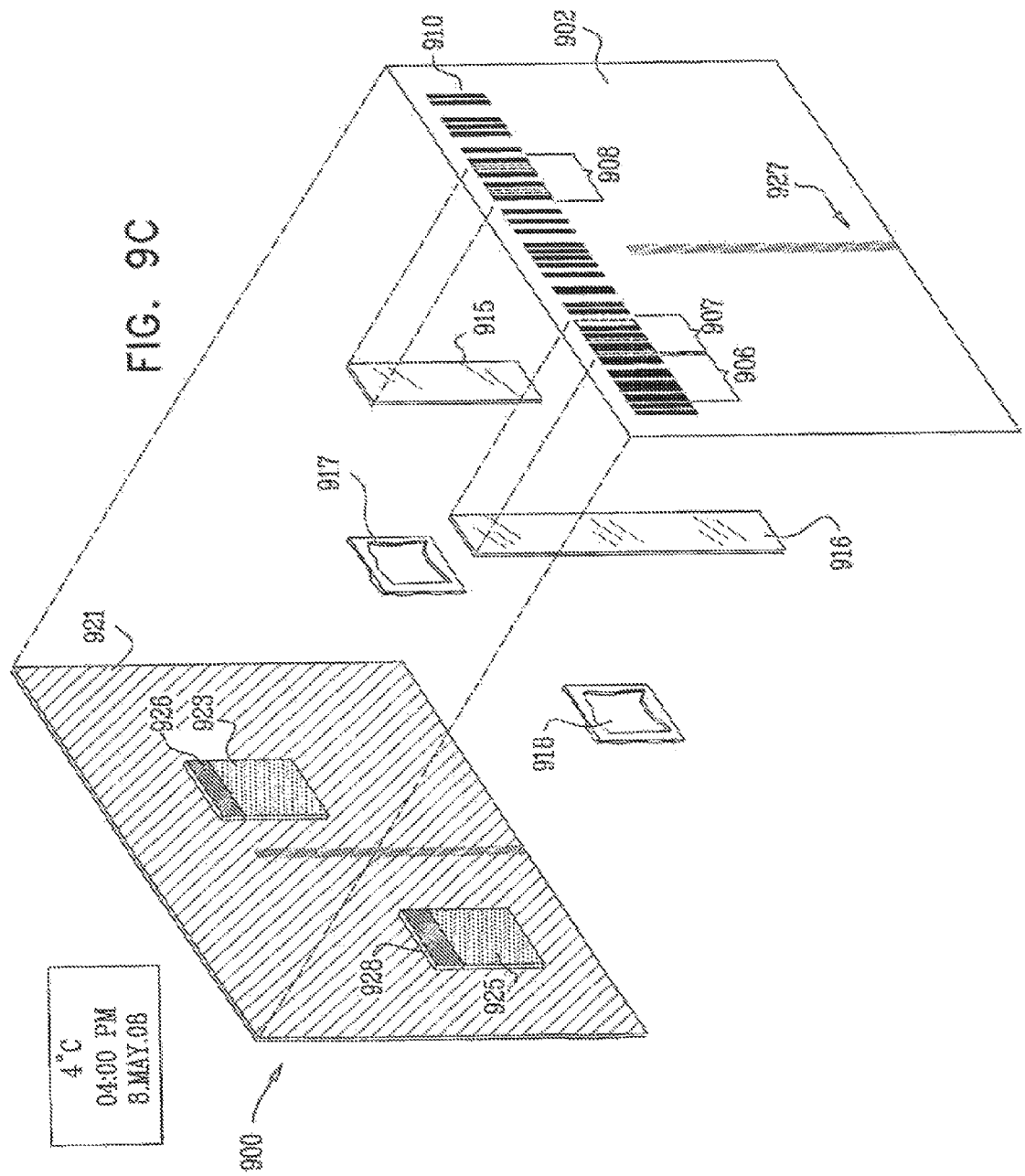

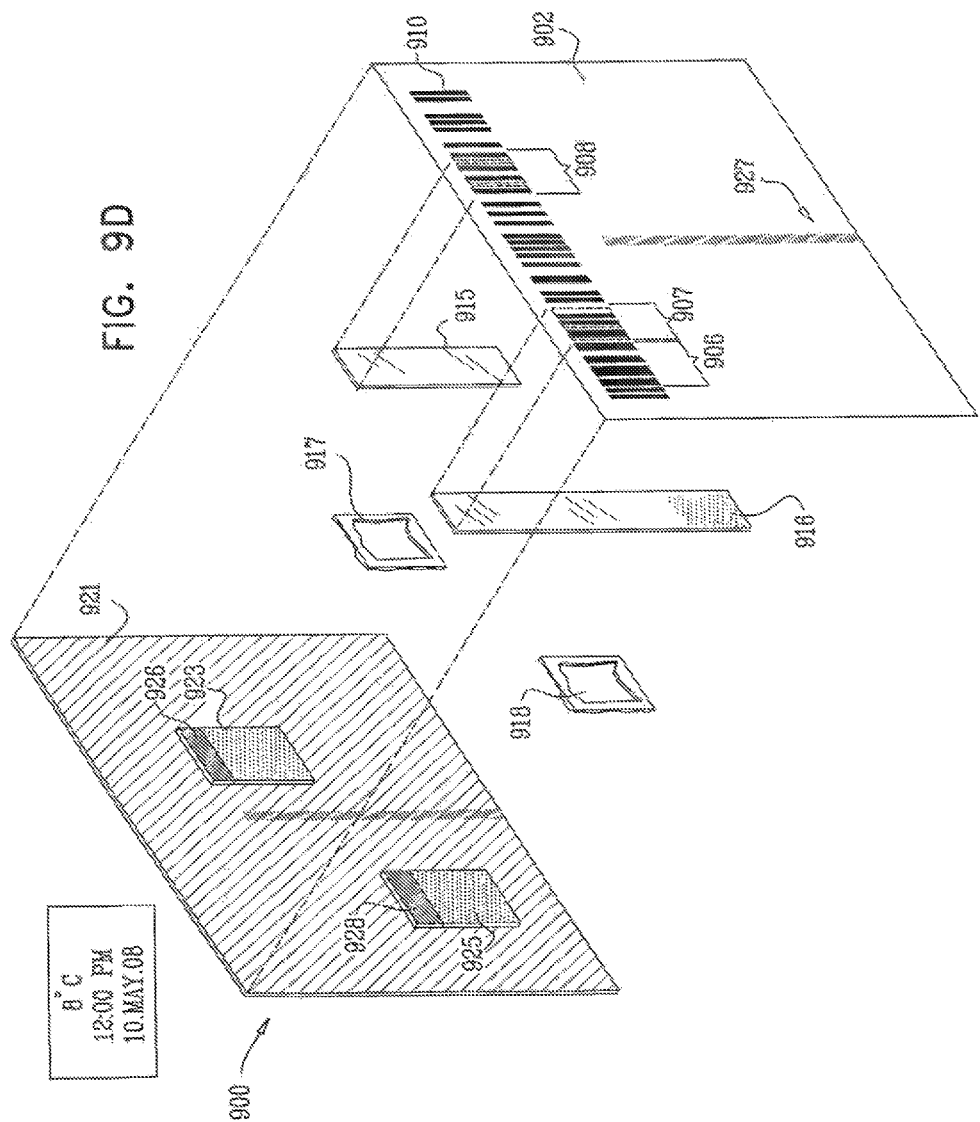

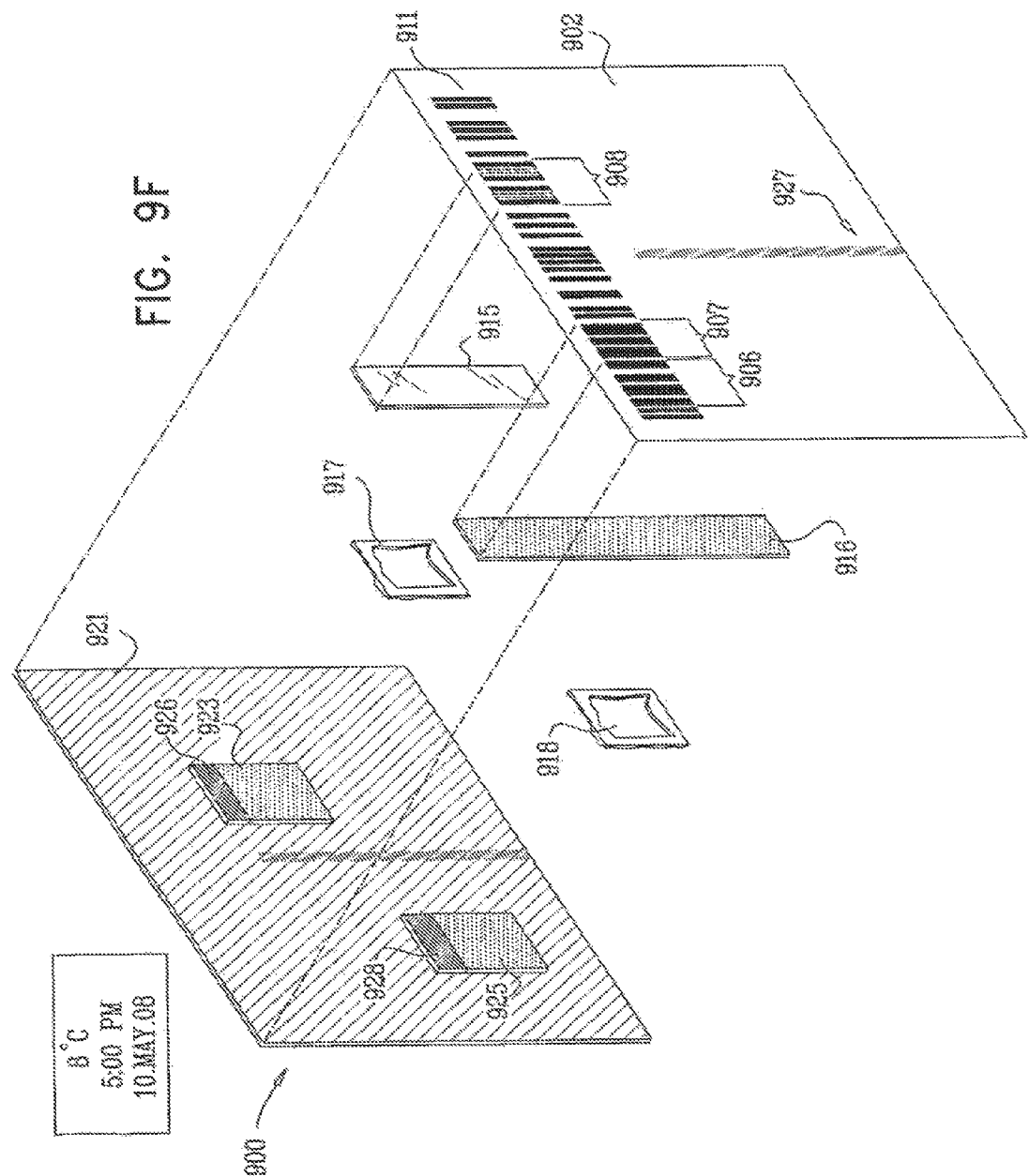

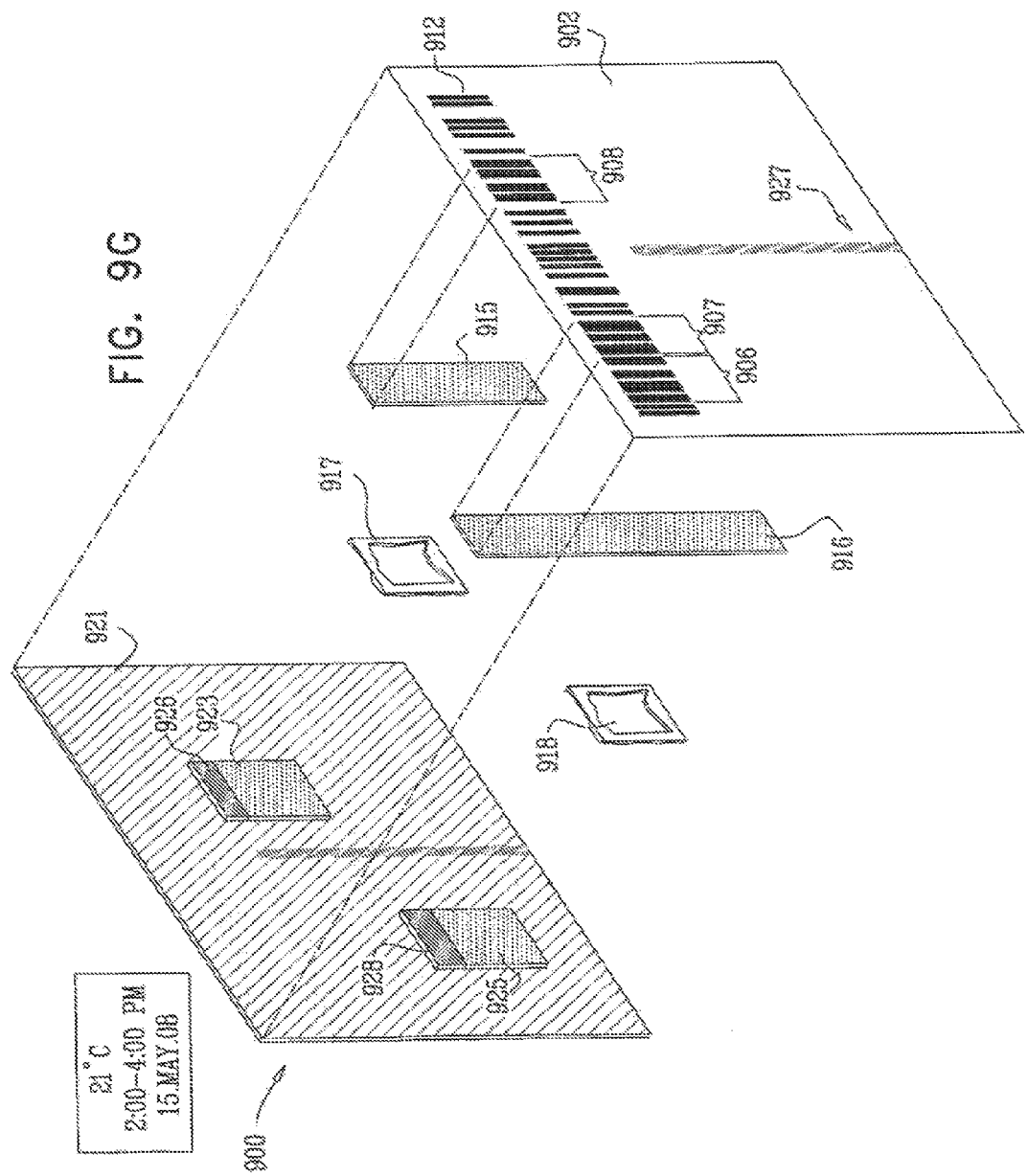

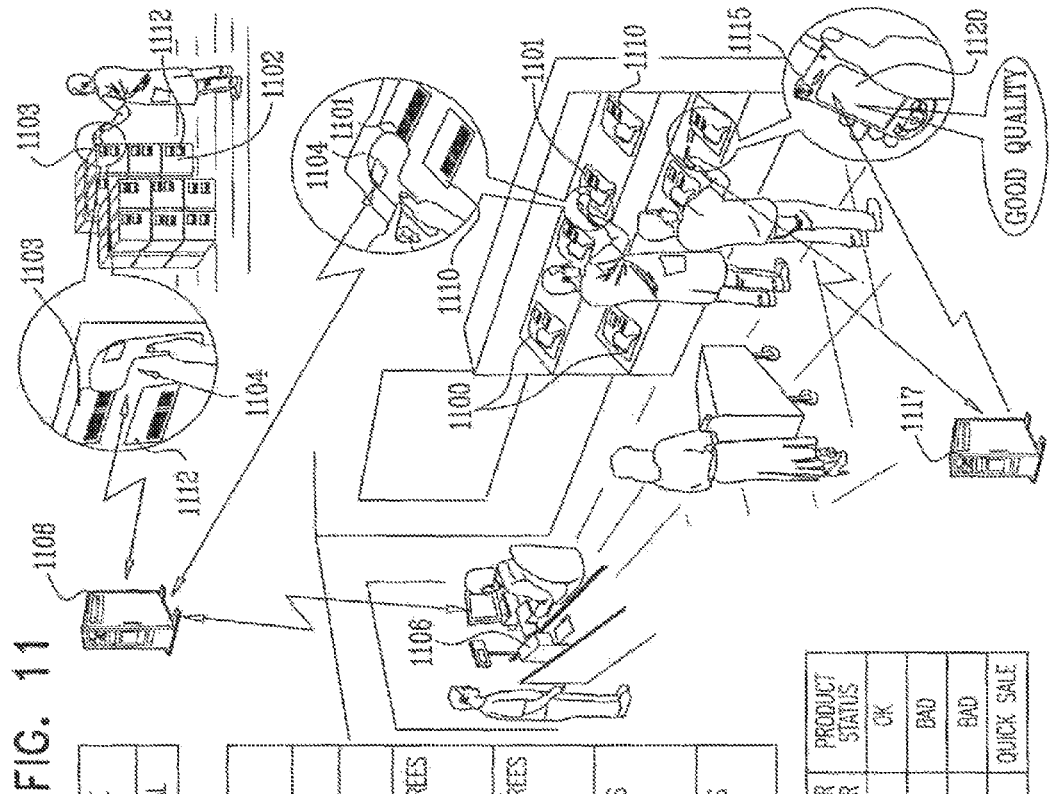

SYSTEM AND METHOD FOR QUALITY MANAGEMENT UTILIZING BARCODE INDICATORS

REFERENCE TO CO-PENDING APPLICATIONS

This application is a continuation of U.S. patent application Ser. No. 12/743,209, filed Aug. 23, 2010, entitled "SYSTEM AND METHOD FOR QUALITY MANAGEMENT UTILIZING BARCODE INDICATORS", now U.S. Pat. No. 8,500,014, which is a U.S. National Phase application under 35 U.S.C. §371 of International Patent Application No. PCT/IL2008/001495, filed Nov. 13, 2008, and claims the priority of U.S. Provisional Application No. 61/131,644, filed Jun. 10, 2008 and International Patent Application No. PCT/IL2007/001411, filed Nov. 14, 2007, all of which are incorporated by reference herein.

REFERENCE TO RELATED APPLICATIONS

Reference is made To PCT Parent Application No. PCT/IL07/000547, filed May 6, 2007 and entitled "A System And Method For Improved Quality Management In A Product Logistic Chain", PCT Patent Application No. PCT/IL07/01411, filed Nov. 14, 2007 and entitled "A System And Method for Qualify Management Utilizing Barcode Indicators", and U.S. Provisional Application No. 61/131,644, filed Jun. 10, 2008 and entitled "A System And Method For Quality Management Utilizing Barcode Indicators", the disclosures of which are hereby incorporated by reference.

Priority is hereby claimed under 37 CFR 1.78(a) (1) and (2)(i) from PCT Patent Application No. PCT/IL07/01411, filed Nov. 14, 2007 and entitled "A System And Method For Quality Management Utilizing Barcode Indicators", and filed 37 CFR 1.78(a) (4) and (5)(i) from U.S. Provisional Application No. 61/131,644, filed Jun. 10, 2008 and entitled "A System And Method For Quality Management Utilizing Barcode Indicators".

FIELD OF THE INVENTION

The present invention, relates to quality management systems and methodologies and to indicators useful in such systems and methodologies.

BACKGROUND OF THE INVENTION

The following U.S. Patents relate generally to the subject matter of the present application: U.S. Pat. Nos. 6,758,397; 6,009,400, 6,685,094 and RE39,226.

SUMMARY OF THE INVENTION

The present invention seeks to provide improved quality management systems and methodologies as well as indicators useful in such systems an methodologies. status outputs.

There is thus provided in accordance with a preferred embodiment of the present invention a quality management system for products including a multiplicity of barcoded quality indicators each operative to provide a machine-readable indication of exceedance of at least one threshold by at least one product quality affecting parameter, a barcode indicator reader operative to read the barcoded quality indicators and to provide output indications, the barcoded quality indicators being readable by the barcode indicator reader at all times after first becoming readable, including times prior to, during and immediately following exceedance of the at least one threshold by the least one product quality affecting parameter, and a product type responsive indication interpreter operative to receive the output indications and to provide human sensible, product quality status outputs.

Preferably, the barcoded quality indicators include linear barcodes.

Preferably, each of the multiplicity of barcoded quality indicators provides a first machine-readable indication prior to the exceedance of the least one threshold and a second machine-readable indication, different from the first machine-readable indication, following the exceedance of the at least one threshold. Additionally, the first and the second machine-readable indications have identical checksum digits and differ by two digits thereof and the first and the second machine-readable indications, have checksum integrity under an EAN/UPC checksum system. Alternatively, the first and the second machine-readable indications have different checksum digits and differ by at least one digit thereof and the first and the second machine-readable indications have checksum integrity under EAN/UPC checksum system. Additionally or alternatively, during exceedance of the threshold the barcoded quality indicators simultaneously provide two machine-readable indications, corresponding to the first machine-readable indication and to the second machine-readable indication.

Preferably the product type responsive indication interpreter is programmable to prefer an exceedance indication over a subsequently read non-exceedance indication for the same threshold.

Preferably, one of the at least one product quality affecting parameters is time.

Preferably, the quality indicators are operative to provide indications of exceedance of several different thresholds and an indication of exceedance may be provided for one threshold at a time when an indication of exceedance is not provided for another threshold.

Preferably, the quality indicators are operative to provide the machine-readable indication only following actuation thereof. Alternatively, the quality indicators are operative to provide the machine-readable indication only upon activation thereof which occurs automatically a predetermined time following manufacture or actuation thereof. Additionally, prior to the actuation the quality indicators are in a first visible state, and following the actuation the quality indicators may be in a second visible state, different from the first visible state, and the indicators are machine-readable at least in the second visible state. Additionally, the indicators are not machine-readable when the indicators are in the first visible state. Alternatively, the indicators are machine-readable when the indicators are in the first visible state.

Preferably, the product type responsive indication interpreter is further operative to receive an input in addition to the output indications, the input being necessary to provide quality, product quality status outputs. Additionally, the indication interpreter forms part off or is otherwise connected to a computer including a product status table useful to provide product quality status outputs based on the output indications and the input. Additionally, the input includes product-related parameters.

There is also provided in accordance with another preferred embodiment of the present invention a barcoded quality indicator operative to provide a machine-readable indication of exceedance of at least one threshold by at least one product quality affecting parameter, the barcoded quality indicator being readable by a barcode indicator reader at all times after first becoming readable, including times prior to, during and immediately following exceedance of the at least one threshold by the at least one product quality affecting parameter.

Preferably, the barcoded quality indicator includes linear barcodes.

Preferably, the barcoded quality indicator provides a first machine-readable indication prior to the exceedance of the at least one threshold and a second machine-readable indication, different from the first machine-readable indication, following the exceedance of the at least one threshold. Additionally, the first and the second machine-readable indications have identical checksum digits and differ by two digits thereof, and the first and the second machine-readable indications have checksum integrity under an EAN/UPC checksum system. Alternatively, the first and the second machine-readable indications have different checksum digits and differ by at least one digit thereof and the first and the second machine-readable indications have checksum integrity under an EAN/UPC checksum system. Additionally or alternatively, during exceedance of the threshold the barcoded quality indicator simultaneously provides two machine-readable indications, corresponding to the first machine-readable indication and to the second machine-readable indication.

Preferably, one of the at least one product quality affecting parameters is time.

There is additionally provided in accordance with yet another preferred embodiment of the present invention a method tor providing quality management for products including employing a multiplicity of barcoded quality indicators each operative to provide a machine-readable indication of exceedance of at least one threshold by at least one product quality affecting parameter, reading the barcoded quality indicators and providing output indications therefrom, the barcoded quality indicators being readable at all times after first becoming readable, including times prior to, during and immediately following exceedance of the at least one threshold by the at least one product quality affecting parameter, receiving the out put indications, and interpreting the output indications to provide human sensible, product quality status outputs.

Preferably, the barcoded quality indicators include linear barcodes.

Preferably, each of the multiplicity of barcoded quality indicators provides a first machine-readable indication prior to the exceedance of the at least one threshold and a second machine-readable indication, different from the first machine-readable indication, following the exceedance of the at least one threshold. Additionally, the first and the second machine-readable indications have identical checksum digits and differ by two digits thereof, and the first and the second machine-readable indications have checksum integrity under an EAN/UPC checksum system. Alternatively, the first and the second machine-readable indications have different checksum digits and differ by at least one digit thereof and the first and the second machine-readable indications have checksum integrity under an EAN/UPC checksum system. Additionally or alternatively, during exceedance of the threshold the barcoded quality indicators simultaneously provide two machine-readable indications, corresponding to the first machine-readable indication and to second machine-readable indication.

Preferably, one of the at least one product quality affecting parameters is time.

There is also provided in accordance with another preferred embodiment of the present invention a quality management system including a multiplicity of barcoded quality indicators each operative to provide a machine-readable indication of exceedance of at least one threshold by at least one product quality affecting parameter, each of the multiplicity of barcoded quality indicators including a barcode including black areas and transparent areas arranged along a barcode axis, at least one colorable element at least partially underlying the transparent areas, and at least one coloring agent adapted to color the at least one colorable element in response so to exceedance of the at least one threshold, the at least one coloring agent passing along a pathway to the at least one colorable element in a time corresponding to the threshold, the pathway being configured such that the coloring agent progressively colors the colorable element in a direction generally perpendicular with respect to the barcode axis, thereby enabling the barcode to be readable while the colorable element is being progressively colored.

Preferably, the barcoded quality indicators include linear barcodes.

Preferably, each of the multiplicity of barcoded quality indicators provides a first machine-readable indication prior to the exceedance of the at least one threshold and a second machine-readable indication, different from the first machine-readable indication, following the exceedance of the at least one threshold. Additionally, during exceedance of the threshold the barcoded quality indicators simultaneously provide two machine-readable indications, corresponding to the first machine-readable indication and to the second machine-readable indication. Additionally, during exceedance of the threshold fee. coloring agent colors parts of the colorable element such that the first machine-readable indication is provided by portions of the transparent areas lying above areas of the. colorable element not colored by the coloring agent read together with areas of the barcode not lying above the colorable element., and the second machine-readable indication is provided by portions of the transparent areas being above areas of the colorable element colored by the coloring agent mad together with areas of the barcode not lying above the colorable element.

Additionally or alternatively, each of the multiplicity of quality indicators further includes a pull strip, the pull strip being suitable to prevent the passage of solvents and coloring agents therethrough before removal thereof and removal of the pull strip actuates the indicators.

Preferably, each of the multiplicity of quality indicators further includes an activation delay layer dissolvable by a solvent, the activation delay layer being suitable to prevent the passage of coloring agents and solvents therethrough, before dissolution thereof and the indicators are not activated until dissolution of the delay layer.

There is additionally provided in accordance with yet another preferred embodiment of the present invention a quality management system for products including a first multiplicity of individual package specific barcoded quality indicators each operative to provide a machine-readable indication or exceedance of at least one threshold by at least one product quality affecting parameter of an individual package, a second multiplicity of outer package specific barcoded quality indicators each operative to provide a machine-readable indication of exceedance of at least one threshold by at least one product quality affecting parameter of an outer package containing a plurality of the individual packages, a barcode indicator reader operative to read the indicators read to provide output indications, and a product type responsive indication interpreter operative to receive the output indications and to provide human sensible, product quality status outputs.

Preferably, the individual package specific barcoded quality indicators and the outer package specific barcoded quality indicator include, linear barcodes.

Preferably, the outer package specific indicators indicate the exceedance of thresholds which correspond to the thresholds for which indication of exceedance is provided by the individual package specific indicators. Additionally, indication of exceedance may be provided by the outer package specific indicators associated with outer packages even when indication of exceedance is not provided by the individual package specific indicators attached to the Individual packages contained therein. Additionally, indication of exceedance is not provided by the individual package specific indicators associated with individual packages if an indication of exceedance was not provided by the outer package specific indicators associated with the outer packages combining them. Alternatively, the thresholds for which indication of exceedance is provided by the outer package specific indicators correspond to an operative range different from the operative range to which the thresholds for which indication of exceedance is provided by the individual package specific indicators correspond.

BRIEF DESCRIPTION OF THE DRAWINGS

The present invention will be understood and appreciated more fully from the following detailed description, taken in conjunction with the drawings in which:

FIGS. 1A-1F together are a simplified illustration of a system and methodology for quality management constructed and operative in accordance with a preferred embodiment of the present invention:

FIGS. 2A-2F together are a simplified illustration of a system and methodology for quality management constructed and operative in accordance with another preferred embodiment of the present invention;

FIG. 3A is a simplified illustration of a quality indicator constructed and operative in accordance with a. preferred embodiment of the present invention for indicating elapsed time in temperature history;

FIG. 3B is a simplified illustration of a quality indicator constructed and operative in accordance with another preferred embodiment of the present invention for indicating elapsed time in temperature history with delayed activation;

FIG. 3C is a simplified illustration of a quality indicator constructed and operative in accordance with another preferred embodiment of the present invention for separately indicating elapsed time and temperature history;

FIG. 3D is a simplified illustration of a quality indicator constructed and operative in accordance with another preferred embodiment of the present invention for indicating elapsed time and temperature history with delayed activation;

FIGS. 4A-4H together are a simplified illustration of the structure and operation of an example of the quality indicator of FIG. 3A, in accordance with a preferred embodiment of the present invention;

FIGS. 5A-5F together are a simplified illustration of the structure and operation of an example of the quality indicator of FIG. 3B, in accordance with a preferred embodiment of the present invention;

FIGS. 6A-6F together are a simplified illustration or the structure and operation of an example of the quality indicator of FIG. 3C, in accordance with a preferred embodiment of the present invention;

FIGS. 7A-7G together are a simplified illustration of the structure and operation of an example of the quality indicator of FIG. 3D, in accordance with a preferred embodiment of the present invention;

FIGS. 8A-8F together are a simplified illustration of the structure and operation of an example of a quality indicator, in accordance with a preferred embodiment of the present invention for indicating elapsed time in temperature history;

FIGS. 9A-9G together are a simplified illustration of the structure and operation of an example of a quality indicator, in accordance with another preferred embodiment of the present invention for indicating elapsed time in temperature history with delayed activation;

FIG. 11 is a simplified illustration of the structure and operation of a quality management system constructed and operative in accordance with a preferred embodiment of the present invention in the context of a supermarket.

DETAILED DESCRIPTION OF PREFERRED EMBODIMENTS

Figure 1B:
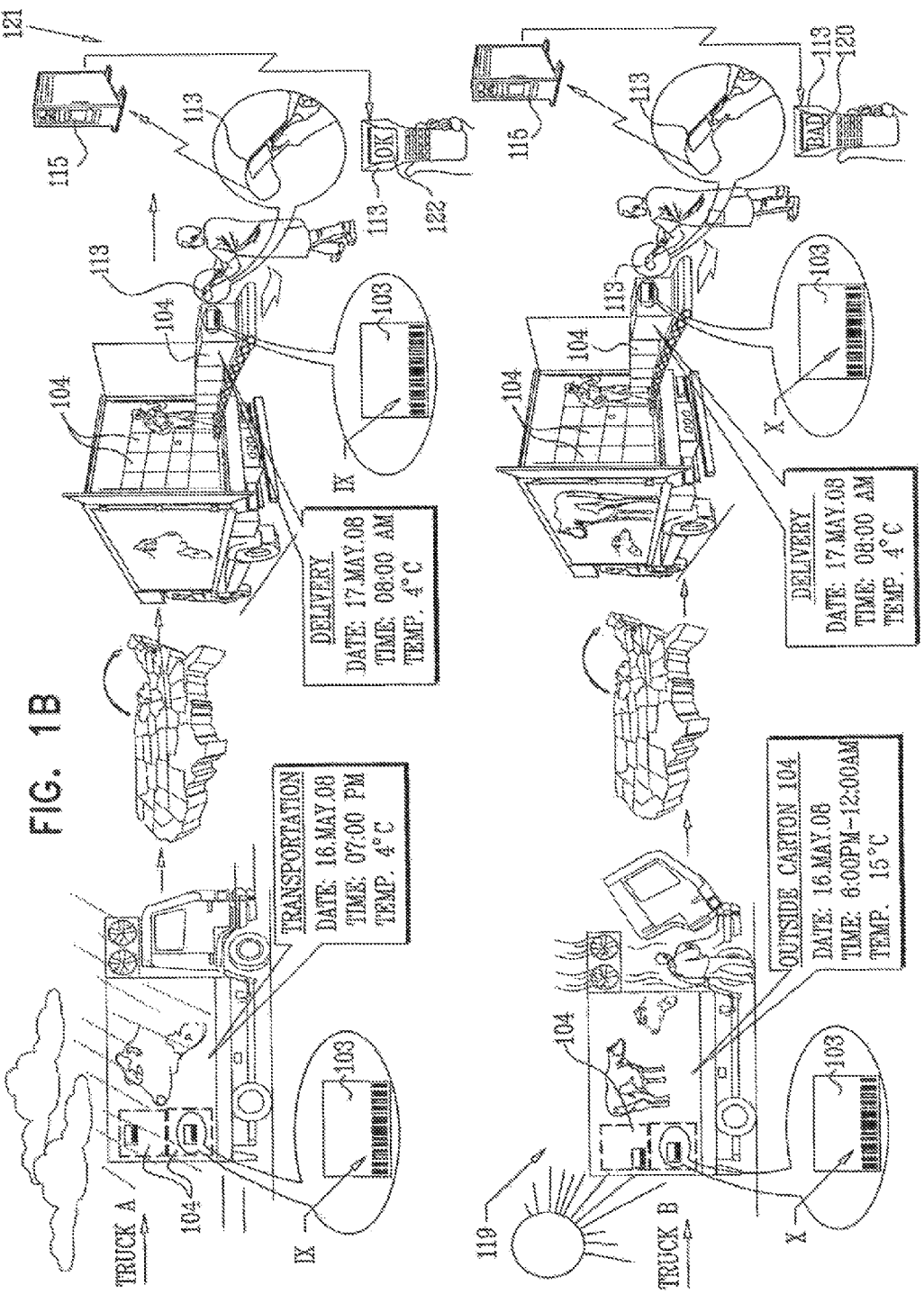

Reference is now made to FIGS. 1A-1F which together are a simplified Illustration of a system and methodology for quality management constructed and operative in accordance with a preferred embodiment of the present invention. As seen in FIGS. 1A-1F, there is shown a quality management system and methodology for products including a multiplicity of quality indicators, here shown in the form of changeable barcode indicators, each operative to provide a machine-readable, preferably barcode-reader-readable, indication of exceedance of at least one threshold by at least one product quality affecting parameter, at least one indicator reader operative to read the quality indicators and to provide output indications and a product type responsive indication interpreter operative to receive the output indications and to provide human sensible, product quality states outputs.

Preferably, as elaborated hereinbelow with reference to FIG. 11, in addition to receiving the output indications provided by the Indicator reader the indication interpreter may also receive product-related parameters such as product type, for example "meat", and product manufacturing date. Additionally or alternatively, the indication interpreter may receive other parameters, for example information relating to the quality indicator, such as the range of parameters sensed by the quality indicator, when the quality indicator was actuated, and whether the quality indicator includes a delayed activation feature. Additionally or alternatively, the indication interpreter may also received parameters relating to the source of the output indications provided, for example, whether the output indications were provided by a hand held device during inspection, or by the checkout scanner of a retail store.

The product-related parameters and the other parameters, such as those relating to the quality indicator may be provided by the quality indicator itself or by an additional, separate indicator, such as a barcode-bearing indicator. As a further alternative, these parameters may be provided by sensors, a priori information otherwise available to the indication interpreter or by manual entry.

The indication interpreter preferably forms part of or is otherwise connected to a quality indication computer, which may be remote from the indicator reader and which preferably includes a decision table providing product quality status outputs baaed on the output indications provided by the indicator reader and the additional parameters.

It is appreciated that the additional parameters may be provided via another part of the same barcode or by another barcode associated with the same product. Alternatively, the additional parameters may be provided by other methods, such as using RFID technology.

The term "barcode" is used herein to refer to a machine readable optical code. In the examples in the specification, linear, or one-dimensional bar codes are illustrated. It is appreciated that the invention may be applicable to two dimensional bar codes as well.

The quality indicator may incorporate a product code such a an EAN (European Article Number) or a UPC code (Universal Product Code). The examples shown in the description which follows all illustrate the use of an EAN code. Alternatively, the quality indicator may incorporate a 2 of 5 interleaved barcode or any other suitable barcode or machine-readable methodology.

Preferably, the quality indicator is operative to provide a machine-readable indication of exceedance of at least one threshold by at least one product quality affecting parameter. In a preferred embodiment the quality indicator provides a variable barcode having a fixed barcode portion and at least one selectably appearing barcode portion, both the fixed barcode portion and the combination of the fixed barcode portion and at least one selectably appearing barcode portion having barcode checksum integrity when read by a conventional barcode reader. Accordingly, it is appreciated that the selectably appearing barcode portion includes at least two digits which are different from those in the fixed barcode portion. The checksum is not necessarily changed. The checksum digit may be part of the fixed barcode portion or part of the selectably appearing barcode portion.

It is appreciated that in order to maintain checksum integrity under an EAN/UPC checksum system a barcode can be changed into another barcode by replacing at least two digits thereof, one of which may be the checksum digit. Each pair of digits can be replaced by another pair of digits where MOD10 of the weighted sum of both pairs is the same. For example, two adjacent digits in an EAN barcode, A1 in an even position and A2 in an odd position, may be replaced by two digits B1 and B2 such that $MOD10(3 \times A1+A2)=MOD10(3 \times B1+B2)$. If, for example, the pair (A1, A2) is (4, 3) then (B1, B2) may be (8, 1), because MOD10 of the weighted sum in both cases is 5. In the embodiments illustrated in this application a digit is replaced by another digit only by printing additional bar widths. Accordingly, the possible replacements which can be made by adding bar widths are provided in Table 1.

TABLE I

| Digit in barcode before change | Possible replacements according to location of digit | | |
|---|---|---|---|
| | Left hand encoding | | Right hand encoding |
| | Odd parity | Even parity | All characters |
| 0 | 3, 6 | none | none |
| 1 | 3, 7 | none | none |
| 2 | 7, 8 | none | none |
| 3 | none | 0, 1, 5 | 0, 1, 5 |
| 4 | 6, 7, 8 | none | none |
| 5 | 3, 7, 8 | none | none |
| 6 | none | 0, 4, 9 | 0, 4, 9 |
| 7 | none | 1, 2, 4, 5, 9 | 1, 2, 4, 5, 9 |
| 8 | none | 2, 4, 5 | 2, 4, 5 |
| 9 | 6, 7 | none | none |

It us appreciated that the odd parity or the even parity of a digit is defined in accordance with the EAN (European Article Number) standard.

It is also appreciated that a digit can also be replaced with another digit by deleting bar widths.

According to a preferred embodiment of the present invention, the quality indicator provides a variable barcode having a visible pre-actuation state, a different visible post-actuation state and at least one visible state indicating exceedance of a corresponding one of at least one threshold. The various states are preferably all machine-readable by a conventional barcode reader. However one or more of the states may not be machine-readable by the conventional barcode reader and the fact that they cannot be read provides status information. For example, various situations in which a product is not to be sold or used may be indicated a non-readable states of the quality indicator.

Turning now to FIGS. 1A-1F, the present invention is illustrated in the context of a typical application, here a meat processing plant. A barcoded quality indicator 100 is attached to or otherwise incorporated into each package 101 of processed meat. A package bearing a barcoded quality indicator 100 is typically an individual package suitable for retail sale.

In accordance with a preferred embodiment of the present invention, the quality indicators 100 may be assembled and/or actuated at the same location or at a location adjacent that at which the quality indicators 100 are associated with packages 101. A suitable indicator assembler is indicated by reference numeral 102. It is appreciated that indicator assembler 102 may be associated with an automatic actuator. It is further appreciated that the actuator may be automatic and may actuate the quality indicator after it has been produced by indicator assembler 102.

As seen in FIG. 1A, additional barcoded quality indicators 103, which are preferably: different from the quality indicators 100, are attached to or otherwise incorporated into cartons 104 containing package 101 of processed meat bearing quality indicators 100:. Preferably, the quality indicators 103 are assembled by an indicator assembler 105 which is similar the quality indicator assembler 102, but is placed at a location which is different from the location of the quality indicator assembler 102. Alternatively, the quality indicators 103 may fee assembled by the quality indicator assemble 102.

Different types of indicators may be employed for different types of packages. For example, the quality indicator used on a canon containing a plurality of individual packages may be more or less accurate or have a greater or lesser dynamic range of indications than the quality indicator used on an individual package. The dynamic range of an indicator may be a greater or lesser range of tempera turns and/or of times. Additionally or alternatively, the quality indicator on a carton may include an indicator capable of indicating exceedance of additional thresholds, not included in the quality indicators of individual packages contained thereby, or fewer thresholds than the quality indicators of individual package contained therein.

In the illustrated embodiment, the quality indicators include an EAN (European Article Number) barcode. The quality indicators 100 are preferably Constructed to be actuatable by pulling a pull strip 106 forming part thereof, as indicated by reference numeral 107. In the illustrated embodiment, the quality indicators 100 preferably have a visible pre-actuation state I, a different visible post-actuation state II and a visible state III indicating exceedance of a predetermined temperature for example 21 degrees Celsius, for at least a predetermined cumulative amount of time, for example one hour, as seen at reference numeral 125 in FIG.

1C. The quality indicators 100 preferably also have an additional visible state IV, indicating the elapse of a predetermined amount of time since manufacture or other actuation of the quality indicator, for example one week, regardless of the temperature, as seen at reference numeral 134 in FIG. 1C, and an additional visible state V, indicating the elapse of an additional amount of time, for example another week, regardless of the temperature, as seen at reference numeral 138 in FIG. 1D. The quality indictors 100 can have yet a further visible state VI, indicating the exceedance of a predetermined temperature for a short predetermined duration, for example the exceedance of 40 degrees Celsius for at least thirty minutes, as seen in FIG. 1E, and another visible state VII, indicting the elapse of one year since manufacture or other actuation of the quality indicator regardless of temperature, as seen in FIG. 1F.

The visible states are readable by a barcode reader. For example, in this illustrated embodiment, the pre-actuation state I is read as 7431348787736, the post-actuation state II is read as 7811348787736, the visible state III is read as 7811348782236, the visible state IV is read as 7817548787736, the visible state V is read as 7817562787736, the visible state VI is read as 7811348787750 and the visible state VII is read as 7817562927736. It is appreciated that additional states of the quality indicator not presented in the illustrated embodiment may be indicated by combinations of the states described above. For example, when the temperature of the quality indicator exceeds 40 degrees Celsius for at least one hour it also exceeds 25 degrees Celsius for at least one hour, which causes the quality indicator to assume the visible state III. However, the temperature in this case also exceeds 40 degrees for at least 30 minutes, which, causes the quality indicator to assume the visible state VI. Therefore, this Combined exceedance is indicated by a visible state which combines the visible state III and the visible state VI, and is read by a barcode reader as 7811348782250. It is further appreciated that the various visible states may occur in any suitable order and not necessarily in the order indicated by their numbering.

As further seen in FIG. 1A, the quality indicators 103 are preferably constructed to be actuatable by pulling pull strip 108 forming part thereof, as indicated by reference numeral 109. In the illustrated embodiment, the indicators 103 preferably have a visible pre-actuation state VIII, readable by a barcode reader typically as 7431348787750. The indicators 103 preferably have a visible post-actuation state IX which is different from pre-actuation state VIII and is readable by a barcode reader typically as 7437548787750. The indicators 103 preferably also have an additional at least one visible state X as seen, for example, at reference numeral 110 in FIG. 1A and at reference numeral 119 in FIG. 1B, indicating exceedance of a predetermined temperature, for example 12 degrees Celsius, for at least a predetermined cumulative amount of time, for example five hours. This further visible state is readable by a barcode reader typically as 7437548782250.

Alternatively, any of the visible states VIII, IX and X of the quality indicators 103 may be associated with barcodes which are the same as barcodes associated with states of the quality indicators 100. If the same barcode is associated with states of both types of indicators, then the identity of the quality indicator read by a barcode reader is provided to the indication interpreter by another method, for example by a manual entry to the database.

It is appreciated that the predetermined temperatures and the predetermined cumulative amounts of time may be selected as appropriate for a given application.

It is appreciated that as long as the temperature of the packages 101 does not exceed a predetermined temperature at least a predetermined total amount of time, for example 21 degrees Celsius for one hour, and one week has not elapsed since manufacture or other actuation of the quality indicators, indicators 100 remain in the visible state II.

As seen in FIG. 1A, as long as the temperature of the cartons 104 does not exceed a predetermined temperature for at least a predetermined total amount of time, for example 12 degrees Celsius for five hours, the quality indicators 103 remain in the visible state IX.

As further seen in FIG. 1A, if during loading of truck A as indicated by reference numeral 110, the temperature on the outside of one or more cartons 104 is at least 30 degrees Celsius for a period of five and a half hours, which is more then the predetermined total amount of time of five hours, the corresponding indicators 103 assume the further visible state X. This further visible state X does not revert to the visible state IX notwithstanding that the temperature of the carton 104 subsequently drops below the predetermined temperature. These cartons, when received by the customer, will be subject to inspection to determine whether the temperature of the packages 101 inside the cartons 104 exceeded predetermined time and temperature thresholds.

Accordingly, upon inspection, as upon delivery, the quality indicators 103 attached to the cartons 104 which were exposed to a temperature of at least 30 degrees Celsius for a period of five and a half hours may be read by an inspector using a conventional barcode reader 113. The barcode in its visible state X preferably provides information to the quality indication computer 115 which enables the indication interpreter forming part thereof to provide an immediate indication of a quality status, such as a BAD indication 116. This BAD indications 116 indicates that at some time in the history or the quality indicator 103, the carton 104 to which It was attached was at least at the predetermined temperature for at least a predetermined total amount of time and that this event may have rendered one or more of the products in carton 104 unacceptable for sale.

Should the quality indicator 103 be in the visible state VIII, indicating that proper actuation of the quality indicator 103 did not occur, a NON-ACTUATED indication or a BAD indication 116 may be provided to an inspector or other interested party.

It is appreciated that until the cartons 104 are opened, which normally occurs only upon delivery, it is impractical to visually inspect the indicators 100 which are attached to the individual packages 101 inside the cartons 104. Depending on the circumstances, the temperature of the individual packages 101 within a carton 104 may or may not have exceeded 21 degrees Celsius for one hour and the indicators 100 which are attached to the packages 101 may or may not be in the further visible state III. This normally can only be seen upon opening the cartons 104 as shown in FIG. 1C.

It is a particular feature of the present invention that the time and temperature thresholds of the quality Indicators 100 and 103, placed on the individual packages and the cartons containing them respectively, are preferably related in order to provide highly effective cold chain management. It is preferable that indicators 103 provide a time in temperature warning even if, upon inspection, the indicators 100 show that the individual packages 101 have not experienced unacceptable temperatures. In order that an unacceptable rate of false alarms not occur, the thresholds of the indicators 103 and 100 are preferably calibrated with respect to each other based, inter alia, on empirical data.

As further seen in FIG. 1A, if during loading of truck B, the ambient temperature on the outside of truck B reaches 25 degrees Celsius for one hour, which is less than the predetermined duration of five hours, the quality indicators 103 remain in visible state IX, as seen at reference numeral 117.

At any stage, such as upon delivery, the quality indicators 103 can be read with, a conventional barcode reader 113, which preferably communicates with a remote quality indication computer 115 and provides an immediate indication of a quality status, such as an OK indication 118, to an inspector. It is appreciated that normally until delivery, it is impractical to visually inspect the indicators 100.

As stated above with relation to loading of track A as indicated by reference numeral 110, it is preferable that the indicators 103 provide a time in temperature threshold exceedance warning even if, upon inspection, the indicators 100 show that the individual packages 101 have not experienced, unacceptable temperatures for unacceptable durations. Accordingly upon subsequent reading of the indicators 100 on the packages 101 inside a carton 104 for which no such warning was provided, as indicated by reference numeral 123 in FIG. 1C, it is not expected that the indicators 100 will indicate exceedance of corresponding time in temperature thresholds.

As seen in FIG. 1B, if during vehicle breakdown of truck B, the ambient temperature outside of the cartons 104 is 15 degrees Celsius which is more than the predetermined temperature of 12 degrees Celsius, for six hours which is more than the predetermined total duration of five hours, the quality indicators 103 assume the further visible state X, as seen at reference numeral 119. This visible state X does not revert to the visible state IX notwithstanding that the temperature of the cartons 104 subsequently drops below the predetermined temperature.

Accordingly, upon inspection, as upon delivery, upon reading the quality indicators 103 by an inspector using a conventional barcode reader 113, the barcode in its visible state X preferably provides information to the quality indication computer 115 which enables the indication interpreter forming part thereof to provide an immediate indication of a quality status, such as a BAD indication 120. This BAD indication 120 indicates that at some time in the history of the quality indicator 103, the carton 104 to which it was attached was at least at the predetermined temperature for at least a predetermined total amount of time and that this event may have rendered one or more of the products in carton 104 unacceptable for sale. It is appreciated that normally until cartons 104 are opened, typically following delivery, it is impractical to visually inspect indicators 100.

Depending on the circumstances, the temperatures of the individual packages 101 within the cartons 104 may or may not have exceeded 21 degrees Celsius for one hour and the quality indicators 100 which are attached to the packages 101 may or may not be in the further visible state III. This normally can only be seen upon opening cartons 104 as shown in FIG. 1C.

As further seen from FIG. 1B and indicated by reference numeral 121, upon inspection, as upon delivery, the quality indicators 103 attached to the cartons 104 which were delivered by truck A may be read by an inspector using a conventional barcode reader 113. As indicated by reference numeral 110 in FIG. 1A with relation to loading of track A, one or more cartons 104 were exposed to a temperature of at least 30 degrees Celsius for a period of five and a half hours, and the quality indicators 103 of these cartons assumed the visible state X, indicating exceedance of time in temperature thresholds.

In contrast, as indicated by reference numeral 121, the quality indicators 103 of other cartons 104 which were not exposed to a temperature of at least 30 degrees Celsius for a period of five and a half hours remained in the visible state IX. The barcode in its visible state IX preferably provides information to the quality indication computer 115 which enables the indication interpreter forming part thereof to provide an immediate OK indication 122.

Should the quality indicator 103 be in the visible state VIII, indicating that proper actuation of the quality indicator 103 did not occur, a NON-ACTUATED indication or a BAD indication 120 may be provided to an inspector or other interested party.

Turning now specifically to FIG. 1C, it is seen that upon opening the cartons 104 of packages 101 which were delivered by truck B, as indicated by reference numeral 123, the quality indicators 100 attached to the packages 101 are read by a conventional barcode reader 113. In this example, the quality indicators 100 or some of packages 101 are in the visible state II, indicating that notwithstanding that an indicator 103 on a carton 104 indicates exceedance of a time in temperature threshold, some of the packages, particularly those at the interior of the carton, may not have exceeded a corresponding time in temperature threshold and maybe acceptable for sale.

Barcode reader 113 preferably communicates with a remote quality indication computer 115 and provides an immediate OK indication 124 to an inspector, indicating that the temperature of some of packages 101 did not exceed a predetermined temperature for at least a predetermined total amount of time, for example 21 degrees Celsius for one hour.

This OK indication is in contrast to the BAD indication 120 provided by the quality indicators 103 associated with the cartons 104 containing these packages 101 as the result of refrigeration breakdown of truck B, as indicated by reference numeral 119 in FIG. 1B. As stated above with relation to track A loading indicated by reference numeral 110, it is preferable that the indicators 103 provide a time in temperature warning even if, upon inspection, the indicators 100 show that the individual packages 101 have not experienced unacceptable temperatures.

It is further state above that in order that an unacceptable rate of false alarms not occur, the thresholds of indicators 103 and 100 are preferably calibrated with respect to each other based, inter alia, on empirical data, and not necessarily as indicated in the example of FIGS. 1A-1F, which is provided for illustration purposes. For example, a BAD indication for a carton 104 containing packages 101 all having an OK indication can be prevented if indicators 103 attached to the cartons 104 are calibrated to indicate the exceedance of a higher time or temperature threshold than that of indicators 100 on packages 101.

As further seen in FIG. 1C and indicated by reference numeral 125, upon opening the cartons 104 of packages 101 which were delivered by truck A and for which a BAD indication has already been provided by the quality indicators 103 associated therewith during loading of truck A, as indicated by reference numeral 110 in FIG. 1A, it is seen that the indicators 100 assumed during transport a further visible state III. It is appreciated that once the state III is reached, the quality indicator 100 preferably does not thereafter revert to the state II notwithstanding that the temperature of the package 101 subsequently drops below the predetermined temperature.

Accordingly, upon inspection, as upon delivery, upon reading the quality indicator 100 by an inspector using a conventional barcode reader 113, the barcode in its visible state III preferably provides information to the quality indication computer 115 which enables the indication interpreter forming part thereof to provide an immediate indication of a quality status, such as a BAD indication 127. This BAD indication 127 indicates that at some time in the history of the quality indicator 100, the package 101 to which it was attached was at a temperature exceeding the predetermined temperature for more than at least a predetermined cumulative amount of time, and that this event has rendered the product in package 101 unacceptable for sale.

Should the quality indicator 100 be in the visible state I, indicating that proper actuation of the quality indicator 100 did not occur, a NON-ACTUATED indication or a BAD indication 127 may be provided to an inspector or other interested party.

It is appreciated, as discussed in more detail with reference to FIG. 11 below, that whereas machine reading of the quality indicators 100 and 103 provides an indication of whether or not a given event has occurred, the indication of a quality status by the quality indication computer 115 provides an indication of whether and to what extent that event has affected the quality of a given product with which the quality indicator 100 or the quality indicator 103 are associated. It is appreciated that there may be a great variation in the effect of a given event depending on the type of product. Thus, for example, exposure to 21 degrees Celsius for a short period of time may cause fresh meat to be rendered unfit for sale but may not appreciably affect the quality or saleability of oranges.

As further seen in FIG. 1C, a user employing an imager-equipped telephone or other suitable mobile communicator 128 may image the quality indicator 100 and communicate the image information to a suitably programmed quality indication computer 130, which may be identical to the computer 115, and which is capable of reading the barcode from the image information and providing to the user, via SMS or any other suitable communication methodology, an immediate indication of a quality status, such as a GOOD QUALITY indication 132. This quality status indicates that the product is safe for use. Alternatively, if the user employs a barcode reader-equipped communicator, the communicator can provide to the computer 115 an output resulting from reading the barcode.

It is appreciated that quality indication computer 130 may provide reports to various interested entities, such as the manufacturer or distributor of the products, health authorities and other governmental or private entities, to enable real-time monitoring of the quality of products offered for sale. The quality indication computer 130 may have caller ID functionality so as to be able to identify the caller, classify the caller, for example as a customer, a manufacturer's QA inspector and a health inspector, and provide an appropriate quality indication output. Additionally or alternatively, the quality indication computer 130 may send messages to supermarket management regarding remedial steps to be taken, such as refrigeration maintenance or repair instructions.

Turning now specifically to FIGS. 1C and 1D, it is seen that Indicator 100 may additionally and independently serve to indicate elapsed time. Thus, upon exceedance of the predetermined time period, for example one week following manufacture or other actuation of the quality indicator 100, the quality indicator 100 assumes yet a further visible state IV, as seen at reference numeral 134 in FIG. 1C. Upon elapse of a further predetermined amount of time, typically a second week, the quality indicator 100 may assume a still further visible state V, as seen at reference numeral 138 in FIG. 1D.

Accordingly, upon inspection, as indicated by reference numeral 134, as upon periodic stock inspection at a retail site, upon reading the quality indicator 100 by an inspector using a conventional barcode reader 113, the barcode in its visible state IV provides information to the quality indication computer 115 which enables the indication interpreter forming part thereof to provide an immediate indication of a quality status, such as a SELL SOON indication 136. This SELL SOON indication 136 indicates that, since the predetermined time interval has elapsed, the package 101 to which it was attached should be positioned and/or priced for immediate sale.

It is seen in FIG. 1D that upon further inspection, as indicated by reference numeral 138, as upon periodic stock inspection at the retail site, upon reading the quality indicator 100 by an inspector using a conventional barcode reader 113, the barcode in its visible state V provides information to the quality indication computer 115 which enables the indication interpreter forming part thereof to provide an immediate indication of a quality status, such as an EXPIRED indication 140. This EXPIRED indication 140 indicates that the package 101 to which it was attached should be discarded, since the further predetermined time period has elapsed.

Additionally or alternatively, the further inspection may take place automatically at the checkout, where the quality indicator 100 is read by a checkout scanner 148. In such a case, the barcode in its visible state V provides information to the quality indication computer 115 which enables the indication interpreter forming part thereof to provide an immediate indication of a quality status, such as a DO NOT SELL indication 150, to the checkout clerk. This DO NOT SELL indication 150 indicates that the package 101 to which it was attached may not be sold since the further predetermined time period has elapsed. It is appreciated that the D NOT SELL indication functionality described above provides a high level of control in implementing package-specific shelf-life restrictions and thus, by eliminating uncertainty regarding the shelf life of a given product may enable packaged products which have been maintained under optimal conditions to have longer shelf lives than would otherwise be possible.

Additionally or alternatively, a further inspection prior to the checkout may also be carried out by a customer at a suitable quality check location within the store.

Turning now to FIG. 1E, it is seen that the indicator 100 may additionally and independently serve to indicate exceedance of a predetermined temperature for a relatively short time duration following purchase. Thus, it the package 101 bearing indicator 100 is left inside a vehicle in the sun and is exposed to 40 degrees Celsius for a duration as short as thirty minutes, the quality indicator 100 may assume a further visible state VI. In such a situation, a purchaser, employing an imager-equipped telephone or other suitable mobile communicator 153 may image the quality indicator 100 and communicate the image information to a suitably programmed quality indication computer 156, which may be identical to computer 130 in FIG. 1C, and which is capable of reading the barcode from the image information and providing to the user, via SMS or any other suitable communication methodology, an immediate indication of a quality status, such as a DO NOT EAT indication 158. This quality status indicates that the product is not safe for human consumption. Alternatively, if the user employs a barcode reader-equipped communicator, the communicator can provide to the computer 156 an output resulting from reading the barcode.

Turning now to FIG. 1F, it is seen that indicator 100 may additionally and independently serve to indicate elapsed time following purchase. Thus, upon exceedance of a predetermined long time period such as 12 months following manufacture or other actuation of the quality indicator 100, the quality indicator 100 assumes a further visible state VII, which indicates that a predetermined amount of time has elapsed. Such a situation might occur when package 101 bearing indicator 100 is forgotten in a consumer's home freezer. In such a situation, the consumer, employing imager-equipped telephone or other suitable mobile communicator 160 may image the quality indicator 100 and communicate the image information to a suitably programmed quality indication computer 166, which may be identical to the computer 130 in FIG. 1C, and which is capable of reading the barcode from the image information and providing to the user, via SMS or any other suitable communication methodology, an immediate indication of a quality status, such as a DO NOT EAT indication 168. This quality status indicates that the product is not safe for human consumption. Alternatively, if the user employs a barcode reader-equipped communicator, the communicator can provide to the computer 166 an output resulting from reading the barcode.

Turning now to FIGS. 2A-2F, the present invention is illustrated in the context of a typical application, here a meat processing plant. In contrast to the embodiment described hereinabove with reference to FIGS. 1A-1F, in the illustrated example of FIGS. 2A-2F, where hot packaging and labeling takes place, it is necessary for activation of the quality indicator to take place only once the product has been cooled to its desired long term storage temperature. A barcoded quality indicator 200 is attached to or otherwise incorporated into each package 201 of processed meat. A package bearing the barcoded quality indicator 200 is typically an individual package suitable for retail sale.

In accordance with a preferred embodiment of the present invention, the quality indicators 200 may be assembled and/or actuated at the same location or at a location adjacent that at which the quality indicators 200 are associated with the packages 201. A suitable indicator assembler is indicated by reference numeral 202. It is appreciated that the indicator assembler 202 may be associated with an automatic actuator. It is further appreciated that the actuator may be automatic and may actuate the quality indicator after it has been produced by the indicator assembler 202.

Figure 2A:
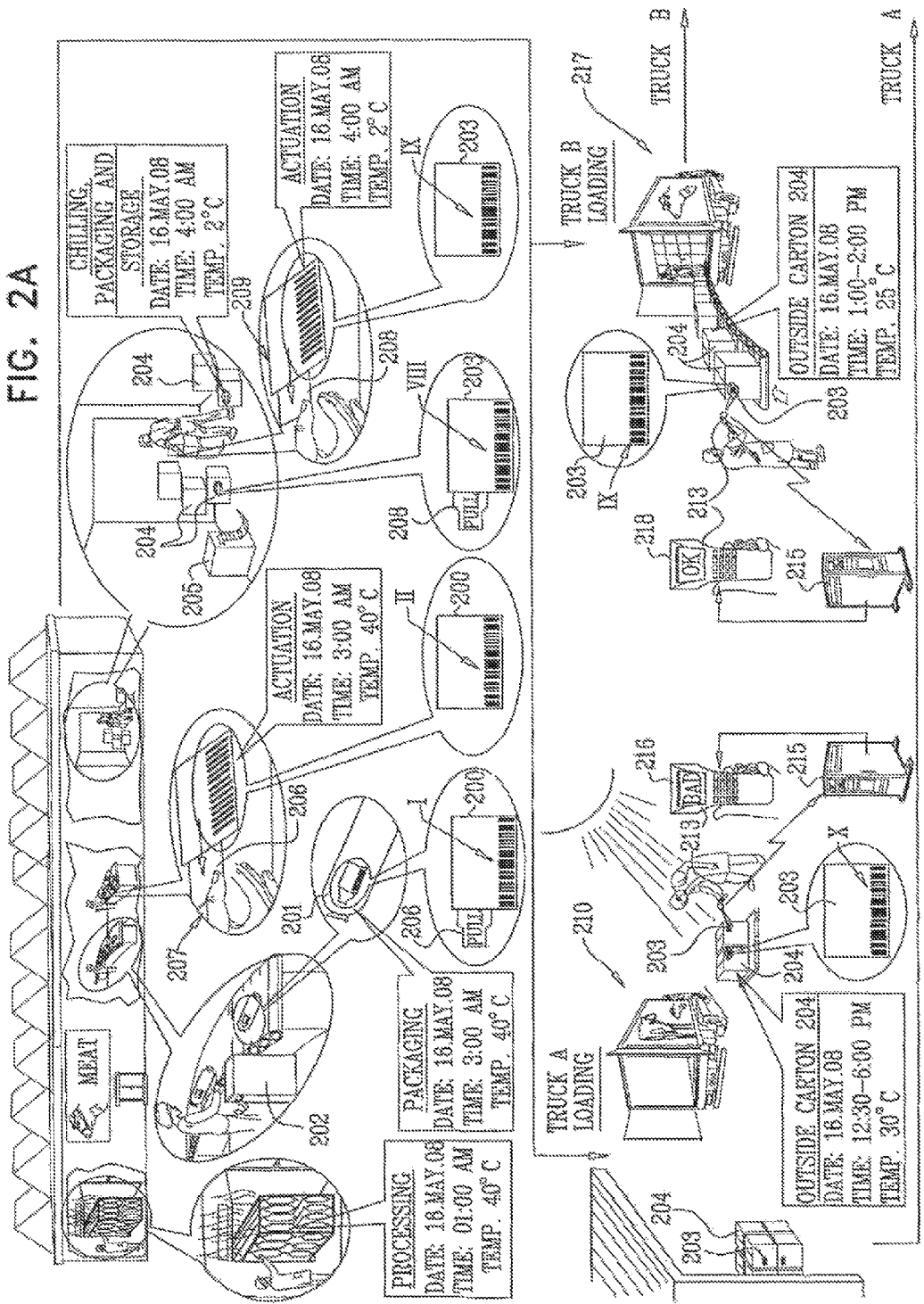

As seen in FIG. 2A, additional barcoded quality indicators 203, which are preferably different from the quality indicators 200, are attached to or otherwise incorporated into cartons 204 containing packages 201 of processed meat bearing quality indicators 200. Preferably, the quality indicators 203 assembled by an indicator assembler 205 which is similar to the indicator assembler 202, but is placed at a location which is different from the location of the indicator assembler 202. Alternatively, the quality indicators 203 may be assembled by the indicator assembler 202.

Different types of quality indicators may be employed for different types of packages. For example, the quality indicator used on a carton containing a plurality of individual packages may be more or less accurate or have a greater or lesser dynamic range of indications than the quality indicator used on an individual package. The dynamic range of a quality indicator may be a greater or lesser range of temperatures and/or of times. Additionally or alternatively, the quality indicator on a carton may include a quality indicator capable of indicating exceedance of additional thresholds, not included on the quality indicators of individual packages contained therein, or fewer thresholds than the quality indicators of individual packages contained therein.

In the illustrated embodiment, the quality indicators include an EAN (European Article Number) barcode. The quality indicators 200 are preferably constructed to be actuatable by pulling a pull strip 206 forming part thereof, as indicated by reference numeral 207. In the Illustrated embodiment, the quality indicators 200 preferably have a visible pre-actuation state I, a different visible post-actuation state II and a visible state III indicating exceedance of a predetermined temperature, for example 21 degrees Celsius, for at least a predetermined total amount of time, for example one hour, as seen at reference numeral 225 in FIG. 2C. The quality indicators 200 preferably also have an additional visible state IV, indicating the elapse of a predetermined amount of time since manufacture or other actuation of the quality indicator, for example one week, regardless of the temperature, as seen at reference numeral 234 in FIG. 2C, and an additional visible state V, indicating the elapse of an additional amount of time, for example another week, regardless of the temperature, as seen at reference numeral 238 in FIG. 2D. The quality indicators 200 can have yet a further visible state VI, indicating the exceedance of a predetermined temperature for a short predetermined duration, for example the exceedance of 40 degrees Celsius for at least thirty minutes, as seen in FIG. 2E, and another visible state VII, indicating the elapse of one year since manufacture or other actuation of the qualify indicator regardless of temperature, as seen in FIG. 2F.

The visible states are readable by a barcode reader. For example, in this illustrated embodiment, the pre-actuation state I is read as 7431348787736. the post-actuation state II is read as 7811348787736, the visible state III is read as 7811348782236, the visible state IV is read as 7817548787736, the visible state V is read as 7817562787736, the visible state VI is read as 7811348787750and the visible state VII is read as 7817562927736. It is appreciated that additional states of the quality indicator not presented in the illustrated embodiment may be indicated by combinations of the states described above. For example, when the temperature of the quality indicator exceeds 40 degrees Celsius for at least one hour it also exceeds 25 degrees Celsius for at least one hour, which causes the quality indicator to assume visible state III. However, the temperature in this case also exceeds 40 degrees for at least 30 minutes, which causes the quality indicator to assume the visible state VI. Therefore, this combined exceedance is indicated by a visible state which combines the visible state III and the visible stale VI, and is read by a barcode reader as 7811348782250. It is further appreciated that the various visible slates may occur in any suitable order and not necessarily in the order indicated by their numbering.

As further seen in FIG. 2A, the quality indicators 203 are preferably constructed to be actuatable by pulling pull strip 208 forming part thereof, as indicated by reference numeral 209. In the illustrated embodiment, the indicators 203 preferably have a visible pre-actuation state VIII, readable by a barcode reader typically as 7431348787750. Indicators 203 preferably have a visible post-actuation state IX which is different from pre-actuation state VIII and is readable by a barcode reader typically as 7437548787750. Indicators 203 preferably also have an additional at least one visible state X as seen, for example, at reference numeral 210 in FIG. 2A and at reference numeral 219 in FIG. 2B, indicating exceedance of a predetermined temperature, for example 12 degrees Celsius, for at least a predetermined cumulative amount of time, for example five hours. This further visible state is readable by a barcode reader typically as 7437548782250.

Alternatively, any of the visible states VIII, IX and X of the quality indicators 203 may be associated with barcodes which are the same as barcodes associated with states of the quality indicators 200. If the same barcode is associated with states of both types of indicators, then the identity of the quality indicator read by a barcode reader is provided to the indication interpreter by another method, for example by a manual entry to the database.

It is appreciated that the predetermined temperatures and the predetermined cumulative amounts of time may be selected as appropriate for a given application.

In contrast to the embodiment described hereinbove with reference to FIGS. 1A-1F, actuation, as by pulling the pull strip 206 or the pull strip 208, does not result in immediate activation of the indication functionality of the respective quality indicators 200 and 203. Thus the quality indicators 200 and 203 do not provide a machine readable indication of exceedance of thresholds which takes place during a period of time between actuation and activation. Typically the resulting activation delay may be 8 hours following actuation. It is seen in FIG. 2A that dining the activation delay the quality indicators 200 and 203 ate not sensitive to temperature and retain their respective visible post-actuation slates II and IX.

It is appreciated that various types of indicators may be employed together in a quality management system. In some indicators actuation may result in the immediate activation of the quality indicator, and in other indicators activation of the quality indicator following actuation may be delayed.

It is appreciated that following elapse of the activation delay, as long as the temperature of the packages 201 dues not exceed a predetermined temperature for at least a predetermined total amount of time, for example 21 degrees Celsius for one hour, and one week has not elapsed since manufacture or other activation of the quality indicator, the indicators 200 remain in the visible state II.

As seen in FIG. 2A. as long as, following elapse of the activation delay, the temperature of the carton 204 of packages 201 does not exceed a predetermined temperature for at least a predetermined cumulative amount, of time, for example 12 degrees Celsius for five hours, the quality indicators 203 remain in the visible state IX.

As further seen in FIG. 2A, if during loading of truck A as indicated by reference numeral 210, after the elapse of the activation delay the temperature on the outside of one or more cartons 204 is at least 30 degrees Celsius for a period of five and a half hours, which is more then the predetermined total amount of time of five hours, the corresponding indicators 203 assume the further visible state X. This further visible state X does not revert to the visible state IX notwithstanding that the temperature of the carton 204 subsequently drops below the predetermined temperature. These cartons, when received by the customer, will be subject to inspection to determine whether the temperature of the packages 201 inside the cartons 204 exceeded predetermined time in temperature thresholds.

Accordingly, upon inspection, as upon delivery, the quality indicators 203 attached to the cartons 204 which were exposed to a temperature of at least 30 degrees Celsius tor a period of five and a halt hours may be read by an inspector using a conventional barcode reader 213. The barcode in its visible state X preferably provides information to the quality indication computer 215 which enables the indication interpreter forming part, thereof to provide an immediate Indication of a quality status, such as a BAD indication 216. This BAD indication 216 indicates that at some time in the history or the quality indicator 203, the carton 204 to which it was attached was at least, at the predetermined temperature for at least a predetermined total amount of time and that this event may have rendered one or more of the products in carton 204 unacceptable for sale.

Should the quality indicator 203 be in the visible state VIII, indicating that proper actuation of the quality indicator 203 did not occur, a NON-ACTUATED indication or a BAD indication 216 may be provided to an inspector or other interested party.

It is appreciated that until the cartons 204 are opened, which normally occurs only upon delivery, it is impractical to visually inspect the indicators 200 which are attached to the individual packages 201 inside the cartons 204. Depending on the circumstances, the temperature of the individual packages 201 within a carton 204 may or may not have exceeded 21 degrees Celsius for one hour and the quality indicators 200 which are attached to the packages 201 may or may not be in the further visible state III. This normally can only be seen upon opening the cartons 204 as shown in FIG. 2C.

It is a particular feature of the present invention that the time and temperature thresholds of the quality indicators 200 and 203, placed on the individual packages and the cartons containing them respectively, are preferably related in order to provide highly effective cold chain management. It is preferable that the quality indicators 203 provide a time in temperature warning even if, upon inspection, indicators 200 show that the individual packages 201 have not experienced unacceptable Temperatures. In order that an unacceptable rate of false alarms not occur, the thresholds Of indicators 203 and 200 are preferably calibrated with respect to each other based, inter alia, on empirical data.

As farther seen in FIG. 2A, if during loading of truck B, after the elapse of the activation delay the ambient temperature on the outside of track B reaches 25 degrees Celsius for one hour, which is less than the predetermined duration, of five hours, the quality indicator 203 remains in the visible state IX, as seen at reference numeral 217.

At any stage, such as upon delivery, the quality indicator 203 can be read with a conventional barcode reader 213, which preferably communicates with a remote quality indication computer 215 and provides an immediate indication of a quality status, such as an OK indication 218, to an inspector. It is appreciated that normally until delivery, it Is impractical to visually inspect indicators 200.

As stated above with relation to loading of truck A as indicated by reference numeral 210, it is preferable that the quality indicators 203 provide a time in temperature threshold exceedance warning even if, upon inspection, the quality indicators 200 show that the individual packages 201 have not experienced unacceptable temperatures for unacceptable durations. Accordingly upon subsequent reading of the quality indicators 200 on packages 201 inside a carton 204 for which no such warning was provided, as indicated by reference numeral 223 in FIG. 2C it is not expected that indicators 200 will indicate exceedance of corresponding time in temperature thresholds.

Figure 2B:
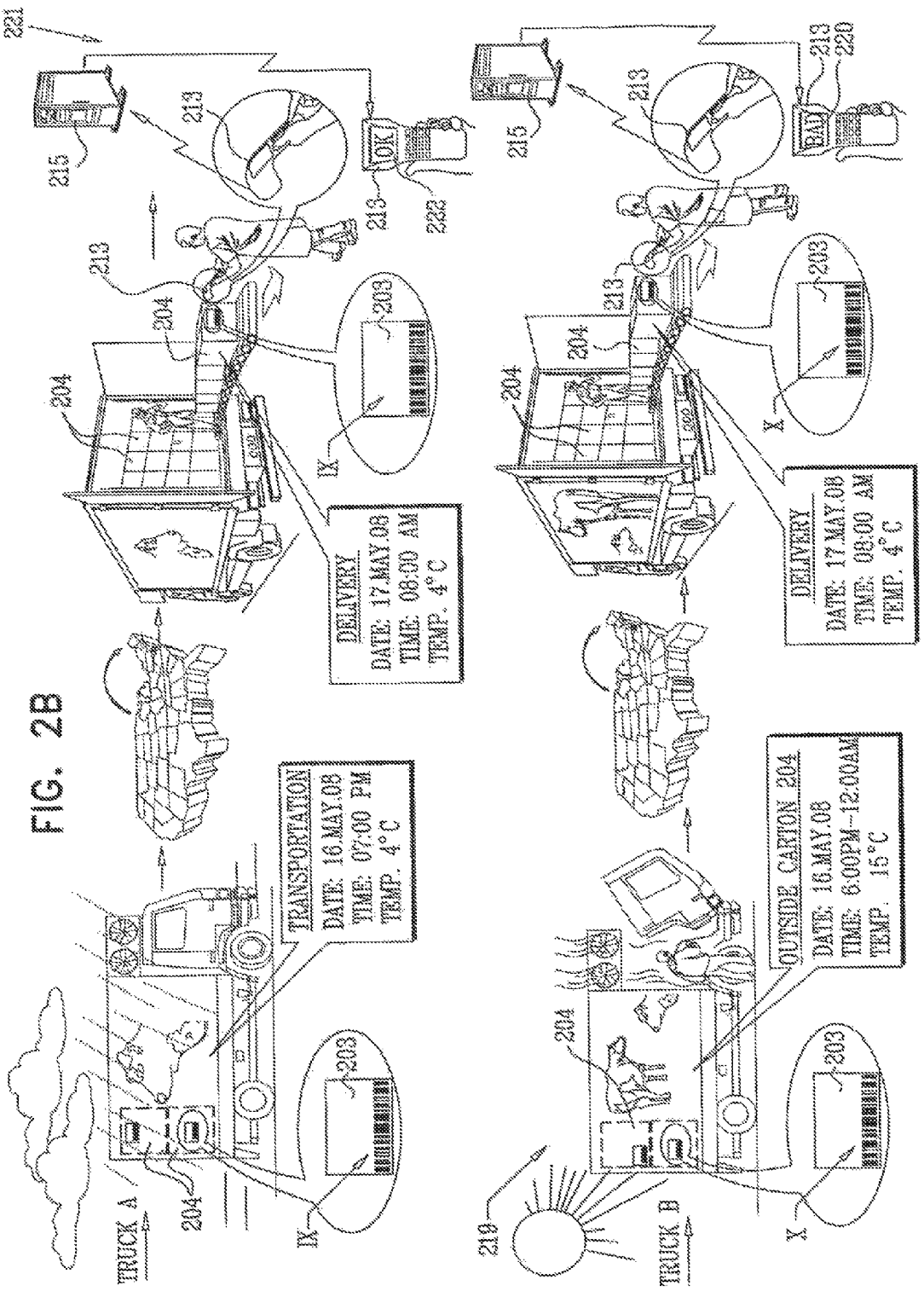

As seen in FIG. 2B, if during vehicle breakdown of truck B, after the elapse of the activation delay the ambient temperature outside of the cartons 204 is 15 degrees Celsius which is more than the predetermined temperature of 12 degrees Celsius, for six hours winch is more than the predetermined total duration of live hours, the quality indicator assumes the farther visible state X, as seen at reference numeral 219. This visible state X does not revert to the visible state IX notwithstanding that the temperature of the cartons 204 subsequently drops below the predetermined temperature.

Accordingly, upon inspection, as upon delivery, upon reading the quality indicator 203 by an inspector using a conventional barcode reader 213, the barcode in its visible state X preferably provides information to the quality indication computer 215 which enables the indication interpreter forming part thereof to provide an immediate indication of a quality status, such as a BAD indication 220. This BAD indication 220 indicates that at some time in the history of the quality indicator 203, the carton 204 to which it was attached was at least at the predetermined temperature for at least a predetermined total amount of time and that this event may have rendered one or more of the products in carton 204 unacceptable for sale. It is appreciated that normally until cartons 204 are opened, typically following delivery, it is impractical to visually inspect indicators 200.

Depending on the circumstances, the temperatures of the individual packages 201 within the cartons 204 may or may not have exceeded 21 degrees Celsius tor one hour and the quality indicators 200 which are attached to the packages 201 may or may not be in the further visible state III. This normally can only be seen upon opening cartons 204 as shown in FIG. 2C.

As further seen from FIG. 2B and indicated by reference numeral 221, upon inspection, as upon delivery, the quality indicators 203 attached to the cartons 204 which were delivered by truck A may be read by an inspector using a conventional barcode reader 213. As indicated by reference numeral 210 in FIG. 2A with relation to loading of truck A, one or more cartons 204 were exposed to a temperature of at least 30 degrees Celsius for a period of five and a half hours, and the quality indicators 203 of these cartons assumed the visible state X, indicating exceedance of tune in temperature thresholds.

In contrast, as indicated by reference numeral 221, the quality indicators 203 of other cartons 204 which were not exposed to a temperature of at least 30 degrees Celsius tor a period of five and a half hours remained in the visible state IX. The barcode in its visible state IX preferably provides information to the quality indication computer 215 which enables the indication interpreter forming part thereof to provide an immediate OK indication 222.

Should the quality indicator 203 be in visible state VIII, indicating that proper actuation of the quality indicator 203 did not occur, a NON-ACTUATED indication or a BAD indication 220 may be provided to an inspector or other interested party.

Turning now specifically to FIG. 2C, it is seen that upon opening the cartons 204 of packages 201 which were delivered by truck B, as indicated by reference numeral 223, the quality indicators 200 attached to the packages 201 are read by a conventional barcode reader 213. In this example, the quality indicators 200 of some of packages 201 are in the visible stale II, indicating that notwithstanding that an indicator 203 on a carton 204 indicates exceedance of a time in temperature threshold, some of the packages, particularly those at the interior of the carton, may act have exceeded a corresponding time in temperature threshold and may be acceptable.

Barcode reader 213 preferably communicates with a remote quality indication computer 215 and provides an immediate OK indication 224 to an inspector, indicating that the temperature of some of the packages 201 did not exceed a predetermined temperature of at least a predetermined total amount of time, for example 21 degrees Celsius for one hour.

This OK indication is in contrast to the BAD indication 220 provided by the quality indicators 203 associated with cartons 204 containing these packages 201 as the result of refrigeration breakdown of truck B, as indicated by reference numeral 219 in FIG. 2B, As stated above with relation to truck A loading indicated by reference numeral 210, it is preferable that indicators 203 provide a time in temperature warning even if, upon inspection, indicators 200 show that the individual packages 201 have not experienced unacceptable temperatures.

It is further stated above that in order that an unacceptable rate of false alarms not occur, the thresholds of the quality indicators 203 and 200 are preferably calibrated with respect to each other based, inter alia, on empirical data, and not necessarily as indicated in the example of FIGS. 2A-2F, which is provided for illustration purposes. For example, a BAD indication for a carton 204 containing packages 201 ad having an OK indication can be prevented if the quality indicators 203 attached to the canons 204 are calibrated to indicate the exceedance of a higher time or temperature threshold than that of indicators 200 on packages 201.

As further seen in FIG. 2C and indicated by reference numeral 225, upon opening the carton 204 of packages 201 which were delivered by truck A and for which a BAD indication has already been provided by the quality indicators 203 associated therewith during loading of truck A, as indicated by reference numeral 210 in FIG. 2A, it is seen that indicators 200 assumed during transport the further visible state III. It is appreciated dud once the state III is reached, the quality indicator 200 preferably does not thereafter revert to the state II notwithstanding that the temperature of the package 201 subsequently drops below the predetermined temperature.

Accordingly, upon inspection, as upon delivery, upon reading the quality indicator 200 by an inspector using a conventional barcode reader 213, the barcode in its visible state III preferably provides information to the quality indication computer 215 which enables the indication interpreter forming part thereof to provide an immediate indication of a quality status, such as a BAD indication 227. This BAD indication 227 indicates that at some time in the history of the quality indicator 200, the package 201 to which it was attached was at a temperature exceeding the predetermined temperature for more than at least a predetermined cumulative amount of time, and that this event has rendered the product in package 201 unacceptable for sale.

Should the quality indicator 200 be in the visible state I, indicating that proper actuation of the quality indicator 200 did not occur, a NON-ACTUATED indication or a BAD indication 227 may be provided to an inspector or other interested party.

It is appreciated, as discussed in more detail with reference to FIG. 11 below, that whereas machine reading of the quality indicators 200 and 203 provides an indication of whether or not a given event has occurred, the indication of a quality status by the quality indication computer 215 provides an indication of whether and to what extent that event has affected the quality of a given product with which the quality indicator 200 or the quality indicator 203 are associated. It is appreciated that there may be a great variation in the effect of a given event depending on the type of product. Thus, for example, exposure to 21 degrees Celsius for a short period of time may cause fresh meat to be rendered unfit for sale but may not appreciably affect the quality or saleability of oranges.

As farther seen in FIG. 2C a user employing an imager-equipped telephone or other suitable mobile communicator 228 may image the quality indicator 200 and communicate the image information to a suitably programmed quality indication computer 230, which may be identical to the computer 215, and which is capable of reading the barcode from the image information and providing to the user, via SMS or any other suitable communication methodology, an immediate indication of a quality status, such as a GOOD QUALITY indication 232. This quality status indicates that the product is safe for use. Alternatively, if the user employs a barcode reader-equipped communicator, the communicator can provide to the computer 215 an output resulting from reading the barcode.

It is appreciated that the quality indication computer 230 may provide reports to various interested entities, such as the manufacturer or distributor of the products, health authorities and other governmental or private entities, to enable real-time monitoring of the quality of products offered for sale. The quality indication computer 230 may have caller ID functionality so as to be able to identify the caller, classify the caller, for example as a customer, a manufacturer's QA inspector and a health inspector, and provide an appropriate quality indication output. Additionally or alternatively, the quality indication computer 230 may send messages to supermarket management regarding remedial steps to be taken, such as refrigeration maintenance or repair instructions.

Turning now specifically to FIGS. 2C and 2D, it is seen that the indicators 200 may additionally and independently serve to indicate elapsed time. Thus, upon exceedance of the predetermined time period, for example one week, following manufacture or other activation of the quality indicator 200, the quality indicator 200 assumes yet a further visible state IV, as seen at reference numeral 234 in FIG. 2C. Upon elapse of a further predetermined amount of time, typically a second week, the quality indicator 200 may assume the still further state V, as seen at reference numeral 238 in FIG. 2D.

Accordingly, upon inspection, as indicated by reference numeral 234, as upon periodic stock inspection at a retail site, upon reading the quality indicator 200 by an inspector using a conventional barcode reader 213, the barcode in its visible state IV provides information to the quality indication computer 215 which enables the indication interpreter forming part thereof to provide an immediate indication of a quality status, such as a SELL SOON indication 236. This SELL SOON indication 236 indicates that., since the predetermined time interval has elapsed, the package 201 to which it was attached should be positioned and/or priced for immediate sale.

It is seen in FIG. 2D that upon further inspection, as indicated by reference numeral 238, as upon periodic stock inspection at the retail site, upon reading the quality indicator 200 by an inspector using a conventional barcode reader 213, the barcode in its visible state V provides information to the quality indication computer 215 which enables the indication interpreter forming part thereof to provide an immediate indication of a quality status, such as an EXPIRED indication 240. This EXPIRED indication 240 indicates that the package 201 to which it was attached should be discarded, since the further predetermined time period has elapsed.

Additionally or alternatively, the further inspection may take place automatically at the checkout, where the quality indicator 200 is read by a checkout scanner 248. In such a case, the barcode in its visible state V provides information to the quality indication computer 215 which enables the indication interpreter forming part thereof to provide an immediate indication of a quality status, such as a DO NOT SELL indication 250, to the checkout clerk. This DO NOT SELL indication 250 indicates that the package 201 to which it was attached may not be sold since the further predetermined time period has elapsed. It is appreciated that the DO NOT SELL indication functionality described above provides a high level of control in implementing package-specific shelf-life restrictions and thus, by eliminating uncertainty regarding the shelf life of a given product, may enable packaged products which have been maintained, under optimal conditions to have longer shelf lives than would otherwise be possible.

Additionally or alternatively, a further inspection prior to the checkout may also be carried out by a customer at a suitable quality check location within the store.

Turning now to FIG. 2E, it is seen that the indicators 200 may additionally and independently serve to indicate exceedance of a predetermined temperature for a relatively short time duration following purchase. Thus, if the package 201 bearing indicator 200 is left inside a vehicle in be sun and is exposed to 40 degrees Celsius for a duration as short as thirty minutes, the quality indicator 200 may assume a further visible state VI. In such a situation, a purchaser, employing an imager-equipped telephone or other suitable mobile communicator 253 may image the quality indicator 200 and communicate the image information to a suitably programmed quality indication computer 256, which may be identical to the computer 230 in FIG. 2C, and which is capable of reading the barcode from the image information and providing to the user, via SMS or any other suitable communication methodology, an immediate indication of a quality status, such as a DO NOT EAT indication 258. This quality status indicates that the product is not safe for human consumption. Alternatively, if the user employs a barcode reader-equipped communicator, the communicator can provide to the computer 256 an output resulting from reading the barcode.

Turning now to FIG. 2F, it is seen that indicator 200 may additionally and independently serve to indicate elapsed time following purchase. Thus, upon exceedance of a predetermined long time period, such as 12 months following manufacture or other activation of the quality indicator 200, the quality indicator 200 assumes a further visible state VII, which indicates that a predetermined amount of time has elapsed. Such a situation might occur, when package 201 bearing indicator 200 is forgotten in a consumer's home freezer. In such a situation, the consumer, employing imager-equipped telephone or other suitable mobile communicator 260 may image the quality indicator 200 and communicate the image information to suitably programmed quality indication computer 266, which may be identical to the computer 230 in FIG. 2C, and which is capable of reading the barcode from the image information and providing to the user, via SMS or any other suitable communication methodology, an immediate indication of a quality status, such as a DO NOT EAT indication 268. This quality status indicates that the product is not safe for human consumption. Alternatively, if user employs a barcode reader-equipped communicator, the communicator can provide to the computer 266 art output resulting from reading the barcode.

Reference is now made to FIGS. 3A-3D, which are simplified illustrations of quality indicators constructed and operative in accordance with a preferred embodiment of the present invention for indicating temperature history, elapsed time and a combination of elapsed time and temperature history.

FIG. 3A illustrates a package of meat 300 including a combination elapsed time in temperature indicator 301 constructed and operative in accordance with a preferred embodiment of the present invention of the type described hereinabove with reference to FIGS. 1A-1F. The quality indicator 301 is typically constructed to be actuatable by pulling a pull strip 302 forming part thereof. As illustrated in FIG. 3A, indicator 301 includes a barcode which is in a visible state 303, typically readable by a barcode reader as 7431348787236, prior to actuation, as indicated by designator A, Following actuation, indicator 301 presents a barcode which is in a visible state 304, typically readable by a barcode reader as 78<u>11</u>348787736 including a changed portion 305 as long as the temperature of the package 300 does not exceed a predetermined temperature for at least a predetermined cumulative amount of time, for example 21 degrees Celsius for one hour, as indicated by designator B. Once the temperature of the package 300 is more than the predetermined temperature for at least a predetermined cumulative amount of time, such as 21 Celsius for one hour, the quality indicator presents a barcode which is in a visible state 300, typically readable by a barcode reader as 7811348782236, including a changed portion 308, as indicated by designator C. It is appreciated that once the state 304 is reached, the quality indicator preferably does not thereafter revert to the state 304 notwithstanding that the temperature of the package 300 subsequently drops below the predetermined temperature.

FIG. 3B illustrates a package of salami 320 including a combination elapsed time in temperature indicator 321 constructed and operative in accordance with a preferred embodiment of the present invention, of the type described hereinabove with reference to FIGS. 2A-2F. The quality indicator 321 is typically constructed to be actuatable by pulling a pull strip 322 forming part thereof.

As illustrated in FIG. 3B, indicator 321 includes a barcode which is in a first visible state 323, typically readable by a barcode reader as 7431348787736, prior to actuation as indicated by designator A, and in a second visible state 334, typically, readable by a barcode reader as 7811348787736 including a changed portion 325 following actuation, as indicated by designator B. The quality indicator 321 preferably remains in the second visible state 324 prior to activation, for at least a predetermined time following actuation, typically 8 hours, irrespective of the temperature of the quality indicator 321 as indicated by designators B and C.

Upon activation, once the temperature of the package 320 is more than a Predetermined temperature for at least a predetermined total duration, such as 21 degrees Celsius for one hour, as indicated by designator D, the quality indicator presents a barcode which is in a visible state 326, typically readable by a barcode reader as 7811348782236, including a changed portion 328. It is appreciated that once the state 326 is reached, the quality indicator preferably does not thereafter revert to the state 324 notwithstanding that the temperature of the package 320 subsequently drops below the predetermined temperature.

FIG. 3C illustrates a package of meat 340 including an indicator for separately indicating elapsed time end temperature 341, constructed and operative in accordance with a preferred embodiment of the present invention, of the type described hereinabove with reference to FIGS. 1A-1F. The quality indicator 341 is typically constructed to be actuatable by pulling a pull strip 342 forming part thereof.

As illustrated in FIG. 3C, indicator 341 includes a barcode which is in a visible state 343, typically readable by a barcode reader as 7431348787736, prior to actuation, as indicated by designator A. Following actuation, indicator 341 presents a barcode which is in a visible state 344, typically readable by a barcode reader as 7811348787736, including a changed portion 345 as long as the temperature of the package 340 does not exceed a predetermined temperature for at least a predetermined cumulative amount of time, such as for example a temperature of 21 degrees Celsius for at least one hour and when no more than a predetermined time period, typically seven days, has elapsed since actuation of the quality indicator, as indicated by designator B.

Once the temperature has exceeded 21 degrees Celsius for one hour, but the predetermined time period has not elapsed since actuation, the quality indicator presents a barcode which is in a visible state 346, typically readable by a barcode reader as 7811348782236, including a changed portion 347, as indicated by designator C. It is appreciated that once the state 346 is reached, the quality indicator preferably does not thereafter revert to the state 344 notwithstanding that the temperature of the package 340 subsequently drops below the predetermined temperature.

Once the predetermined time has elapsed since actuation of indicator 341, the quality indicator presents a further visible state 348, typically readable by a barcode reader as 7 817548782236 including a changed portion 349, as indicated by designator D. Once an additional amount of time has elapsed, for example another week, the quality indicator presents a further visible state 350, typically readable by a barcode reader as 7817562782236, including a changed portion 351 as indicated by designator E.

FIG. 3D illustrates a package of meat 360 including an indicator for separately indicating elapsed time and temperature 361, constructed and operative in accordance with a preferred embodiment of the present invention, of the type described hereinabove with reference to FIGS. 2A-2F. The quality indicator 361 is typically constructed to be actuatable by pulling a pull strip 362 forming part thereof.

As illustrated in FIG. 3D, indicator 361 includes a barcode which is in a first visible state 363, typically readable by a barcode reader as 7431348787736, prior to actuation as indicated by designator A and in a second visible state 364, typically readable by a barcode reader as 7811348787736, including a changed portion 365 following actuation as indicated by designator B. The quality indicator 361 preferably remains at the second visible state 364 for at least a predetermined time, typically 8 hours, prior to activation, irrespective of the temperature and elapsed time of the quality indicator 361 as indicated by designators B and C.

Following activation, once the temperature has exceeded a predetermined temperature for at least a predetermined cumulative amount of time, for example 21 degrees Celsius for one hour, but the predetermined time period, typically seven days, has not elapsed since activation, the quality indicator presents a barcode which is in visible state 366, typically readable by a barcode reader as 7811348782236, including a changed portion 367, as indicated by designator D. It is appreciated that once the state 366 is reached, the quality indicator preferably does not thereafter revert to the state 364 notwithstanding that the temperature of the package 360 subsequently drops below the predetermined temperature. Once the predetermined time has elapsed since activation of indicator 361 the quality indicator presents a further visible state 368, typically readable by a barcode reader as 7 817548782236, including a changed portion 369, as indicated by designator E. Once an additional amount of time has elapsed, for example another week, the quality indicator presents a further visible state 370, typically readable by a barcode reader as 7817562782236, including a changed portion 371 as indicated by designator F.

Reference is now made to FIGS. 4A-7G, which, respectively, are simplified illustrations of the structure and operation of examples of the quality indicators of FIGS. 3A-3D constructed and operative in accordance with a preferred embodiment of the present invention for indicating temperature history, elapsed time and a combination of temperature history and elapsed time.

Figure 4B:
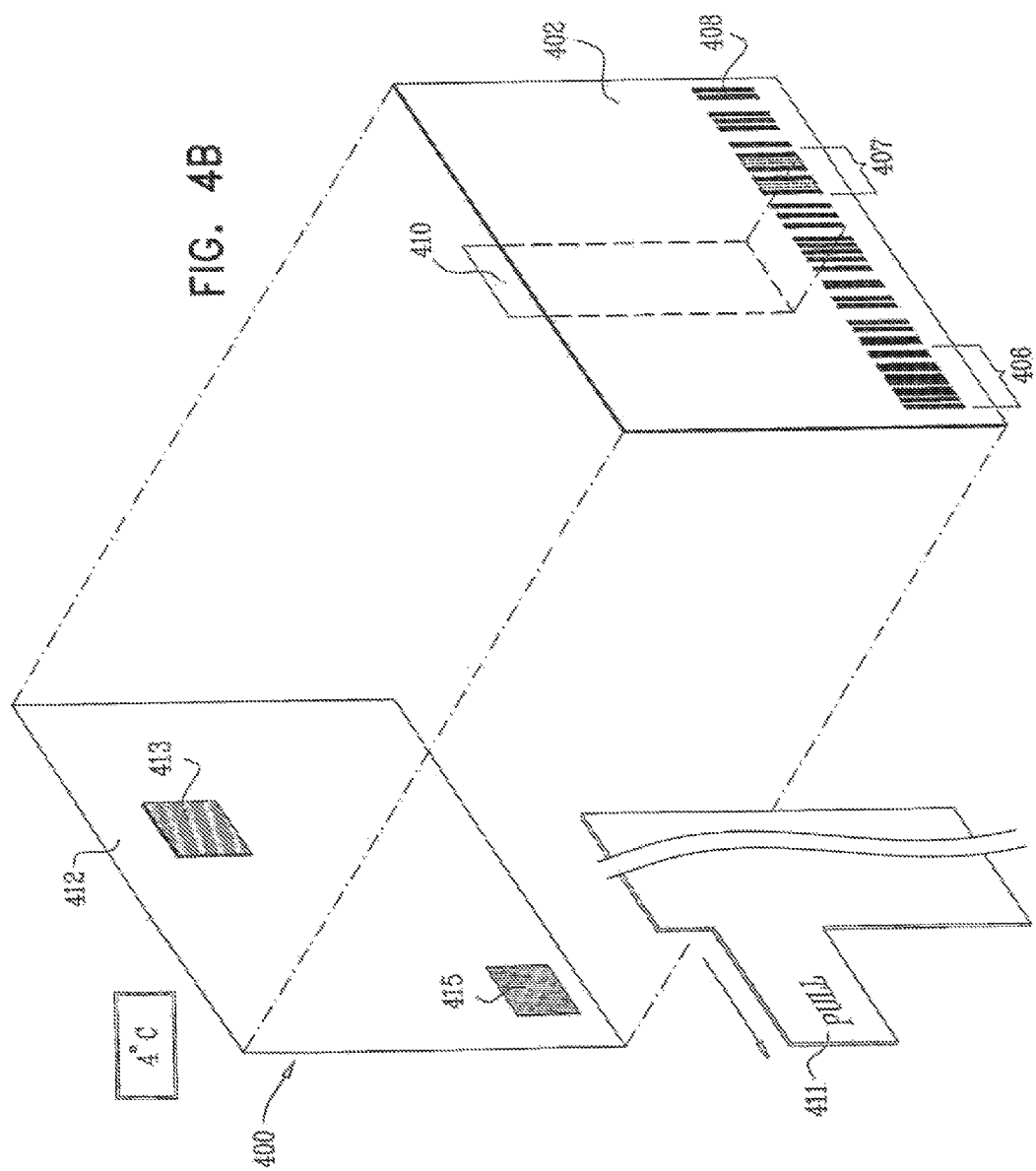
Figure 4E:
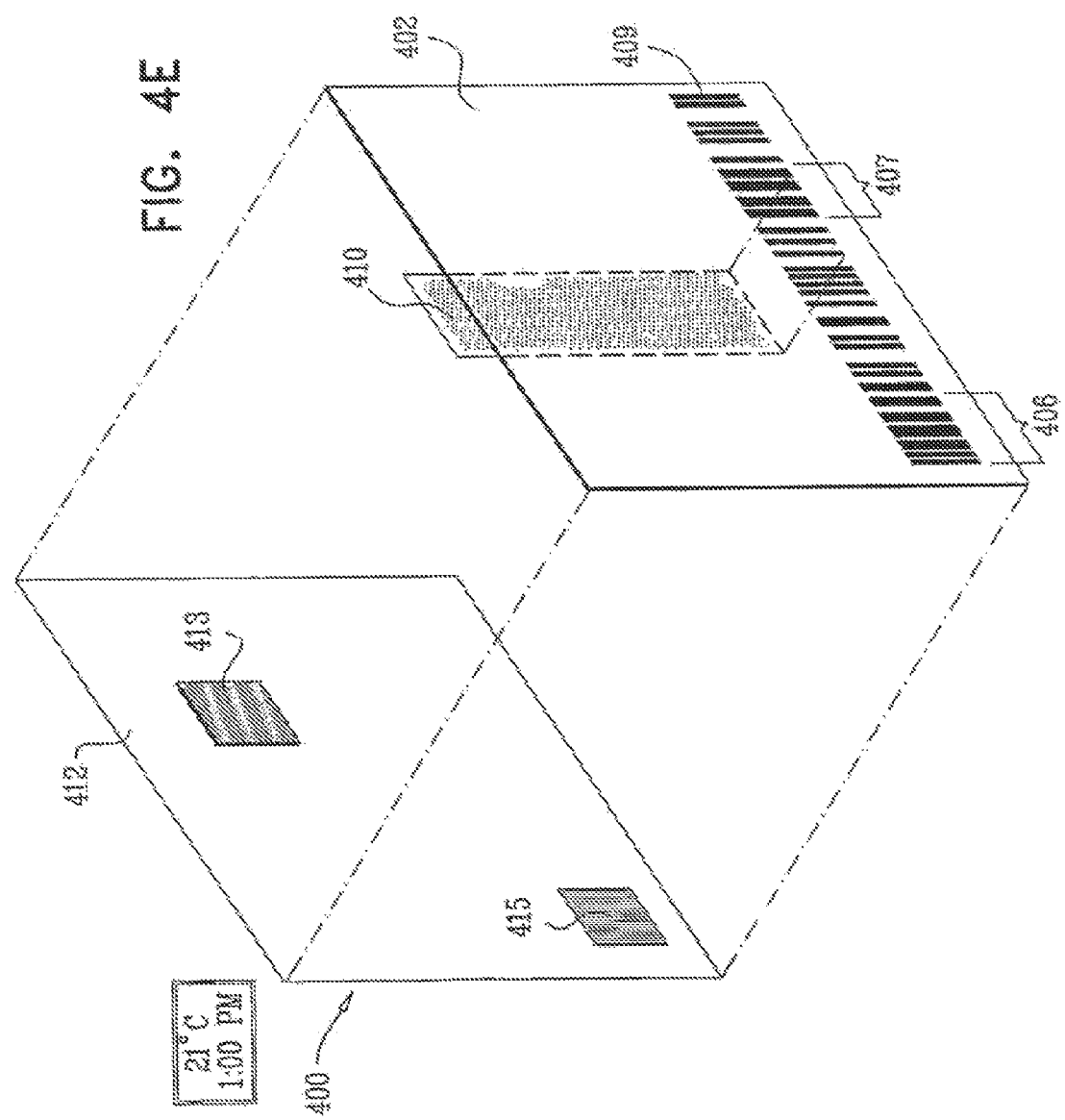

Reference is now made to FIGS. 4A-4E, which together are a simplified illustration of the construction and operation of one embodiment of the quality indicator 301 of FIG. 3A for indicating time in temperature history. As seen in FIG. 4A, the quality indicator, here designated by reference numeral 400, preferably includes a barcode defining layer 402, which is preferably printed on a transparent substrate. The printing on the transparent substrate preferably defines a background area, which is preferably printed in a white color, a barcode in a first visible state 404 which is preferably printed in a black color, and a plurality of transparent areas 406 and 407 associated with the barcode, which are not printed. Alternatively., the background area and the barcode are printed in such colors as to define high contrast therebetween. The barcode in the first visible state 404 is machine readable in this embodiment and is typically readable by a barcode reader as 7431348787736.

If transparent areas 406 are colored and read together with the barcode in the first visible state 404, there is provided a barcode in a second visible state 408 typically readable by a barcode reader as 7811348787736. If both transparent areas 406 and 407 are colored and read together with the barcode in the first visible state 404, there is provided a barcode is a third visible state 409 typically readable by a barcode reader as 7 811348782236. There is also a theoretical possibility that the transparent areas 407 could be colored and 406 could not be colored, but it is not practical in the present embodiment.

Disposed behind the transparent areas 407 extending perpendicular to the barcode and preferably adhered to the barcode defining layer 402 is a colorable element 410, such as Whatman No. 3 filter paper, commercially available from Whatman International [CAT#: 1003917], which until colored is normally white. Disposed behind the barcode defining layer 402 and behind the colorable element 410 is a pull strip 411, corresponding to the pull strip 106 in FIG. 1A, and the pull strip 302 in FIG. 3A. The pull strip 411 is preferably white and prevents the passage therethrough of coloring agents employed in this embodiment of the invention. Preferably, the pull strip 411 is formed of polyester, for example Melinex®401, commercially available from DuPont of Wilmington Del., and is preferably 75 micrometers thick.

Disposed behind the pull strip 411 is a back layer 412 to which is preferably adhered, rearwardly of colorable element 410 but not rearwardly of the barcode, a temperature responsive coloring element 413, such as a pad, for example, K-R; 210/34/28, commercially available tram Noam-Urim of Kibbutz Urim, Israel, impregnated with a coloring agent, such as Sudan Black, a black color dye [CAS: 4197-25-5], dissolved at a ratio of 1 gram per 1 kg in a solution of 74.25% Coconut oil [CAS: 8001-31-8], 24.75% Oleic acid [CAS: 112-80-1] and 1% Hexanoic acid [CAS: 142-62-1].

A colored area 415 is formed on the back layer 412, rearwardly of the transparent areas 406, in order to define high contrast with the barcode defining layer 402, when the pull strip 411 is removed.

Until such time as the pull strip 411 is removed, the quality indicator 400 is nonresponsive to temperature changes and remains in the first visible state 404.

Turning to FIG. 4B once the pull strip 411 is removed, the quality indicator 400 becomes responsive to temperature changes. As long as the temperature at the quality indicator does not exceed a predetermined temperature, for example 21 degrees Celsius, for at least a predetermined cumulative amount of time, typically one hour, the portions of the colored area 415 winch are visible through the transparent areas 406 appear similar to the bars of the barcode in the first visible state 404 and can be read together therewith as a single barcode in the second visible state 408.

Turning to FIG. 4C, when the pull strip 411 has been removed and when the temperature at the quality indicator exceeds 21 degrees Celsius, the coloring agent in the coloring element 413 begins to melt and be released from the coloring element 413 and begins to diffuse through the colorable element 410.

It is appreciated that if the temperature thereafter drops below 21 degrees Celsius the coloring agent continues to diffuse through the colorable dement 410. If, after the temperature reaches 21 degrees Celsius, the temperature drops below 17 degrees Celsius, the coloring agent becomes solid and diffusion thereof through the colorable element 410 is suspended until the temperature again reaches 21 degrees Celsius.

It is appreciated that the elapsed time from the start of diffusion of the coloring agent from the coloring element 413 along the colorable element 410 until portion of the colorable element 410 which are visible through the transparent areas 407 start to become colored is defined for example by the length of the colorable element 410 between the area in front of coloring element 413 and the area underlying the transparent areas 407. Additionally, this elapsed time is a function of the material from which the colorable element 410 is made.

As seen in FIG. 4D, when the temperature is at least 21 degrees Celsius for at least a predetermined cumulative amount of time, such as 21 degrees Celsius for fifth minutes, the coloring agent diffuses through the colorable element 410, such that the portions of the colorable element 410 which are visible through the transparent areas 407 start to become colored and appear similar to the bars of the barcode in the first visible state 404. It is appreciated that since the direction of diffusion of the coloring agent through the colorable element 410 underlying the barcode is perpendicular to the barcode, as indicated by reference numeral 417, portions of the barcode in the transparent areas 407 can be read together with the barcode in the first visible state 404 and with the transparent areas 406 as a single barcode even before the colorable element 410 is fully colored by the coloring agent.

The portions of the barcode in the transparent areas 407 which are colored and appear similar to the bars of the barcode in the first visible state 404 can be read together therewith and with the transparent areas 406 as a single barcode in the third visible state 409. The portions of the barcode in the transparent areas 407 which are not colored and do not appear similar to the bars of the barcode in the first visible state 404 can be read together with the transparent areas 406 as a single barcode in the second visible state 408. Thus is it appreciated that normally at all times following actuation, a readable barcode is present.

It is appreciated that the appearance of the quality indicator 400 during the transition illustrated in FIG. 4D may be somewhat problematic in that two alternative readings are possible. It is nevertheless believed that this situation is preferable to a situation wherein the quality indicator 400 is not at all readable during the transition, inter alia since the quality indicator may include portions that are not in transition and further since it is possible to program the indication interpreter to prefer an exceedance indication over a subsequently read non-exceedance indications. It is desirable that the time duration of the transition be as short as possible.

Turning now to FIG. 4B, following the elapse of an additional amount of time at a temperature of at least 21 degrees Celsius, typically 10 minutes, the coloring agent is fully diffused through colorable element 410. Consequently, all portions of the colorable element 410 which are visible through the transparent areas 407 are colored and appear similar to the bars of the barcode in the first visible state 404, and can be read together therewith and with the transparent areas 406 as a single barcode in the third visible state 409.

Figure 5B:
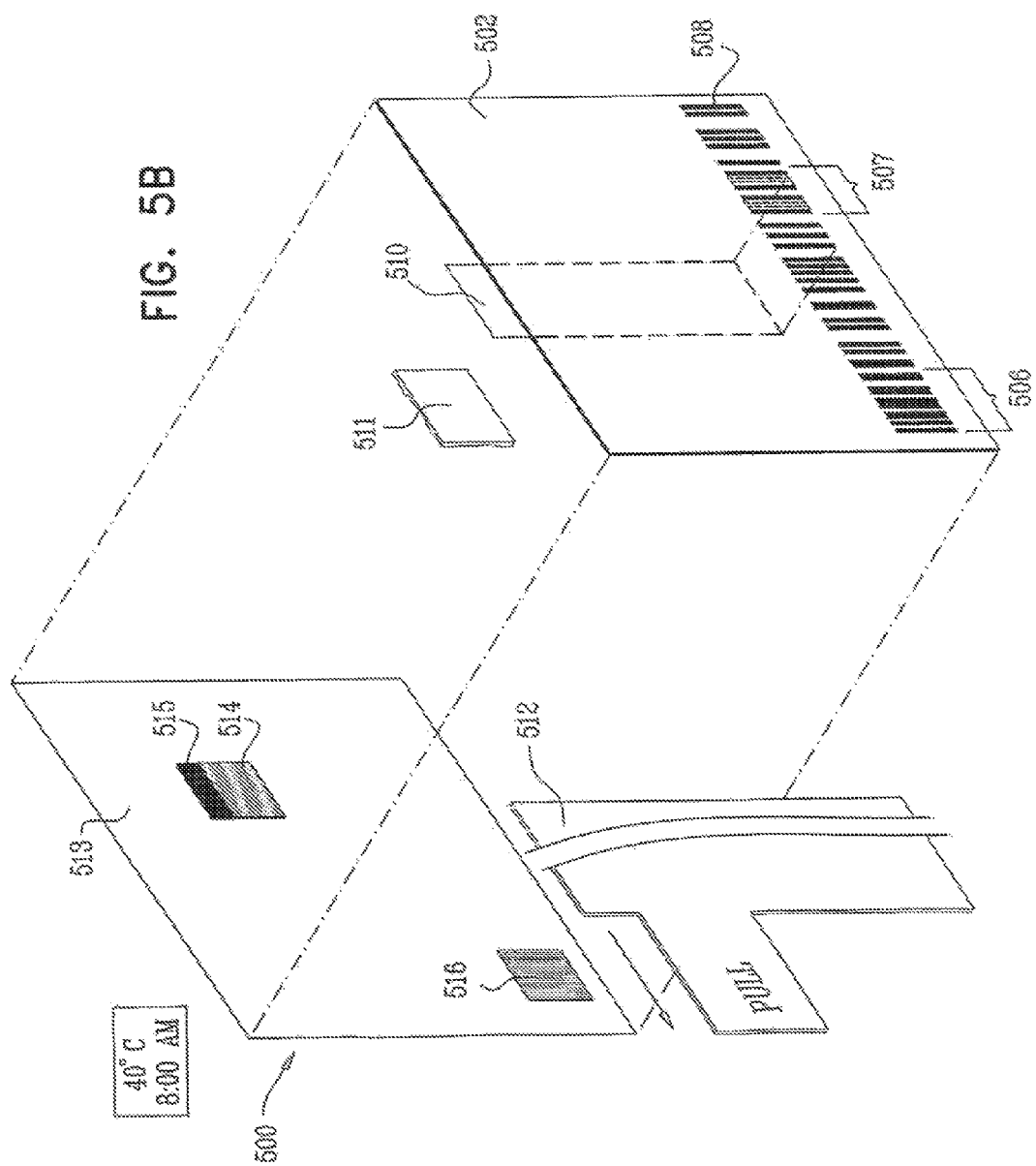

Reference is not made to FIGS. 5A-5F, which together are a simplified illustration of the construction and operation of one embodiment of the quality indicator 321 of FIG. 3B for indicating time in temperature history. As seen in FIG. 5A, the quality indicator, here designated by reference numeral 500, preferably includes a barcode defining layer 502, which is preferably printed on a transparent substrate. The printing on the transparent substrate preferably defines a background area, which is preferably printed in a white color, a barcode in a first visible state 504 which is preferably printed in a black color, and a plurality of transparent areas 506 and 507 associated with the barcode, which are not printed. Alternatively, the background area and the barcode are printed in such colors as to define high contrast therebetween. The barcode in the first visible state 504 is machine readable in this embodiment and is typically readable by a barcode reader as 7431348787736.

If transparent areas 506 are colored and read together with the barcode in the first visible state 504, there is provided a barcode in a second visible state 508 typically readable by a barcode reader as 7811348787736. If both transparent areas 506 and 507 are colored and read together with the barcode in the first visible state 504, there is provided a barcode in a third visible state 509 typically readable by a barcode reader as 7 811348782236. There is also a theoretical possibility that the transparent areas 507 could be colored and 506 could not be colored, but it is not practical in the present embodiment.

Disposed behind the transparent areas 507 extending perpendicular to the barcode and preferably adhered to barcode defining layer 502 is a colorable element 510, such as Whatman No. 3 filter paper, commercially available from Whatman [CAT#: 1003917], which until colored is normally white. Disposed behind the barcode defining layer 502 and behind the colorable element 510 and preferably adhered thereto is a dissolvable activation delay layer 511 formed, for example from Ethyl Cellulose [CAS#: 9004-57-3]. The activation delay layer 511 is dissolvable by a suitable solvent, as described hereinbelow, and until dissolved prevents the passage therethrough of coloring agents employed in this embodiment of the present invention.

It is appreciated that the dissolvable activation delay layers 511 may provide selectable and possible different delay durations over any suitable range of durations which may extend from effectively zero to any suitable maximum. Such selectability may be effected, for example, by varying thickness, material coatings and/or structure.

Disposed behind the activation delay layer 511 is a pull strip 512, corresponding to the pull strip 200 in FIG. 2A, and the pull strip 322 in FIG. 3B. The pull strip 512 is preferably white and prevents the passage therethrough of coloring agents and solvents employed in this embodiment of the invention. Preferably, the pull strip 512 is formed of polyester, for example Melinex®401, commercially available from DuPont of Wilmington, Del., and is preferably 75 micrometers thick.

Disposed behind the pull strip 512 is a back layer 513 to which is preferably adhered, rearwardly of the colorable element 510 and of the activation delay layer 511 but not rearwardly of the barcode, a temperature responsive coloring element 514, such as a pad, for example, K-R: 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in a solution of 74.25%; Coconut oil [CAS: 8001-31-8], 24.75% Oleic acid [CAS: 112-80-1] and 1% Hexanoic acid [CAS: 142-62-1].

Adjacent the coloring element 514 or combined therewith is a solvent 515, such as Methyl laurate [CAS#: 111-82-0] which, as noted above, is operative to dissolve the dissolvable activation delay layer 511, preferably after a predetermined period of Time, which is preferably measured in hours, such as eight hours. The solvent 515 may be temperature-responsive.

A colored area 516 is formed on the back layer 513, rearwardly of the transparent areas 506, in order to define high contrast with the barcode defining layer 502, when the pull strip 513 is removed.

Until such time as the pull strip 512 is removed, the quality indicator 500 is nonresponsive to temperature changes and remains in the first visible state 504.

Turning now to FIG. 5B, once the pull strip 512 is removed, the solvent 515 begins to dissolve the dissolvable activation delay layer 511. Prior to the dissolvable activation delay layer 511 becoming permeable to the coloring agent in the temperature responsive coloring element 514, the quality indicator 500 does not provide a readable indication responsive to temperature changes and the portions of the colored area 516 which are visible through the transparent areas 506 appear similar to the bars of the barcode in the first visible state 504 and can be read together therewith as a single barcode in the second visible state 508. It is appreciated that the time needed to achieve dissolution of dissolvable activation delay layer 511 may be determined for example by the thickness thereof.

Turning now to FIG. 5C, once the dissolvable activation delay layer 511 becomes permeable to the coloring agent in the temperature responsive coloring element 514, typically for 8 hours, the quality indicator 500 becomes responsive to temperature changes. As long as the temperature at the quality indicator does not reach a predetermined temperature for example 21 degrees Celsius, for at least a predetermined cumulative amount of time for example for one hour, the quality indicator remains in the second visible state 508.

Figure 5D:
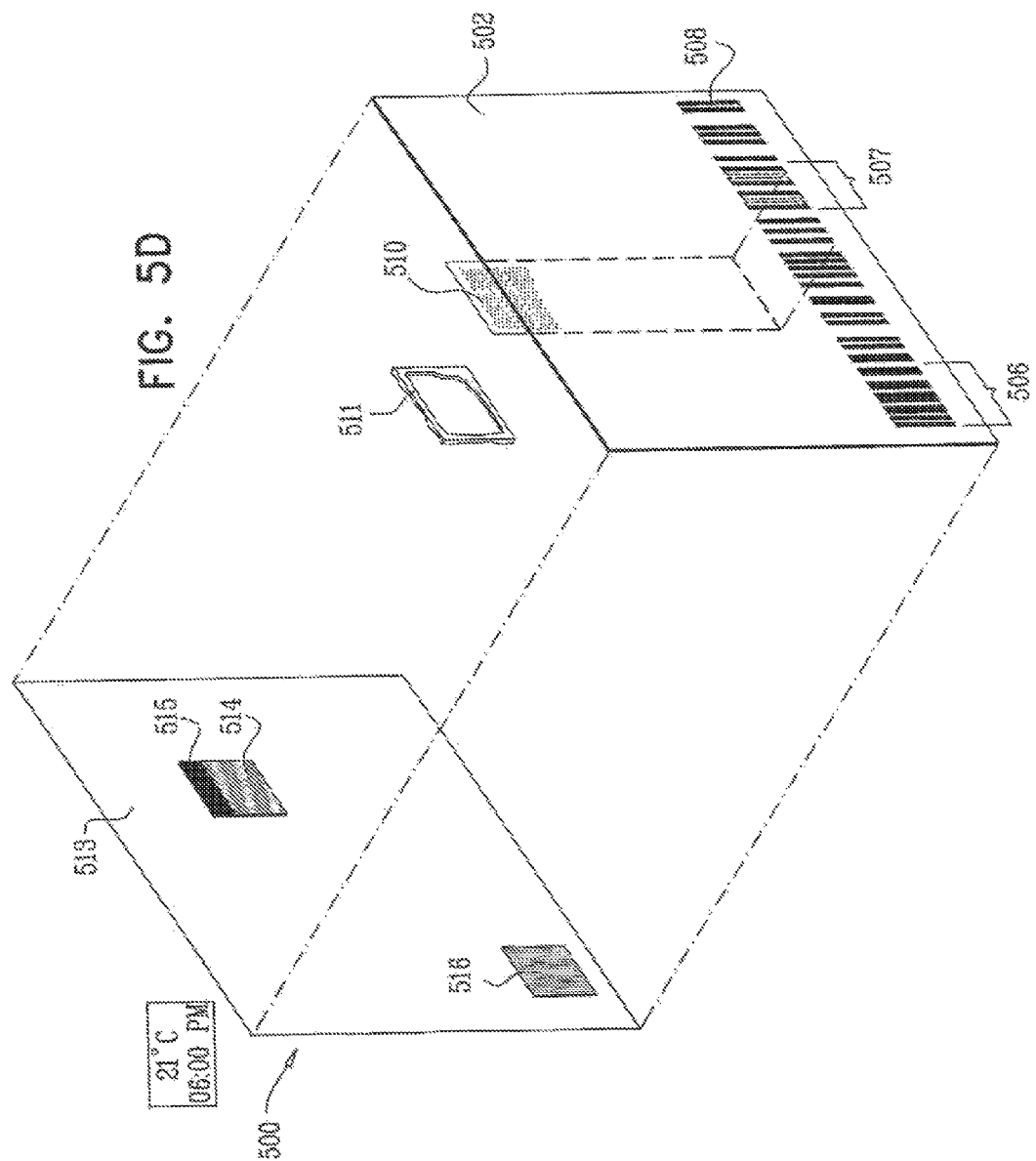
Figure 5E:
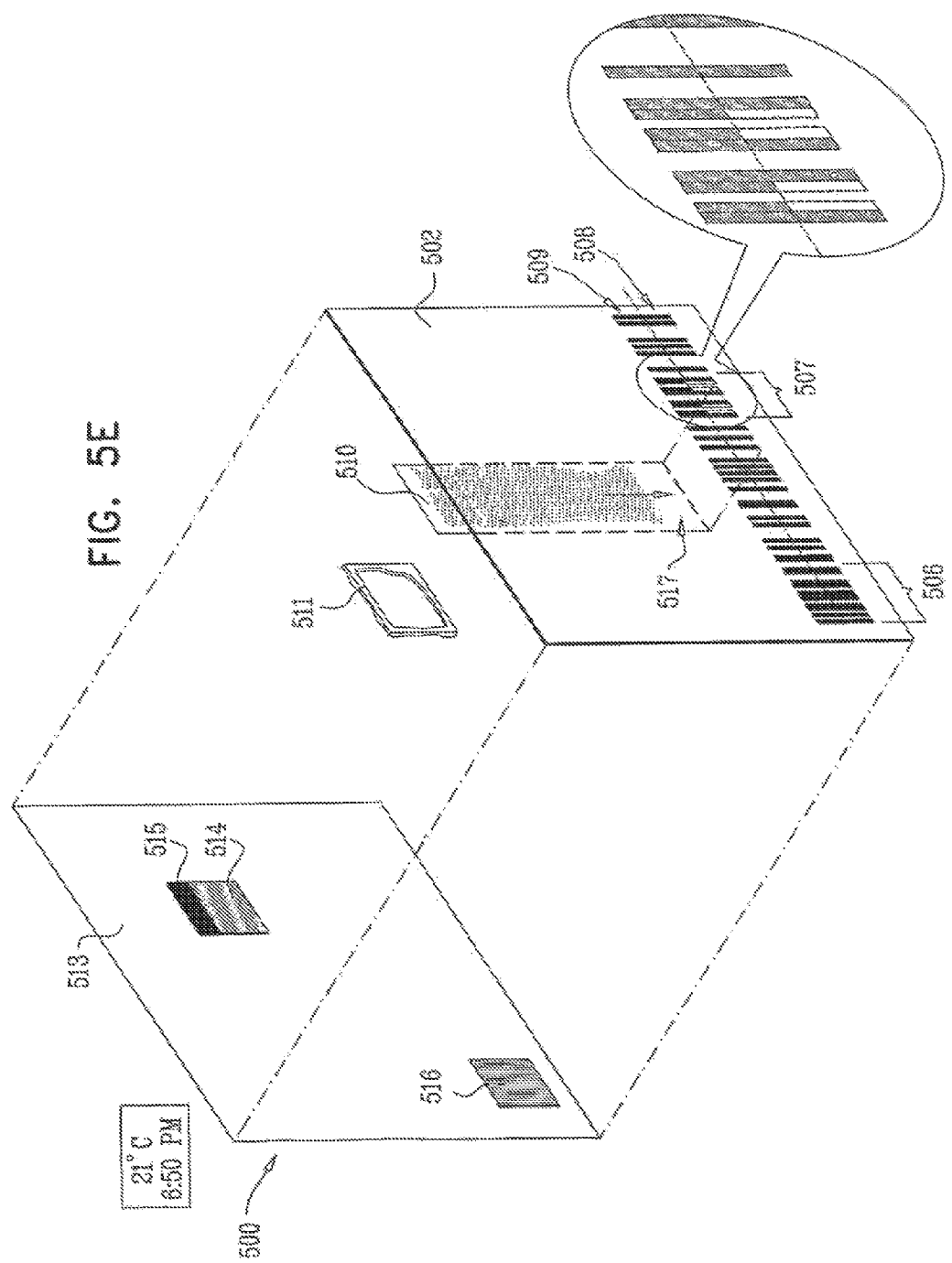

Turning now to FIG. 5D, when the temperature as the quality indicator reaches the predetermined temperature, typically 21 degrees Celsius, the coloring agent in the coloring element 514 begins to melt and be released from the coloring element 514 and begins to diffuse through the colorable element 510.

It is appreciated that if the temperature thereafter drops below 21 degrees Celsius the coloring agent continues to diffuse through the colorable element 510. If, after the temperature reaches 21 Celsius, the temperature drops below 17 degrees Celsius, the coloring agent becomes solid and diffusion thereof through the colorable element 510 is suspended until the temperature again reaches 21 degrees Celsius.

It is appreciated that the elapsed time from the start of diffusion of the coloring agent from coloring element 514 along the colorable element 510 until portions of the colorable element 510 which are visible through the transparent areas 507 start to become colored is defined for example by the length of the colorable element 510 between the area in front of the coloring element 514 and the area underlying the transparent areas 507. Additionally, this elapsed time is a function of the material from which the colorable element 510 is made.

As seen in. FIG. 5B, when the temperature is at least 21 degrees Celsius for at least a predetermined cumulative amount of time, such as 21 degrees Celsius for fifty minutes, the coloring agent diffuses through the colorable element 510, such that the portions of the colorable element 510 which are visible through the transparent areas 507 start to become colored and appear similar to the bars of the barcode in the first visible state 504. It is appreciated that since the direction of diffusion of the coloring agent through the colorable element 510 underlying the barcode is perpendicular to the barcode, as indicated by reference numeral 517, portions of the barcode in the transparent areas 507 can be read together with the barcode in the first visible state 504 and with the transparent areas 506 as a single barcode even before the colorable element 510 is fully colored by the coloring agent.

The portions of the barcode in the transparent areas 507 which are colored and appear similar to the bars of the barcode In the first visible state 504 can be read together therewith and with the transparent areas 506 as single barcode in the third visible state 509. The portions of the barcode in the transparent areas 507 which are not colored and do not appear similar to the bars of the barcode in the first visible state 504 can be read together with the transparent areas 506 as a single barcode in the second visible state 508. Thus it is appreciated that normally at all times following actuation, a readable barcode is present.

It is appreciated that the appearance of the quality indicator 500 during the transition illustrated in FIG. 5B may be somewhat problematic in that two alternate readings are possible. It is nevertheless believed that this situation is preferable to a situation wherein the quality indicator 500 is not at all readable during the transition, inter alia since the quality indicator may include portions that are not in transition and further since it is possible to program the indication interpreter to prefer an exceedance indication over a subsequently read non-exceedance indication. It is desirable that the time duration of the transition be as short as possible.

Turning now to FIG. 5F, following the elapse of an additional amount of time at a temperature of at least 21 degrees Celsius, typically 10 minutes, the coloring agent is fully diffused through the colorable element 510. Consequently, all portions of the colorable element 510 which are visible through the transparent areas 507 are colored and appear secular to the bars of the barcode in the first visible state 504, and can be read together therewith and with the transparent areas 506 as a single barcode in the third visible state 509.

Figure 6C:
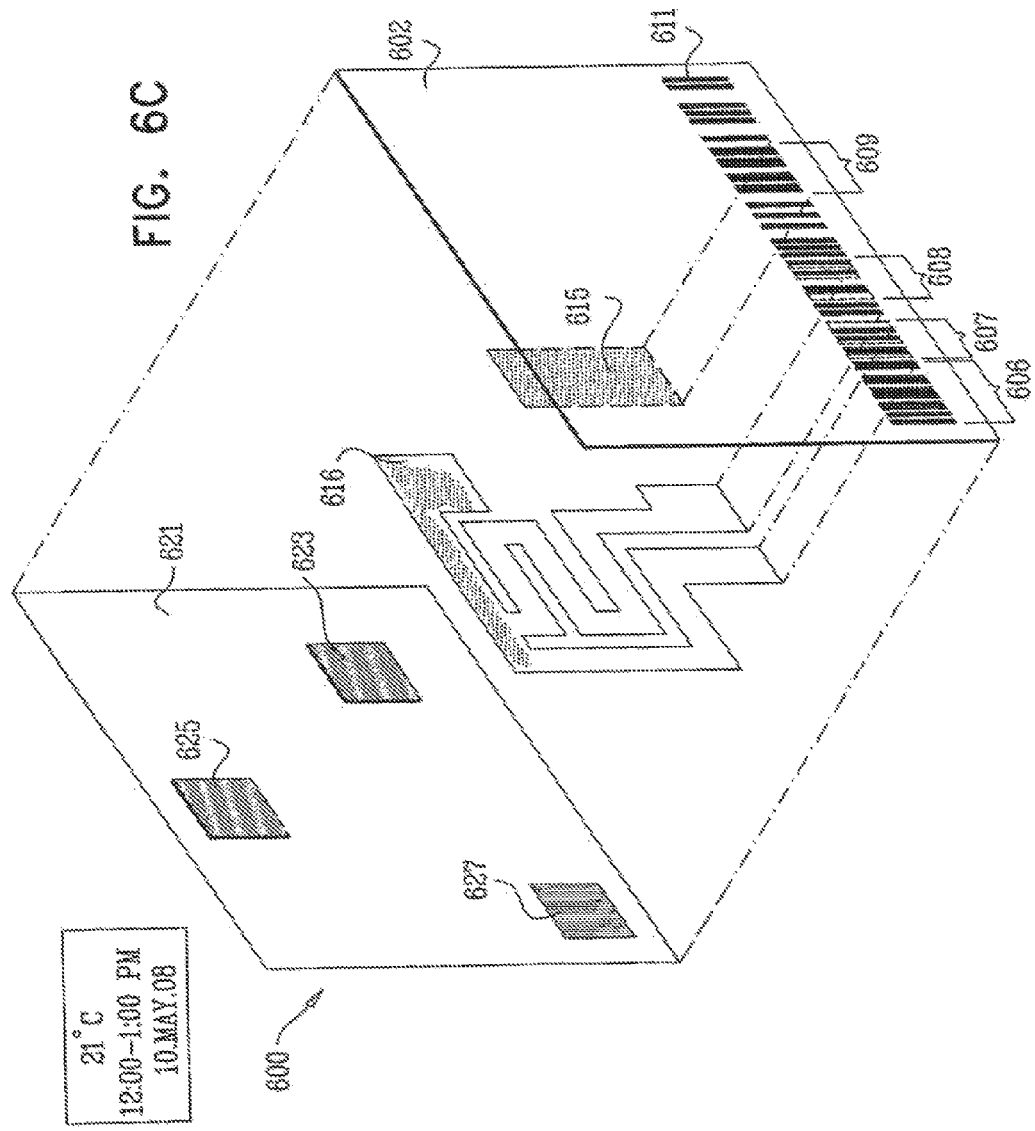
Figure 6E:
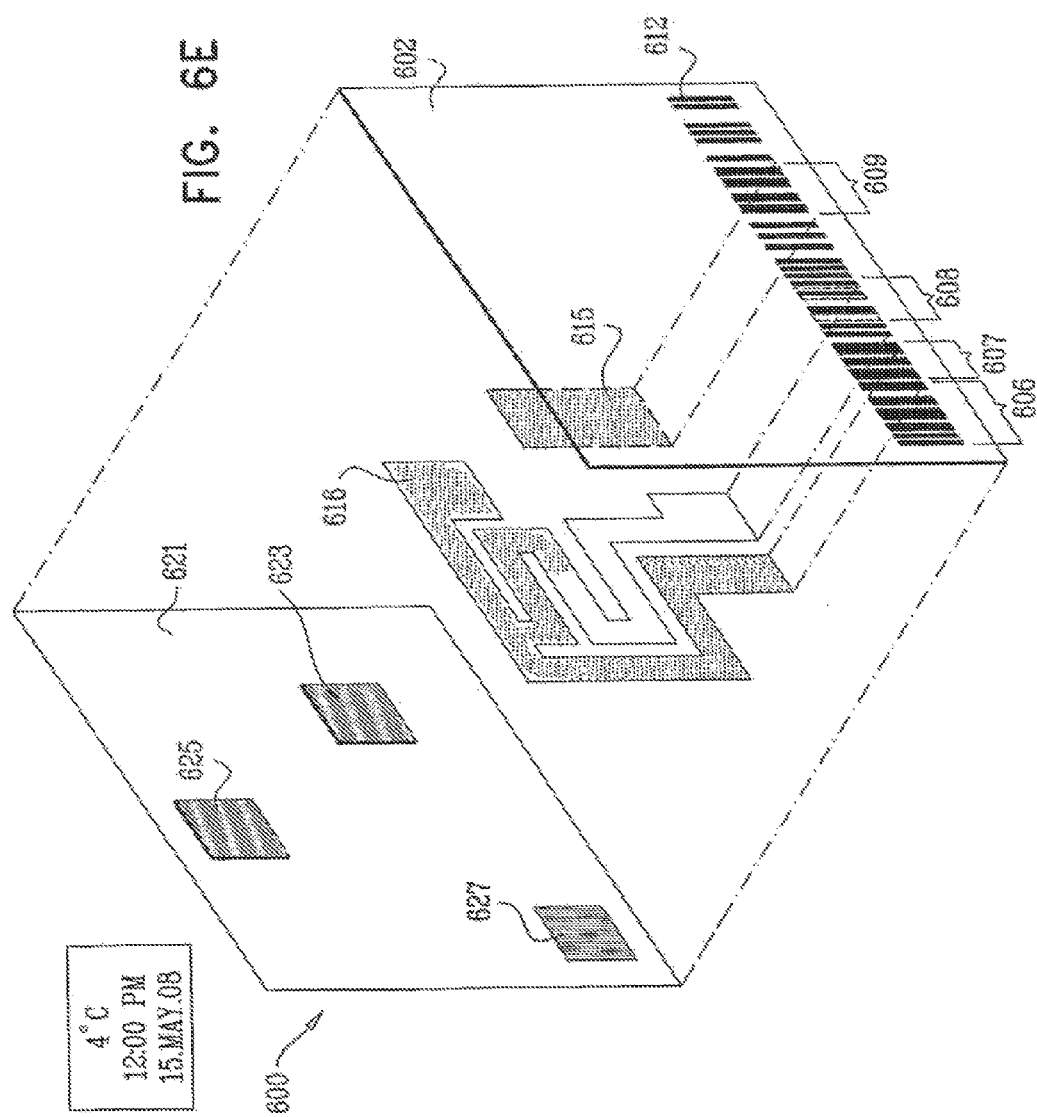

Reference is now made to FIGS. 6A-6F, which together are a simplified illustration of the construction and operation of one embodiment of the quality indicator 341 of FIG. 5C for separately indicating elapsed time and temperature history. As seen in FIG. 6A, the quality indicator, here designated by reference numeral 600, preferably includes a barcode defining layer 602, which is preferably printed on a transparent substrate. The printing on the transparent substrate preferably defines a background area, which is preferably printed in a white color, a barcode in a first visible state 604 which is preferably printed in a black color, and a plurality of transparent areas 606, 607, 608 and 609 associated with the barcode, which are not printed. Alternatively, the background area and the barcode are printed in such colors as to define high contrast therebetween. The barcode in the first visible state 604 is machine readable in this embodiment and is typically readable by a barcode reader as 74131348787736.

If the transparent areas 600 are colored and read together with the barcode in the first visible state 604, there is provided a barcode in a second visible state 610 typically readable by a barcode reader as 7811348787736. If both transparent areas 606 and 609 are colored and read together with the barcode in the first visible state 604, there is provided a barcode in a third visible state 611 typically readable by a barcode reader as 7 811348782236. If the transparent arena 606, 607 and 609 are colored and read together with the barcode in the first visible state 604, there is provided a barcode in a fourth visible state 612 typically readable by a barcode reader as 781754878 2236. If the transparent areas 606, 607, 608 and 609 are colored and read together with the barcode in the first visible stale 604, there is provided a barcode in a fifth visible state 613 typically readable by a barcode reader as 781756278 2236.

There is also a theoretical possibility that any of the transparent areas 607, 608 and 609 could be colored and the transparent areas 606 could not be colored, but it is not practical in the present embodiment. There is an additional theoretical possibility that the transparent areas 608 could be colored and the transparent areas 607 could not be colored, but this is not practical in the present embodiment. It is also possible that a combination of transparent areas which is not presented in the present embodiment will be colored.

Disposed behind the transparent areas 609 extending perpendicular to the barcode and preferably adhered to the barcode defining layer 602 is a colorable element 615, such as Whatman No. 3 filter paper, commercially available from Whatman [CAT#: 1003917], which until colored is normally white. Disposed behind the transparent areas 607 and 608 and extending in a generally serpentine arrangement mainly in areas not lying behind the barcode and preferably adhered to the barcode defining layer 602 is a colorable element 616, such as Whatman No. 3 filter paper, commercially available from Whatman [CAT#: 1003917], which until colored is also normally white. Disposed behind the barcode defining layer 602 and behind the colorable elements 615 and 616 is a pull strip 620, corresponding to the pull strip 106 in FIG. 1A, and the pull strip 342 in FIG. 3C. The pull strip 620 is preferably white and prevents the passage therethrough of coloring agents employed in this embodiment of the invention. Preferably, the pull strip 620 is formed of polyester, for example Melinex®401, commercially available from DuPont of Wilmington, Del., and is preferably 75 micrometers thick.

Disposed behind the pull strip 620 is a back layer 621 to which is preferably adhered, rearwardly of the colorable element 615 but not rearwardly of the barcode, a temperature responsive coloring element 623. Also preferably adhered to the back layer 621, rearwardly of the colorable element 616 but not rearwardly of the barcode, is a coloring element 625, which is not temperature responsive in its operative temperature range. The coloring element 623 may be for example a pad, for example, K-R; 210/3/28, commercially available from Noam-Urim of Kibbutz, Urim, Israel, impregnated with a coloring agent, such as Sudan Black, a black color dye [CAS: 4197-25-5], dissolved at a ratio of 1 gm per 1 kg in Coconut oil [CAS: 8001-31-8]. The coloring element 625 may be for example a pad, for example, K-R; 210/34/28, commercially available from Noam-Urim of Kibbutz Urim, Israel, impregnated with a coloring agent such as Sudan Black, a black color dye [CAS: 4197-25-5], dissolved at a ratio of 1 gram, per 1 kg in Methyl laurate [CAS#: 111-82-0].

A colored area 627 is formed on the back layer 621, rearwardly of the transparent areas 606, in order to define high contrast with the barcode defining layer 602, when the pull strip 620 is removed.

Until such time as the pull strip 620 is removed, the quality indicator 600 is nonresponsive to temperature changes and elapsed time and remains in the first visible state 604.

Turning to FIG. 6B, once the pull strip 620 is removed, the quality indicator 600 becomes responsive to temperature changes and elapsed time. As long as the temperature at the quality indicator does not exceed a predetermined temperature, for example 21 degrees Celsius, for at least a predetermined cumulative amount of time, typically one hour, and a predetermined amount of time, typically seven days, has not elapsed since actuation of the indicator, the portions of the colored area 627 which are visible through the transparent areas 606 appear similar to the bars of the barcode in the first visible state 604 and can be read together therewith as a single barcode in the second visible state 610.

Following removal of the pull strip 620 the coloring agent in the coloring element 625, which is not temperature responsive in its operative temperature range, starts to diffuse through the colorable element 616.

Turning now to FIG. 6C, following removal of the pull strip 620 and once the temperature reaches the predetermined temperature, for example 21 degrees Celsius, for at least a predetermined cumulative amount of time, for example for one hour, the coloring agent in the coloring element 623 melts and is released from coloring element 623 and rapidly diffuses through the colorable element 615, such that the portions of the colorable element 615 which are visible through the transparent areas 609 become colored and appear similar to the bars of the barcode in the first visible state 604 and can be read together therewith and with areas 606 as a single barcode as in the third visible state 611.

It is appreciated that if, before the elapse of the predetermined amount of time the temperature drops below 21 degrees Celsius the coloring agent continues to diffuse through the colorable element 615. If, after the temperature reaches 21 degrees Celsius, the temperature drops below 17 degrees Celsius, the coloring agent becomes solid and diffusion thereof through the colorable element 615 is suspended until the temperature again reaches 21 degrees Celsius.

It is further appreciated that the elapsed tune from the start of diffusion of the coloring agent from the coloring element 623 along the colorable element 615 until portions of the colorable element 615 which are visible through the transparent areas 609 start to become colored is defined for example by the length of the colorable element 615 between the area in front of the coloring element 623 and the area underlying the transparent areas 609. Additionally, this elapsed time is a function of the material front which the colorable element 615 is made.

It is also appreciated that the elapsed time from the start of diffusion of the coloring agent from the coloring element 625 along the colorable element 616 until portions of the colorable element 616 which are visible through the transparent areas 607 and 608 start to become colored is defined for example by the length of the colorable element 616 between the area in front of the coloring element 625 and the area underlying the transparent areas 607 and 608. Additionally, this elapsed time is a function of the material from which the colorable element 616 is made.

It is further appreciated that the length of the colorable element 616 that leads to the transparent areas 608 may be greater than the length of the colorable element 616 that leads to the transparent areas 607, and correspondingly the time taken for the coloring agent in the coloring element 625 to reach the transparent areas 608 may be longer than the time required for the coloring agent to reach the transparent areas 607.

As seen in FIG. 6D, after the elapse of a predetermined amount of time, typically seven days, since removal of the pull strip 620, the coloring agent diffuses through the colorable element 616, such that the portions of the colorable element 616 which are visible through the transparent areas 607 start to become colored and appear similar to the bars of the barcode in the first visible state 604. It is appreciated that since the direction of diffusion of the coloring agent through the colorable element 616 underlying the barcode is perpendicular to the barcode, as indicated by reference numeral 630, portions of the barcode in areas 607 can be read together with the barcode in the first visible state 604 and with the transparent areas 606 and 609 as a single barcode even before the colorable element 616 is fully colored by the coloring agent.

The portions of the barcode in the transparent areas 607 which are colored and appear similar to the bars of the barcode in the first visible state 604 can be read together therewith and with the transparent areas 606 and 609 as a single barcode in the fourth visible state 612. The portions of the barcode in the transparent areas 607 which are not colored and do not appear similar to the bars of the barcode in the first visible state 604 can be read together with the transparent areas 606 and 609 as a single barcode in the third visible state 611. Thus it is appreciated that normally at all times following actuation, a readable barcode is present.

It is appreciated that the appearance of the quality indicator 600 during the transition illustrated in FIG. 6D may be somewhat problematic in that two alternative readings are possible. It is nevertheless believed that this situation is preferable to a situation wherein the quality indicator 600 is not at all readable during the transition, inter alia since the quality indicator may include portions that are not in transition and further since it is possible to program the indication interpreter to prefer an exceedance indication over a subsequently read non-exceedance indication. It is desirable that the time duration of the transition be as short as possible.

Turning now to FIG. 6B, following the elapse of an additional amount of time, typically 10 minutes, the coloring agent, is fully diffused through the portion of the colorable element 616 which leads to the transparent areas 607. Consequently, all portions of the colorable element 616 which are visible through the transparent areas 607 are colored and appear similar to the bars of the barcode in the first visible state 604, and can be read together therewith and with areas 606 and 609 as a single barcode in the fourth visible states 612.

Turning to FIG. 6F, after the elapse of an additional predetermined amount of time, typically another seven days, the coloring agent in the coloring element 625 is fully diffused through the colorable element 616. Consequently, the portions of the colorable element 616 which are visible through the transparent areas 608 are colored and appear similar to the bars of the barcode in the first visible state 604, and can be read together therewith and with areas 606, 607 and 609, as a single barcode as in the fifth visible state 613. It is appreciated that normally at all times following actuation, a readable barcode is present.

Figure 7A:
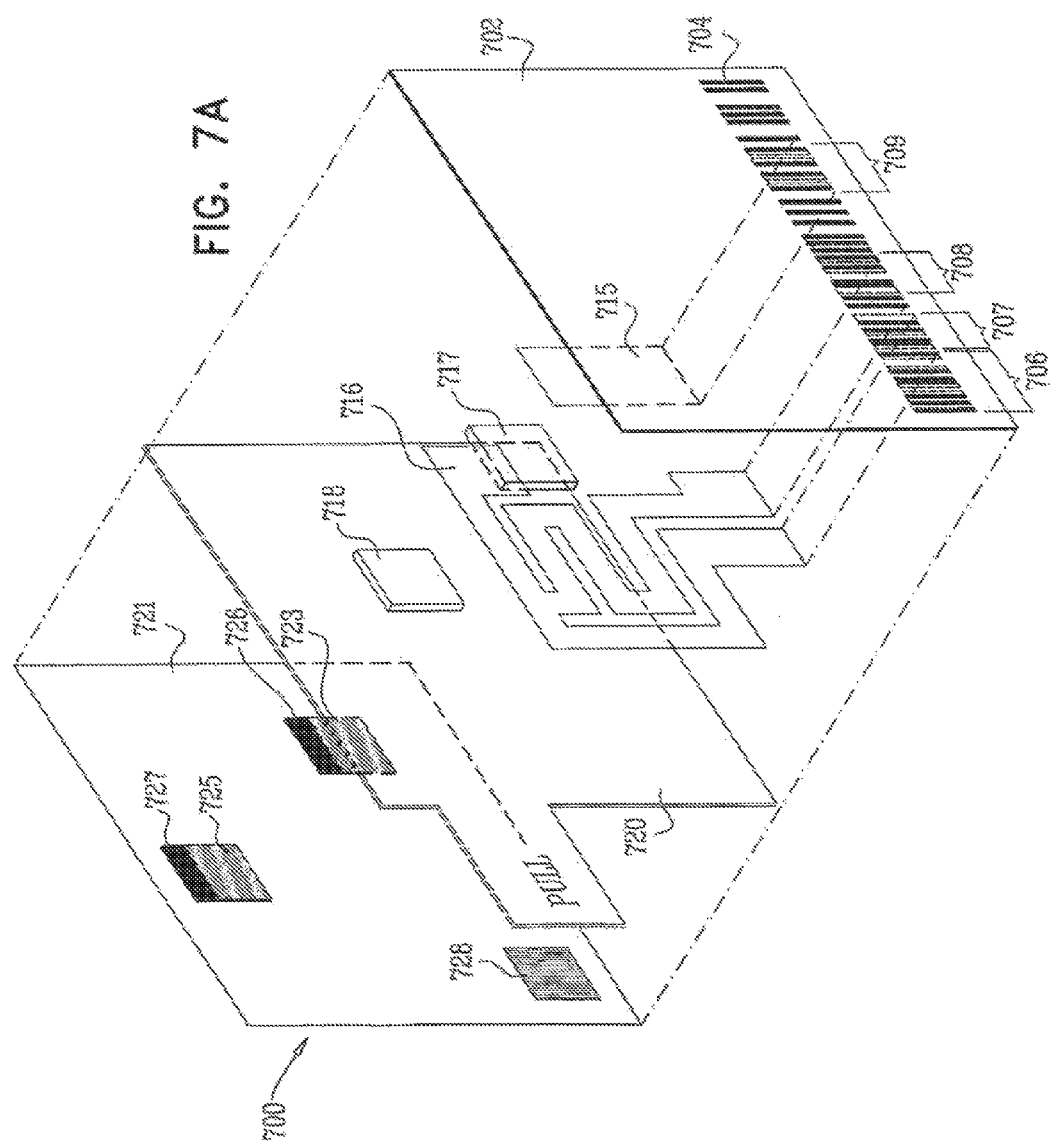

Reference is now made to FIGS. 7A-7G, which together are a simplified illustration of the construction and operation of one embodiment of the quality indicator 361 of FIG. 3D separately indicating elapsed time and temperature history. As seen in FIG. 7A, the quality indicator, here designated by reference numeral 700, preferably includes a barcode defining layer 702, which is preferably printed on a transparent substrate. The printing on the transparent substrate preferably defines a background area, which is preferably printed in a white color, a barcode in a first visible state 704 which is preferably printed in a black color, and a plurality of transparent areas 706, 707, 708 and 709 associated with the barcode, which are not printed. Alternatively, the background area and the barcode are printed in such colors as to define high contrast therebetween. The barcode in the first visible state 704 is machine readable in this embodiment and is typically readable by a barcode reader as 7431348787736.

If the transparent areas 706 are colored and read together with the barcode in the first visible state 704, there is provided a barcode in a second visible state 710 typically readable by a barcode reader as 7811348787736. If both transparent areas 706 and 709 are colored and read together with the barcode in the first visible state 704, there is provided a barcode in a third visible state 711 typically readable by a barcode reader as 7 811348782236. If the transparent areas 706, 707 and 709 are colored and read together with the barcode in the first visible state 704, there is provided a barcode in a fourth visible state 712 typically readable by a barcode reader as 781754878 2236. If the transparent areas 706, 707, 708 and 709 are colored and read together with the barcode in the first visible state 704, there is provided a barcode in a fifth visible state 713 typically readable by a barcode reader as 781756278 2236.

There is also a theoretical possibility that any of the transparent areas 707, 708 and 709 could be colored and the transparent areas 706 could not be colored, but it is not practical in the present embodiment. There is an additional theoretical possibility that the transparent areas 708 could be colored and the transparent areas 707 could not be colored but this is not practical in the present embodiment. It is also possible that a combination of transparent areas which is not presented in the present embodiment will be colored.

Disposed behind the transparent areas 709 extending perpendicular to the barcode and preferably adhered to the barcode defining layer 702 is a colorable element 715, such as Whatman No. 3 filter paper, commercially available from Whatman [CAT#: 1003917], which until colored is normally white. Disposed behind the transparent areas 707 and 708 and extending in a generally serpentine arrangement mainly in areas not lying behind the barcode and preferably adhered to the barcode defining layer 702 is a colorable element 716, such as Whatman No. 3 filter paper, commercially available from Whatman [CAT#: 1003917], which until colored is also normally white. Disposed behind the barcode defining layer 702 and behind the colorable element 715 and preferably adhered thereto is a dissolvable activation delay layer 717 formed, for example from Ethyl Cellulose [CAS#: 9004-57-3]. Disposed behind the barcode defining layer 702 and behind the colorable element 716 and preferably adhered thereto is a dissolvable activation delay layer 718 formed, for example from Ethyl Cellulose [CAS#: 9004-57-3]. The dissolvable activation delay layers 717 and 718 are dissolvable by suitable solvents, as described hereinbelow, and until dissolved prevent the passage therethrough of coloring agents employed in this embodiment of the present invention.

It is appreciated that one or both dissolvable activation delay layers 717 and 718 may provide selectable and possible different delay durations over any suitable range of durations which may extend from effectively zero to any suitable maximum. Such selectability may be effected, for example, by varying thickness, material, coatings and/or structure.

Disposed behind the dissolvable activation delay layers 717 and 718 is a pull strip 720, corresponding to the pull strip 200 in FIG. 2A, and the pull strip 362 in FIG. 3D. The pull strip 720 Is preferably white and prevents the passage therethrough of coloring agents and solvents employed in this embodiment of the invention. Preferably, the pull strip 720 is formed of polyester, for example Melinex®401, commercially available from DuPont of Wilmington, Del., and is preferably 75 micrometers thick.

Disposed behind the pull strip 720 is a back layer 721 to which is preferably adhered, rearwardly of the colorable element 715 and of the activation delay layer 717 but not rearwardly of the barcode, a temperature responsive coloring element 723. Also preferably adhered to the back layer 721, rearwardly of the colorable element 716 and of the activation delay layer 718 and preferably not rearwardly of the barcode, Is a coloring element 725 which is not temperature responsive in its operative temperature range. The coloring element 723 may be for example a pad, for example, K-R; 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in Coconut oil [CAS: 8001-31-8]. The coloring element 725 may be for example a pad, for example, K-R; 210/34/28, commercially available from Noam-Urim of Kibbutz Urim, Israel, impregnated with a coloring agent such as Sudan Black, a black color dye [CAS: 4197-25-5], dissolved at a ratio of 1 gram per 1 kg in Methyl laurate [CAS#: 111-82-0].

Adjacent the coloring element 723 or combined therewith is a solvent 726. Adjacent the coloring element 725 or combined therewith is a solvent 727. The solvents 726 and 727 may be for example Methyl laurate [CAS#:111-82-0], which, as noted above, are operative to dissolve the dissolvable activation delay layers 717 and 718, preferably after a predetermined period of time, which is preferably measured in hours, such as eight hours. Any of the solvents 726 and 727 may be temperature responsive.

A colored area 728 is formed on the back layer 721, rearwardly of the transparent areas 706, in order to define high contrast with the barcode defining layer 702, when the pull strip 720 is removed.

Until such time as the pull strip 720 is removed, the quality indicator 700 is nonresponsive to temperature changes and elapsed time and remains in the first visible state 704.

Turning to FIG. 7B, once the pull strip 720 is removed, the solvents 726 and 727 begin to dissolve the respective dissolvable activation delay layers 717 and 718. Prior to dissolvable activation delay layers 717 and 718 becoming permeable to the coloring agents in the coloring element 723 and 725, the quality indicator 700 does not provide a readable indication responsive to temperature changes and elapsed time and the portions of the colored area 728 which are visible through the transparent areas 706 are colored and appear similar to the bars of the barcode in the first visible state 704 and can be read together therewith as a single barcode in the second visible state 710. It is appreciated that the time needed to achieve dissolution of dissolvable activation delay layers 717 and 718 may be determined for example by the thickness thereof.

Figure 7C:
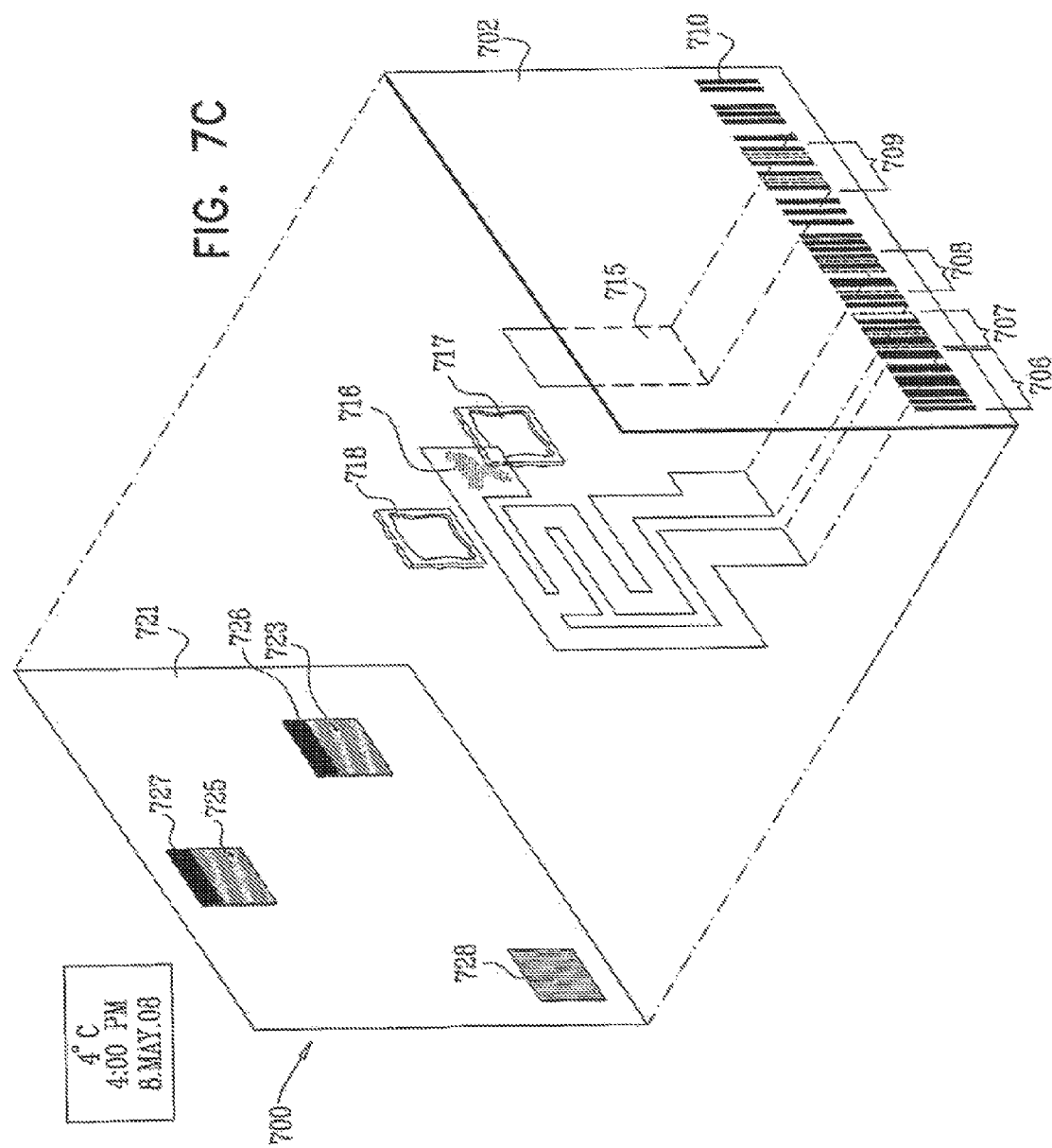

Turning to FIG. 7C, once the dissolvable activation delay layers 717 and 718 become permeable to the coloring agents in the coloring elements 723 and 725, typically after 8 hours, the quality indicator 700 becomes responsive to temperature changes and elapsed time, and the coloring agent in the coloring element 725, which is not temperature responsive in its operative temperature range, starts to diffuse through the colorable element 716.

Figure 7D:
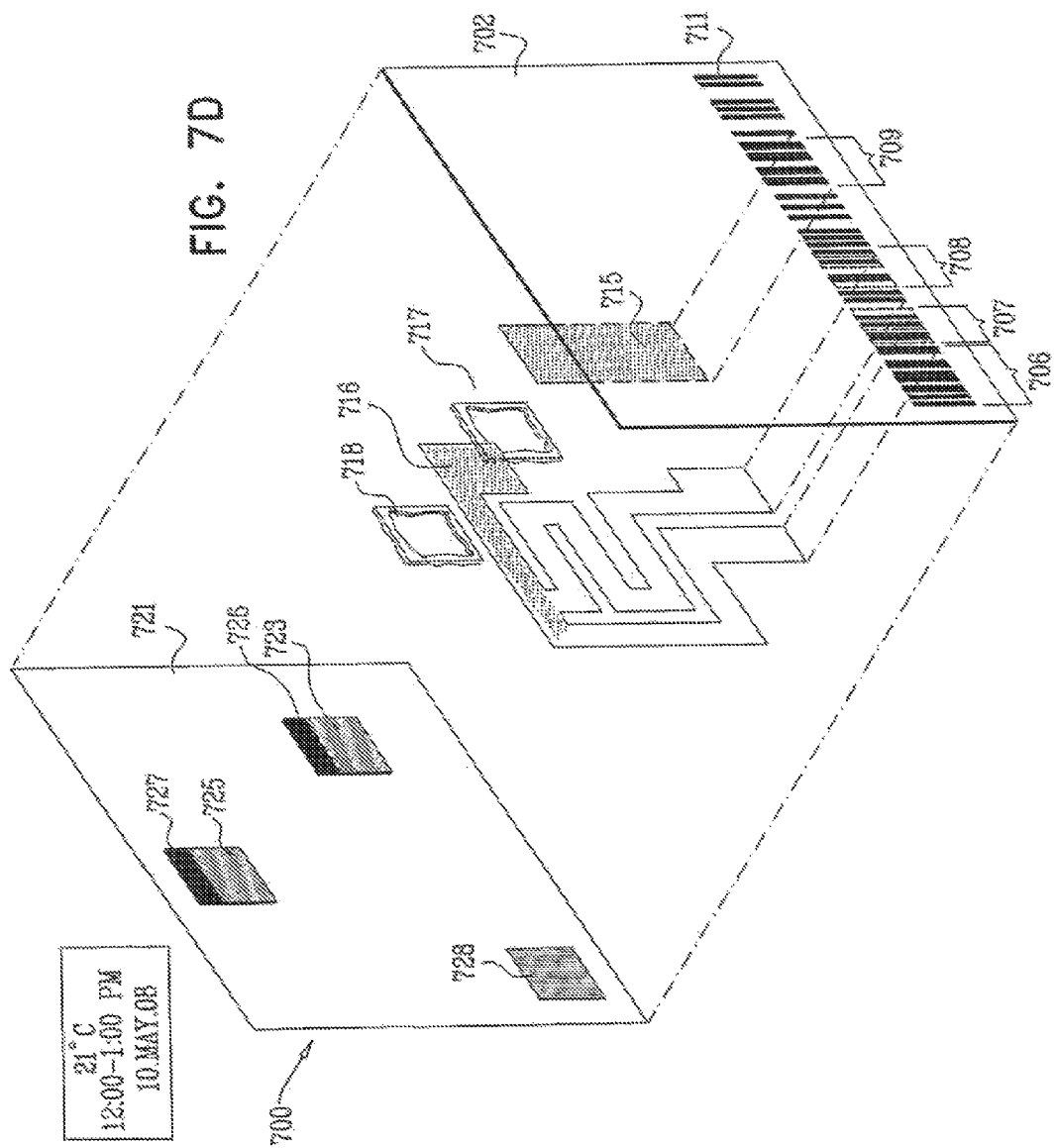

Turning to FIG. 7D, once the temperature reaches a predetermined temperature, for example 21 degrees, for at least a predetermined cumulative amount of time, for example for one hour, the temperature responsive coloring agent in the coloring element 723 melts and is released from the coloring element 723 and rapidly diffuses through the colorable element 715, such that the portions of the colorable element 715 which are visible through the transparent areas 709 are colored and appear similar to the bars of the barcode in the first visible state 704 and can be read together therewith and with the transparent areas 706 as a single barcode as in the third visible state 711.

It is appreciated that if, before the elapse of the predetermined amount of time the temperature drops below 21 degrees Celsius the coloring agent continues to diffuse through the colorable element 715. If, after the temperature reaches 21 degrees Celsius, the temperature drops below 17 degrees Celsius, the coloring agent becomes solid and diffusion thereof through the colorable element 715 is suspended until the temperature again reaches 21 degrees Celsius.

It is further appreciated that the elapsed time from the start of diffusion of the coloring agent from the coloring element 723 along the colorable element 715 until portions of the colorable element 715 which are visible through the transparent areas 709 start to become colored is defined for example by the length of the colorable element 715 between the area in front of the coloring element 723 and the area underlying the transparent areas 709. Additionally, this elapsed time is a function of the material from which the colorable element 715 is made.

It is also appreciated that the elapsed time from the start of diffusion of the coloring agent from the coloring element 725 along the colorable element 716 until portions of the colorable element 716 which are visible through the transparent areas 707 and 708 start to become colored is defined for example by the length of the colorable element 716 between the area in front of the coloring element 725 and the area underlying the transparent areas 707 and 708. Additionally, this elapsed time is a function of the material from which the colorable element 716 is made.

It is further appreciated that the length of the colorable element 716 that leads to the transparent areas 708 may be greater than the length of the colorable element 716 that leads to the transparent areas 707, and correspondingly the time taken for the coloring agent in the coloring element 725 to reach the transparent areas 708 may be longer than the time required for the coloring agent to reach the transparent areas 707.

Figure 7E:
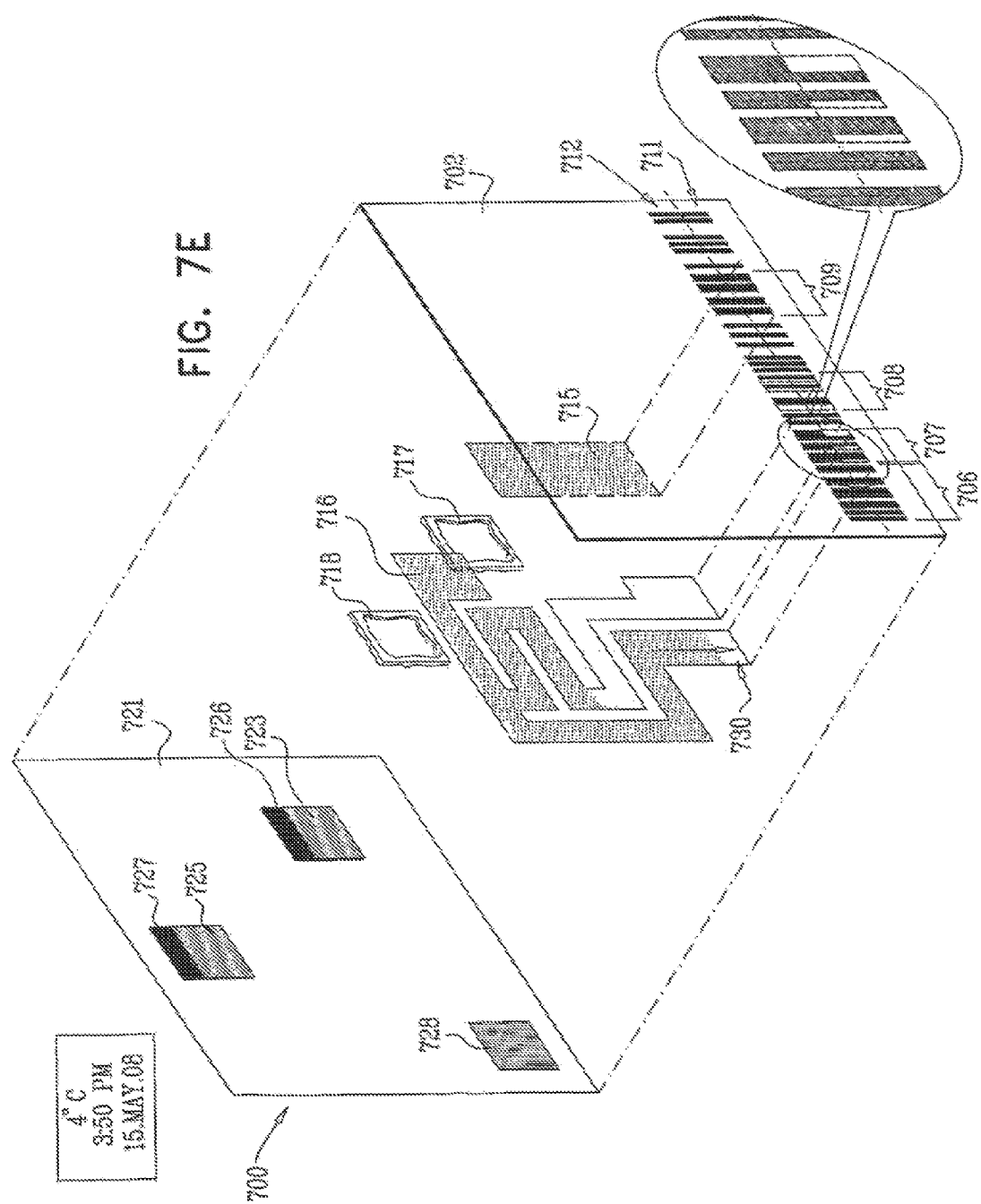

Turning to FIG. 7E, after the elapse of a predetermined amount of time, typically seven days, since dissolution of the activation delay layer 718, the coloring agent diffuses through the colorable element 716, such that the portions of the colorable element 716 winch are visible through the transparent areas 707 start to become colored and appear similar to the bars of the barcode in the first visible state 704. It is appreciated that since the direction of diffusion of the coloring agent through the colorable element 716 underlying the barcode is perpendicular to the barcode, as indicated by reference numeral 730, portions of the barcode in the transparent areas 707 can be read together with the barcode in the first visible state 704 and with the transparent areas 706 and 709 as a single barcode even before the colorable element 716 is fully colored by the coloring agent.

The portions of the barcode in the transparent areas 707 which are colored and appear similar to the bars of the barcode in the first visible state 704 can be read together therewith and with the transparent areas 706 and 709 as a single barcode in the fourth visible state 712. The portions of the barcode in the transparent areas 707 which are not colored and do not appear similar to the bars of the barcode in the first visible state 704 con be read together with the transparent areas 706 and 709 as a single barcode in the third visible state 711. Thus it is appreciated that normally at all times following actuation, a readable barcode is present.

It is appreciated that the appearance of the quality indicator 700 during the transition illustrated in FIG. 7E may be somewhat problematic in that two alternative readings are possible. It is nevertheless believed that this situation is preferable to a situation wherein the quality indicator 700 is not at all readable during the transition, inter alia since the quality indicator may include portions that are not in transition and further since it is possible to program the indication interpreter to prefer an exceedance indication over a subsequently read non-exceedance indication. It is desirable that the time duration of the transition be as short as possible.

Figure 7F:
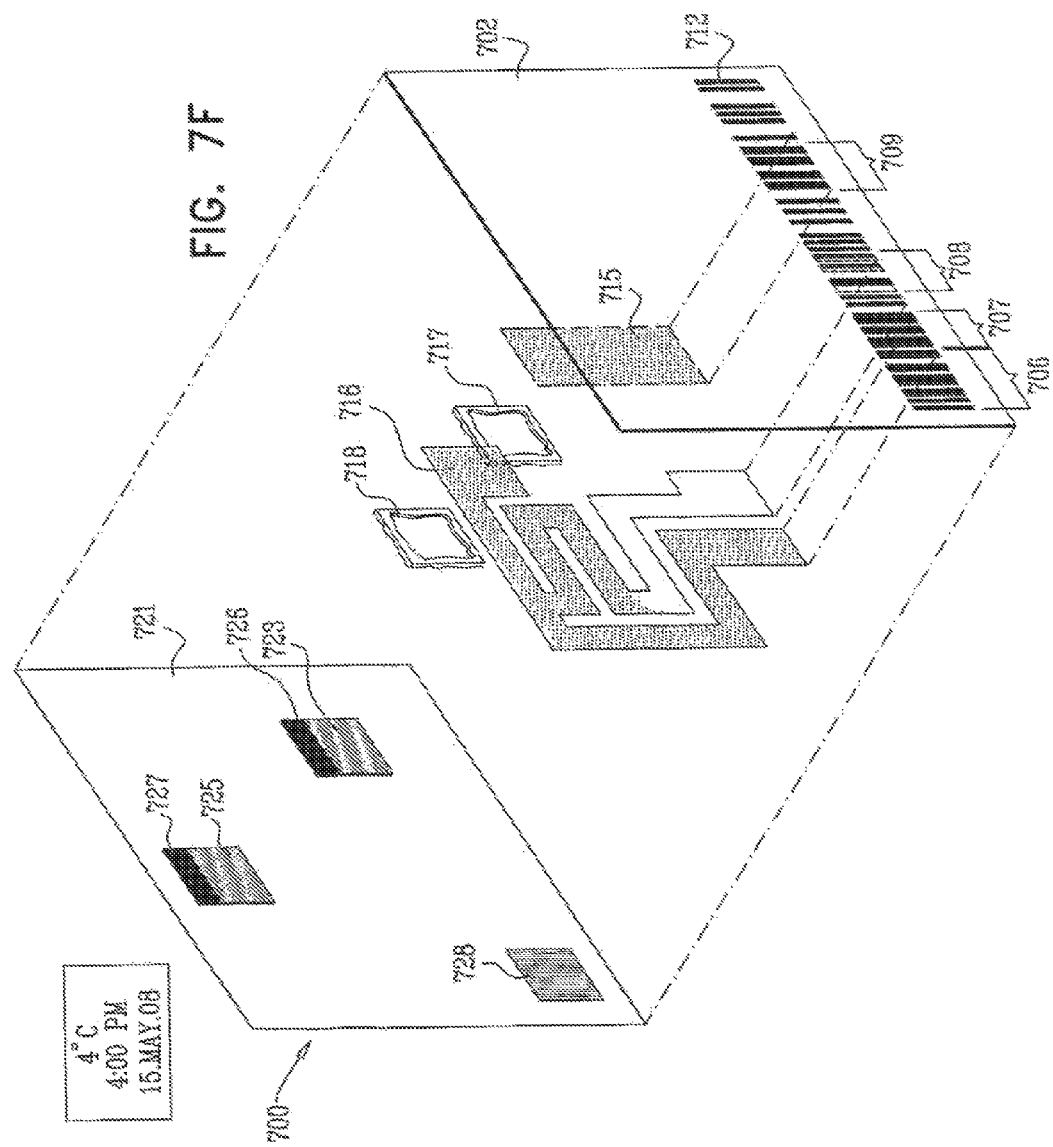

Turning now to FIG. 7F, following the elapse of an additional amount of time, typically 10 minutes, the coloring agent is fully diffused through the portion of the colorable element 716 which leads to the transparent areas 707. Consequently, all portions of the colorable element 716 which are visible through the transparent areas 707 are colored and appear similar to the bars of the barcode in the first visible state 704, and can be read together therewith and with the transparent areas 706 and 709 as a single barcode in the fourth visible state 712.

Turning to FIG. 7G, after the elapse of an additional predetermined amount of time, typically another seven days, the coloring agent in the coloring element 725 is fully diffused through the colorable element 716. Consequently, the portions of the colorable element 716 which are visible through the transparent areas 708 are colored and appear similar to the bars of the barcode in the first visible state 704 and can be read together therewith and with the transparent areas 706, 707 and 709 as a single barcode as in the fifth visible state 713. It is appreciated that normally at all times following actuation, a readable barcode is present.

Reference is now made to FIGS. 8A-9G, which, respectively, are simplified illustrations of the structure and operation of additional examples of quality indicators constructed and operative in accordance with another preferred embodiment of the present invention for indicating a combination of temperature history and elapsed time.

Reference is now made to FIGS. 8A-8F, winch together are a simplified illustration of the construction and operation of one embodiment of the quality indicator of the present invention for indicating time in temperature history.

Figure 8A:
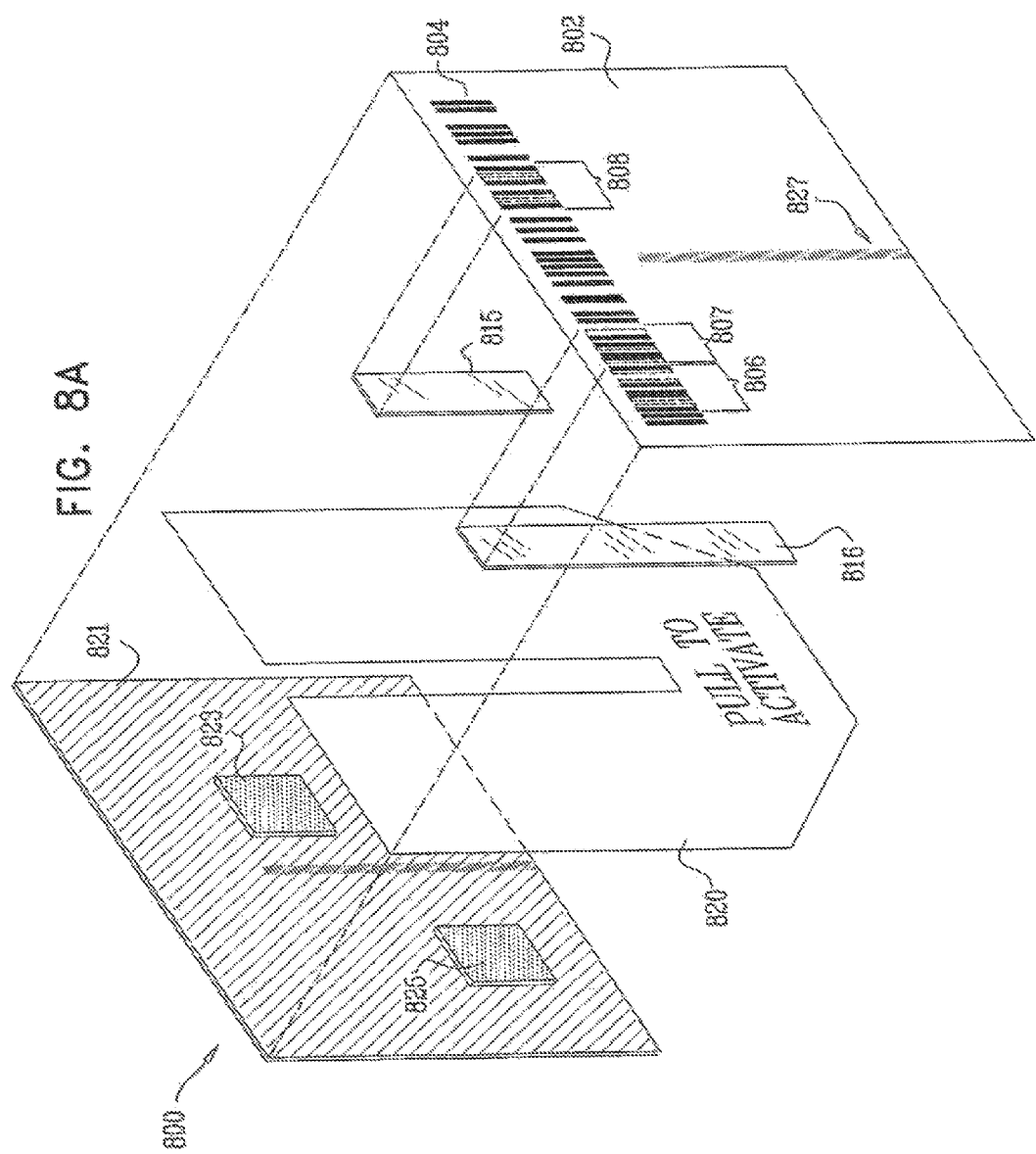

As seen in FIG. 8A, the quality indicator, here designated by reference numeral 800, preferably includes a barcode defining layer 802, which is preferably printed on a transparent substrate. The printing on the transparent substrate preferably defines a background area, a barcode in a first visible state 804, and a plurality of transparent areas 806, 807 and 808 associated with the barcode. In accordance with a preferred embodiment of the present invention, which is described in detail hereinbelow with reference to FIG. 10, the barcode defining layer 802 is printed on a multilayer transparent substrate. In this preferred embodiment, one of the layers is printed with black ink in all areas other than the transparent areas, and is overprinted with white ink In all areas other than the transparent areas and the bars of the barcode in the first visible state, such that the white ink layer faces forward in the sense of FIG. 8A. The transparent areas are preferably printed with light blue ink, preferably Pantone No. 645, which has a visual appearance similar to that of the black ink overprinted with white ink.

Alternatively, the background area and the barcode are printed in other colors as to define high contrast therebetween. The barcode in the first visible state 804 is machine readable in this embodiment and is typically readable by a barcode reader as 7431348787736.

If the transparent areas 806 are colored and read together with the barcode in the first visible state 804, there is provided a barcode in a second visible state 810 typically readable by a barcode reader as 7811348787736. If both transparent areas 806 and 807 are colored and read together with the barcode in the first visible state 804, there is provided a barcode in a third visible state 811 typically readable by a barcode reader as 7 817548787736. If the transparent areas 806, 807 and 808 are colored and read together with the barcode in the first visible state 804, there is provided a barcode in a fourth visible state 812 typically readable by a barcode reader as 78175782236. There is also a theoretical possibility that the transparent areas 807 or 808 could be colored and the transparent areas 806 could not be colored, but it is not practical in the present embodiment. It is also possible that a combination of transparent areas which are not colored together in the present embodiment will be colored.

Disposed behind the transparent areas 808 extending perpendicular to the barcode and preferably adhered to the barcode defining layer 802 is a colorable element 815, such as Whatman No. 3 filter paper, commercially available from Whatman [CAT#: 1003917], which until colored is normally white. Disposed behind the transparent areas 807 extending perpendicular to the barcode and preferably adhered to the barcode defining layer 802 is a colorable element 816, such as Whatman No. 3 filter paper, commercially available from Whatman [CAT#:1003917], which until colored is also normally white.

Disposed behind the barcode defining layer 802 and behind the colorable elements 815 and 816 is a pull strip 820. The pull strip 820 is preferably white and prevents the passage therethrough of coloring agents employed in this embodiment of the invention. Alternatively, the pull strip 820 is transparent. Preferably, the pull strip 820 is formed of polyester, for example Melinex®401, commercially available from DuPont of Wilmington, Del. The pull strip 820 is preferably 75 micrometers thick and is preferably bifurcated as illustrated.

Disposed behind the pull strip 820 is a back layer 821 which is preferably black, and to which is preferably adhered, rearwardly of the colorable element 815 but not rearwardly of the barcode, a temperature responsive coloring element 823. Also preferably adhered to the back layer 821, rearwardly of the colorable element 816 but not rearwardly of the barcode, is another temperature responsive coloring element 825.

The coloring element 823 may be, for example, a pad, for example, K-R; 210/34/28, commercially available from Noam-Urim of kibbutz Urim, Israel, impregnated with a coloring agent, such as Sudan Black, a black color dye [CAS: 4197-25-5], dissolved at a ratio of 1 gram par 1 kg in Coconut oil [CAS: 8001-33-8]. The coloring element 825 may be for example a pad, for example. K-R; 210/34/28, commercially available, from Noam-Urim of Kibbutz Urim, Israel, impregnated with a coloring agent, such as Sudan Black, a black color dye [CAS: 4197-25-5], dissolved at a ratio of 1 gram per 1 kg in a solution of 25% Coconut oil [CAS: 8001-31-8] and 75% Oleic acid [CAS:112-80-1]. The colorable element 815 and the coloring element 823 are preferably separated from the colorable element 816 and the coloring element 825 by a partition 827 which does not allow the coloring agent from the coloring element 823 to color the colorable element 816 or the coloring agent from the coloring element 825 to color the colorable element 815. The pull strip 820 is bifurcated in order to accommodate the partition 827.

It is appreciated that the length of the colorable element 816 that leads to the transparent areas 807 may be greater than the length of the colorable element 815 that leads to the transparent areas 808, and correspondingly the time taken for the coloring agent in the coloring element 825 to reach the transparent areas 807 may be longer than the time required for the coloring agent in the coloring element 823 to reach the transparent areas 808.

Until such time as the pull strip 820 is removed, the quality indicator 800 is nonresponsive to temperature changes and remains in the first visible state 804.

Figure 8B:
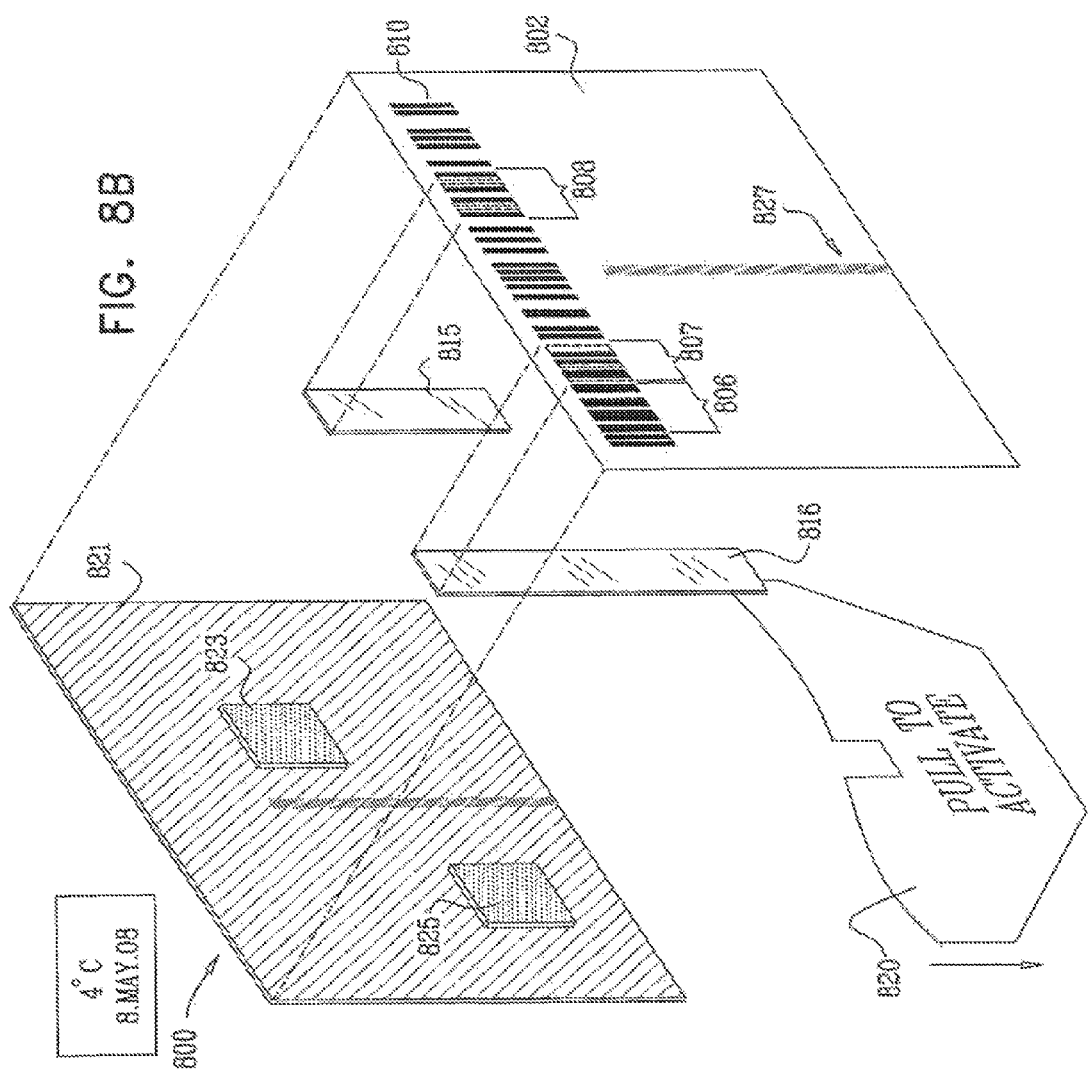

Turning to FIG. 8B, once the pull strip 820 is removed, the quality indicator 800 becomes responsive to temperature changes. As long as the temperature at the quality indicator does not reach a predetermined temperature, for example 8 degrees Celsius, for at least a predetermined cumulative amount of time, typically five hours, the portions of the black background layer 821 which are visible through the transparent areas 806 appear similar to the bars of the barcode in the first visible state 804 and can be read together therewith as a single barcode in the second visible state 810.

It is appreciated that in accordance with an alternative embodiment of the present invention, the pull strip 820 may be transparent and the barcode may remain in the first visible state 804 after the pull strip is removed.

Turning to FIG. 8C, when the poll strip 820 has been removed and when the temperature at the quality indicator reaches 8 degrees Celsius, the coloring agent in the coloring element 825 begins to melt and be released from the coloring element 825 and begins to diffuse through the colorable element 816. It is appreciated that if the temperature thereafter drops below 8 degrees Celsius the coloring agent continues to diffuse through the colorable element 816. If, after the temperature reaches 8 degrees Celsius, the temperature drops below 5 degrees Celsius, the coloring agent becomes solid, and diffusion thereof through the colorable element 816 is suspended until the temperature again reaches 8 degrees Celsius.

It is appreciated that the elapsed time from the start of diffusion of the coloring agent from the coloring element 825 along the colorable element 816 until portions of the colorable element 816 which are visible through the transparent areas 807 start to become colored is defined for example by the length of the colorable element 816 between the area in front of the coloring element 825 and the area underlying the transparent areas 807. Additionally, this elapsed time is a function of the material from which the colorable element 816 is made.

It is also appreciated that the elapsed time from the start of diffusion of the coloring agent from the coloring element 823 along the colorable element 815 until portions of the colorable element 815 which are visible through the transparent areas 808 start to become colored is defined for example by the length of the colorable element 815 between the area in front of the coloring, element 823 and the area underlying, the transparent, areas 808. Additionally, this elapsed time is a function of the material from which the colorable element 815 is made.

Figure 8D:
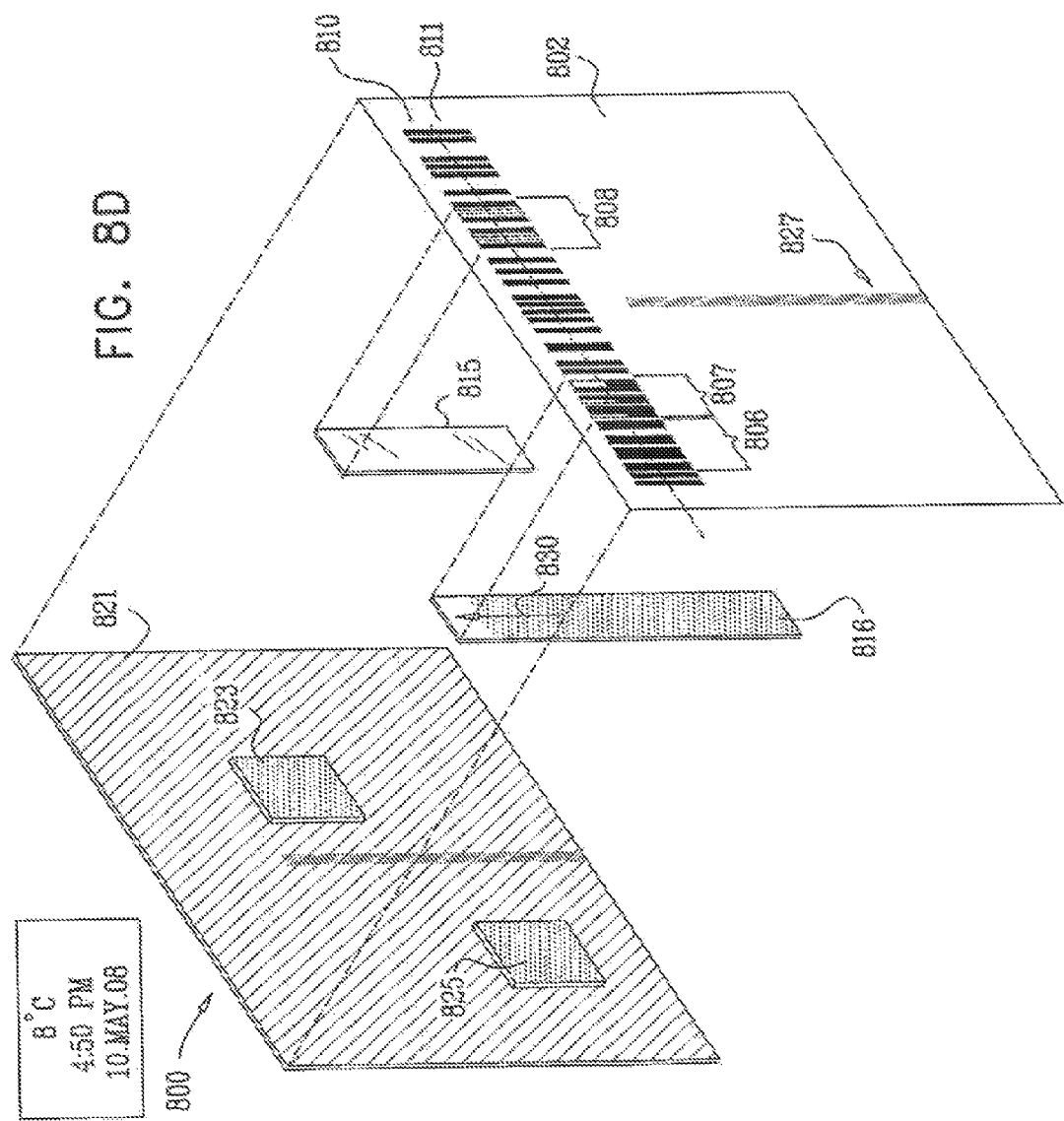

As seen in FIG. 8D, when the temperature is at leant 8 degrees Celsius for at least a predetermined cumulative amount of time, such as 8 degrees Celsius for four hours and fifty minutes, the coloring agent diffuses through the colorable element 816, such that the portions of the colorable element 816 which are visible through the transparent areas 807 start to become colored and appear similar to the bars of the barcode in the first visible state 804. It is appreciated that since the direction of diffusion of the coloring agent through the colorable element 816 underlying the barcode is perpendicular to the barcode, as indicated by reference numeral 830, portions of the barcode in the transparent areas 807 can be read together with the barcode in the first visible state 804 and with the transparent areas 806 as a single barcode even before the colorable element 816 is fully colored by the coloring agent.

The portions of the barcode in the transparent areas 807 which are colored and appear similar to the bars of the barcode in the first visible state 804 can be read together therewith and with areas 806 as a single barcode in the third visible state 811. The portions of the barcode in the transparent areas 807 which are not colored and do not appear similar to the bars of the barcode in the first visible state 804 can be read together with the transparent areas 806 as a single barcode in the second visible state 810. Thus it is appreciated that normally at all times following actuation, a readable barcode is present.

It is appreciated that the appearance of the quality indicator 800 during the transition illustrated in FIG. 8D may be somewhat problematic in that two alternative readings are possible. It is nevertheless believed that this situation is preferable to a situation wherein the quality indicator 800 is not at all readable during the transition, inter alia since the quality indicator may include portions that are not in transition and further since it is possible to program the indication interpreter to prefer an exceedance indication over a subsequently read non-exceedance indication. It is desirable that the time duration of the transition be as short as possible.

Figure 8E:
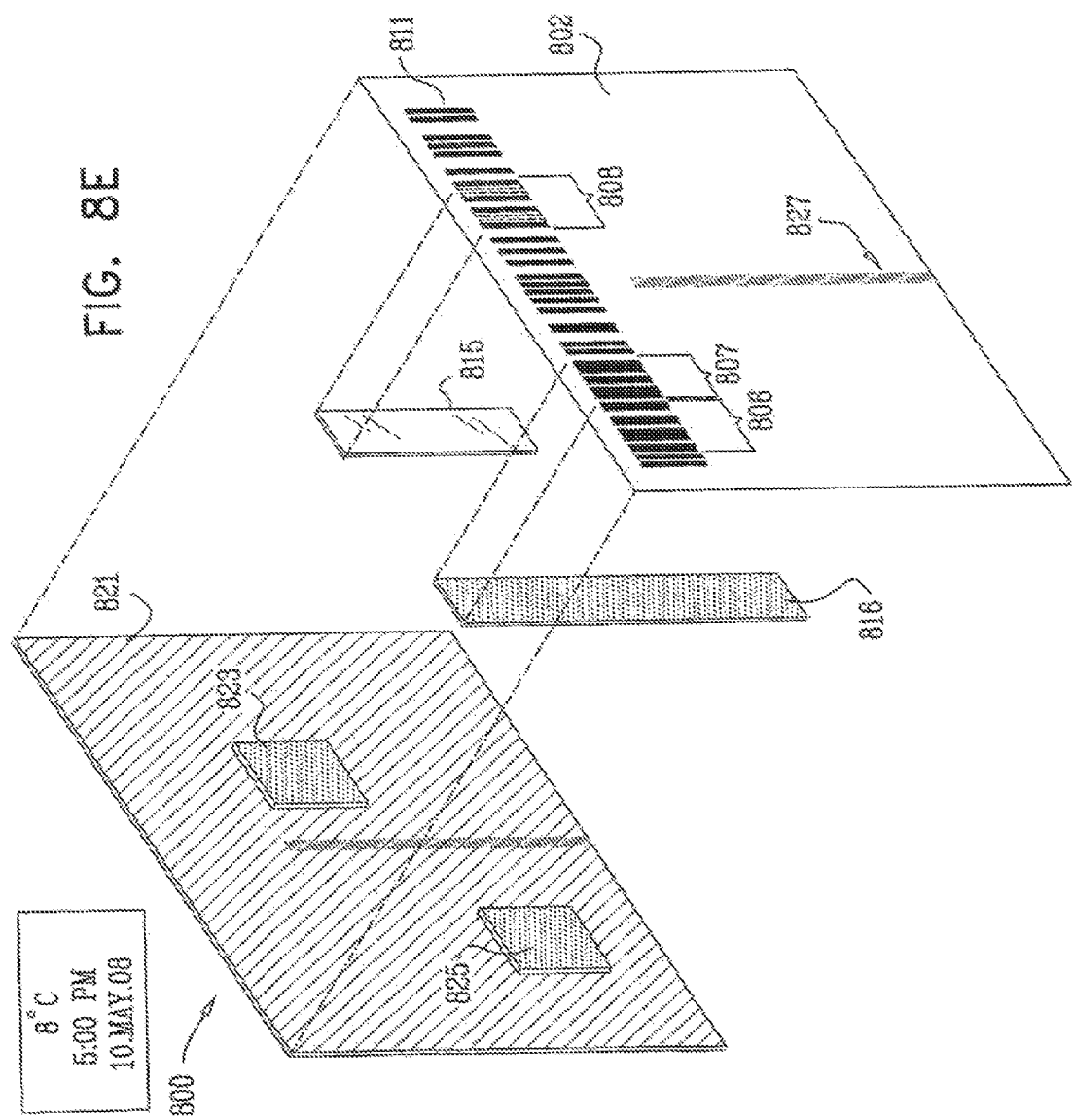

Turning now to FIG. 8E, it is seen that following the elapse of an additional amount of time at a temperature of at least 8 degrees Celsius, typically 10 minutes, the coloring agent is fully diffused through colorable element 816. Consequently, all portions of the colorable element 816 which are visible through the transparent areas 807 are colored and appear similar to the bars of the barcode in the first visible state 804, and can be read together therewith and with areas 806 as a single barcode in the third visible state 811.

Turning now to FIG. 8F, it is seen that when the temperature is at least 21 degrees Celsius for at least a predetermined cumulative amount of time such as 21 degrees Celsius for two hours, the coloring agent in the coloring element 823 is fully diffused through the colorable element 815. Consequently, the portions of the colorable element 815 which are visible through the transparent areas 808 are colored and appear similar to the bars of the barcode in the first visible state 804 and can be read together therewith and with the transparent areas 806 and 807 as a single barcode as in the fourth visible state 812. It is appreciated that normally at all times following actuation, a readable barcode is present.

It is appreciated that if, prior to the elapse of the predetermined amount of time, the temperature drops below 21 degrees Celsius, the coloring agent continues to diffuse through the colorable element 815. If, after the temperature reaches 21 degrees Celsius, the temperature drops below 17 degrees Celsius, the coloring agent becomes solid and diffusion thereof through the colorable element 815 is suspended until the temperature again reach 21 Celsius.

Reference is now made to FIGS. 9A-9G, which together are a simplified illustration of the construction and operation of one embodiment of the quality indicator of the present invention for indicating time in temperature history with delayed activation.

As seen in FIG. 9A, the quality indicator, here designated by reference numeral 900, preferably includes a barcode layer 902, which is preferably printed on a transparent substrate. The printing on the transparent substrate preferably defines a background area, a barcode in a first visible state 904, and a plurality of transparent areas 906, 907 and 908 associated with the barcode. In accordance with a preferred embodiment of the present invention, which is described in detail hereinbelow with reference to FIG. 10, the barcode defining layer 902 is printed on a multilayer transparent substrate. In this preferred embodiment, one of the layers is printed with black ink in all areas other than the transparent areas, and is overprinted with white ink in all areas other than the transparent areas and the bars of the barcode in the first visible state, such that the white ink layer faces forward in the sense of FIG. 9A. The transparent areas are preferably printed with light blue ink, preferably Pantone No. 645, which has a visual appearance similar to that of the black ink overprinted with white ink.

Alternatively, the background area and the barcode are printed in other colors as to define high contrast therebetween. The barcode in the first visible state 904 is machine readable in this embodiment and is typically readable by a barcode reader as 7431348787736.

If the transparent areas 906 are colored and read together with the barcode in the first visible state 904, there is provided a barcode in a second visible state 910 typically readable by a barcode reader as 78<u>11</u>348787736. If both transparent areas 910 and 907 are colored and read together with the barcode in the first visible state 904, there is provided a barcode in a third visible state 911 typically readable by a barcode reader as 7 8<u>1175</u>48787736. If the transparent areas 906, 907 and 908 are colored and read together with the barcode in the first visible state 904, there is provided a barcode in a fourth visible state 912 typically readable by a barcode reader as 78<u>175</u>78<u>22</u>36. There is also a theoretical possibility that the transparent areas 907 or 908 could be colored and the transparent areas 906 could not be colored, but it is not practical in the present embodiment. It is also possible that a combination of transparent areas which are not colored together in the present embodiment will be colored.

Disposed behind the transparent areas 908 extending perpendicular to the barcode and preferably adhered to the barcode defining layer 902 is a colorable element 915, such as Whatman No. 3 filter paper commercially available from Whatman [CAT#: 1003917], which until colored is normally white. Disposed behind the transparent areas 907 extending perpendicular to the barcode and preferably adhered to the barcode defining layer 902 is a colorable element 916, such as Whatman No. 3 filter paper commercially available from Whatman [CAT#: 1003917], which until colored is also normally white.

Disposed behind the barcode defining layer 902 and behind the colorable element 915 and preferably adhered thereto is a dissolvable activation delay layer 917, formed, for example from Ethyl Cellulose [CAS#: 9004-57-3]. Disposed behind the barcode defining layer 902 and behind the colorable element 916 and preferably adhered thereto is a dissolvable activation delay layer 918, formed, for example from Ethyl Cellulose [CAS#: 9004-57-3]. The dissolvable activation delay layers 917 and 918 are dissolvable by suitable solvents, as described hereinbelow, and until dissolved prevent the passage therethrough of coloring agents employed in this embodiment of the present invention.

It is appreciated that one or both dissolvable activation, delay layers 917 and 918 may provide selectable and possibly different delay durations over any suitable range of durations which may extend from effectively zero to any suitable maximum. Such selectability may be effected, for example, by varying thickness, material, coatings and/or structure.

Disposed behind the dissolvable activation delay layers 917 and 918 is a pull strip 920. The pull strip 920 is preferably white and prevents the passage therethrough of coloring agents and solvents employed in this embodiment of the invention. Alternatively, the pull strip 920 is transparent. Preferably, the pull strip 920 is formed of polyester, for example Melinex®401, commercially available from DuPont of Wilmington, Del. The pull strip 920 is preferably 75 micrometers thick and is preferably bifurcated as illustrated.

Disposed behind the pull strip 920 is a back layer 921 which is preferably black, and to which is preferably adhered, rearwardly of the colorable element 915 and of the activation delay layer 917 but not rearwardly of the barcode, a temperature responsive coloring element 923. Also preferably adhered to the back layer 921, rearwardly of the colorable element 916 and of the activation delay layer 918 but not rearwardly of the barcode, is another temperature responsive coloring element 925.

The coloring element 923 may be, for example, a pad, for example, K-R: 210/34/28, commercially available from Noam-Urim of Kibbutz Urim Israel, impregnated with a coloring agent, such as Sudan Black, a black color dye [CAS: 4197-25-5], dissolved at a ratio of 1 gram per 1 kg in Coconut oil [CAS: 8001-31-8]. The coloring element 925 may be for example a pad, for example, K-R; 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in a solution of 25% Coconut oil [CAS: 8001-31-8] and 75% Oleic acid [CAS: 112-80-1].

The colorable element 915 and the coloring element 923 are preferably separated from the colorable element 916 and the coloring element 925 by a partition 927 which does not allow coloring agent from the coloring element 923 to color the colorable element 916 or coloring agent from the coloring element 925 to color the colorable element 915. The pull strip 920 is bifurcated in order to accommodate the partition 927.

Adjacent the coloring element 923 or combined therewith is a solvent 926. Adjacent the coloring element 925 or combined therewith is a solvent 928. The solvents 926 and 928 may be for example Methyl laurate [CAS#: 111-82-0], which, as noted above, are operative to dissolve the dissolvable activation delay layers 917 and 918, preferably after a predetermined period of time, which is preferably measured in hours, such as eight hours.

It is appreciated that the length of the colorable element 916 that leads to the transparent areas 907 may be greater than the length of the colorable element 915 that leads to the transparent areas 908, and correspondingly the time taken for the coloring agent in the coloring element 925 to reach the transparent areas 907 may be longer than the time required for the coloring agent in the coloring element 923 to reach the transparent areas 908.

Until such time as the pull strip 920 is removed, the quality indicator 900 is nonresponsive to temperature changes and remains in the first visible state 904.

Turning now to FIG. 9B, once the pull strip 920 is removed, the solvents 926 and 928 begin to dissolve the respective dissolvable activation delay layers 917 and 918. Prior to dissolvable activation delay layers 917 and 918 becoming permeable to live coloring agents in the respective temperature responsive coloring elements 923 and 925, the quality indicator 900 does not provide a readable indication responsive to temperature changes and the portions of the black background layer 921 which are visible through the transparent areas 900 appear similar to the bars of the barcode in the first visible stale 904 and can be read together therewith as a single barcode in the second visible state 910. It is appreciated that the time needed to achieve dissolution of dissolvable activation delay layers 917 and 918 may be determined for example by the thickness thereof.

It is appreciated that in accordance with an alternative embodiment of the present invention, the pull strip 920 may be transparent and the barcode may remain in the first visible state 904 after the pull strip is removed.

Turning now to FIG. 9C, once the dissolvable activation delay layers 917 and 918 become permeable to the coloring agents in the respective temperature responsive coloring elements 923 and 925, typically after 8 hours, the quality indicator 900 becomes responsive to temperature changes. As long as the temperature at the quality indicator does not reach a predetermined temperature for example 8 degrees Celsius, for at least a predetermined cumulative amount of time for example for five hours, the quality indicator remains in the second visible state 910.

Turning to FIG. 9D, once the dissolvable activation delay layers 917 and 918 become permeable to the coloring agents in the respective temperature responsive coloring elements 923 and 925, and when the temperature at the quality indicator reaches 8 degrees Celsius, the coloring agent in the coloring element 925 begins to melt and be released from coloring element 925 and begins to diffuse through the colorable element 916. It is appreciated that if the temperature thereafter drops below 8 degrees Celsius the coloring agent continues to diffuse through the colorable element 916. If, after the temperature reaches 8 degrees Celsius, the temperature drops below 5 degrees Celsius, the coloring agent becomes solid and diffusion thereof through the colorable element 916 is suspended until the temperature again reaches 8 degrees Celsius.

It Is appreciated that the elapsed time from the start of diffusion of the coloring agent from the coloring element 925 along the colorable element 916 until portions of the colorable element 916 which are visible through the transparent areas 907 start to become colored is defined for example by the length of the colorable element 916 between the area in front of coloring element 925 and the area underlying the transparent areas 907. Additionally, this elapsed time is a function of the material from which the colorable element 916 is made.

It is also appreciated that the elapsed time from the start of diffusion of the coloring agent from the coloring element 923 along the colorable element 915 until portions of the colorable element 915 which are visible through the transparent areas 908 start to become colored is defined for example by the length of the colorable element 915 between the area in front of coloring element 923 and the area underlying the transparent areas 908. Additionally, this elapsed time is a function, of the material from which the colorable element 915 is made.

Figure 9E:
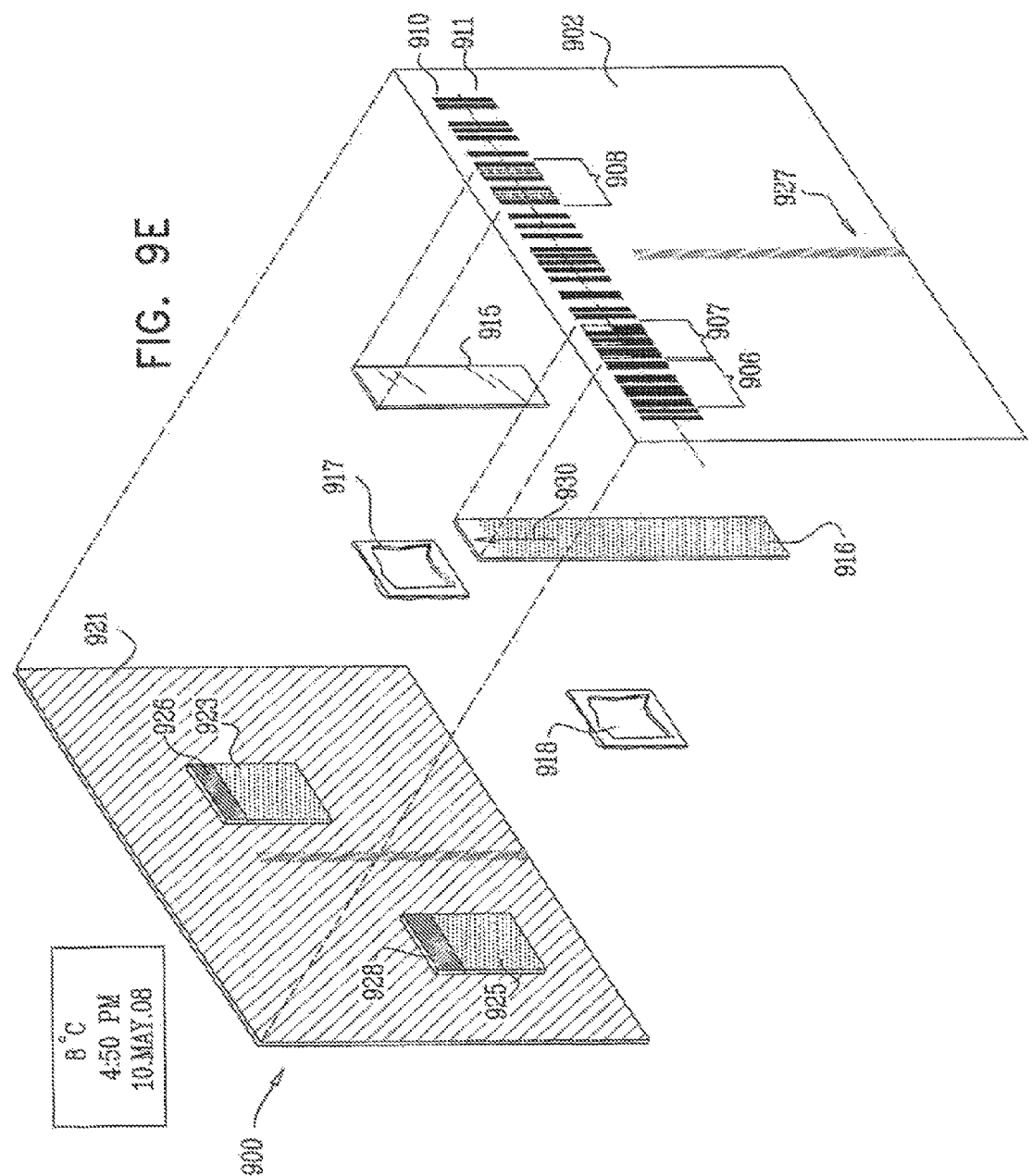

As seen in FIG. 9E, when the temperature is at least 8 degrees Celsius for at least a predetermined cumulative amount of time, such as 8 degrees Celsius for four hours and fifty minutes, the coloring agent diffuses through the colorable dement 916, such that the portions of the colorable element 916 winch are visible through the transparent areas 907 start to become colored and. appear similar to the bars of the barcode in the Inst visible state 904. It is appreciated that since the direction of diffusion of the coloring agent through the colorable element 916 underlying the barcode is perpendicular to the barcode, as indicated by reference numeral 930, portions of the barcode in the transparent areas 907 can be read together with the barcode in the first visible state 904 and with the transparent areas 906 as a single barcode even before the colorable element 916 is fully colored by the coloring agent.

The portions of the barcode in the transparent areas 907 which are colored and appear similar to the bars of the barcode in the first visible state 904 can be read together therewith and with the transparent areas 906 as a single barcode in the third visible state 911. The portions of the barcode in the transparent areas 907 which are not colored and do not appear similar to the bars of the barcode in the first visible state 904 can be read together with the transparent areas 906 as a single barcode in the second visible state 910. Thus it is appreciated that normally at all times following actuation, a readable barcode is present.

It is appreciated that the appearance of the quality indicator 900 during the transition illustrate in FIG. 9E may be somewhat problematic in that two alternative readings are possible. It is nevertheless believed that this situation is preferable to a situation wherein the quality indicator 900 is not at all readable during the transition, inter alia since the quality indicator may include portions that are not in transition and further since it is possible to program the indication interpreter to prefer an exceedance indication over a subsequently read non-exceedance indication. It is desirable that the time duration of the transition be as short as possible.

Turning now to FIG. 9F, it is seen that following the elapse of an additional amount of time at a temperature of at least 8 degrees Celsius, typically 10 minutes, the coloring agent, is fully diffused through the colorable element 916. Consequently, all portions of the colorable element 916 which are visible through the transparent areas 907 are colored and appear similar to the bars of the barcode in the first visible state 904, and can be read together therewith and with the transparent areas 906 as a single barcode in the third visible state 911.

Turning now to FIG. 9G, it is seen that when the temperature is at least 21 degrees Celsius for at least a predetermined cumulative amount of time, such as 21 degrees Celsius for two hours, the coloring agent in the coloring element 923 is fully diffused through the colorable element 915. Consequently, the portions of the colorable element 915 which are visible through the transparent areas 908 are colored and appear similar to the fears of the barcode in the first visible state 904 and can be read together therewith and with the transparent areas 906 and 907 as a single barcode as in the fourth visible state 912. It is appreciated that normally at all times following actuation, a readable barcode is present.

It is appreciated that if, prior to the elapse of the predetermined amount of time, the temperature drops below 21 degrees Celsius, the coloring agent continues to diffuse through the colorable element 915. If, after the temperature reaches 21 degrees Celsius, the temperature drops below 17 degrees Celsius, the coloring agent becomes solid and diffusion thereof through the colorable element 915 is suspended until the temperature again reaches 21 degrees Celsius.

It is appreciated that the present invention also encompasses indicators wherein the first visible state has more digits than the second visible state and similarly where each subsequent visible state has fewer digits than the preceding visible state. This may readily be achieved in accordance with the present invention for example by initially locating a black background or black colorable elements behind transparent areas, similar to the transparent areas described hereinabove with reference to FIGS. 4A-9G, and then, as the result of a change in an environmental parameter, changing that black background, or the black colorable elements to white. Alternatively, this may be achieved by employing white on black background barcodes instead of black on white background barcodes as shown in the examples above.

Figure 10:
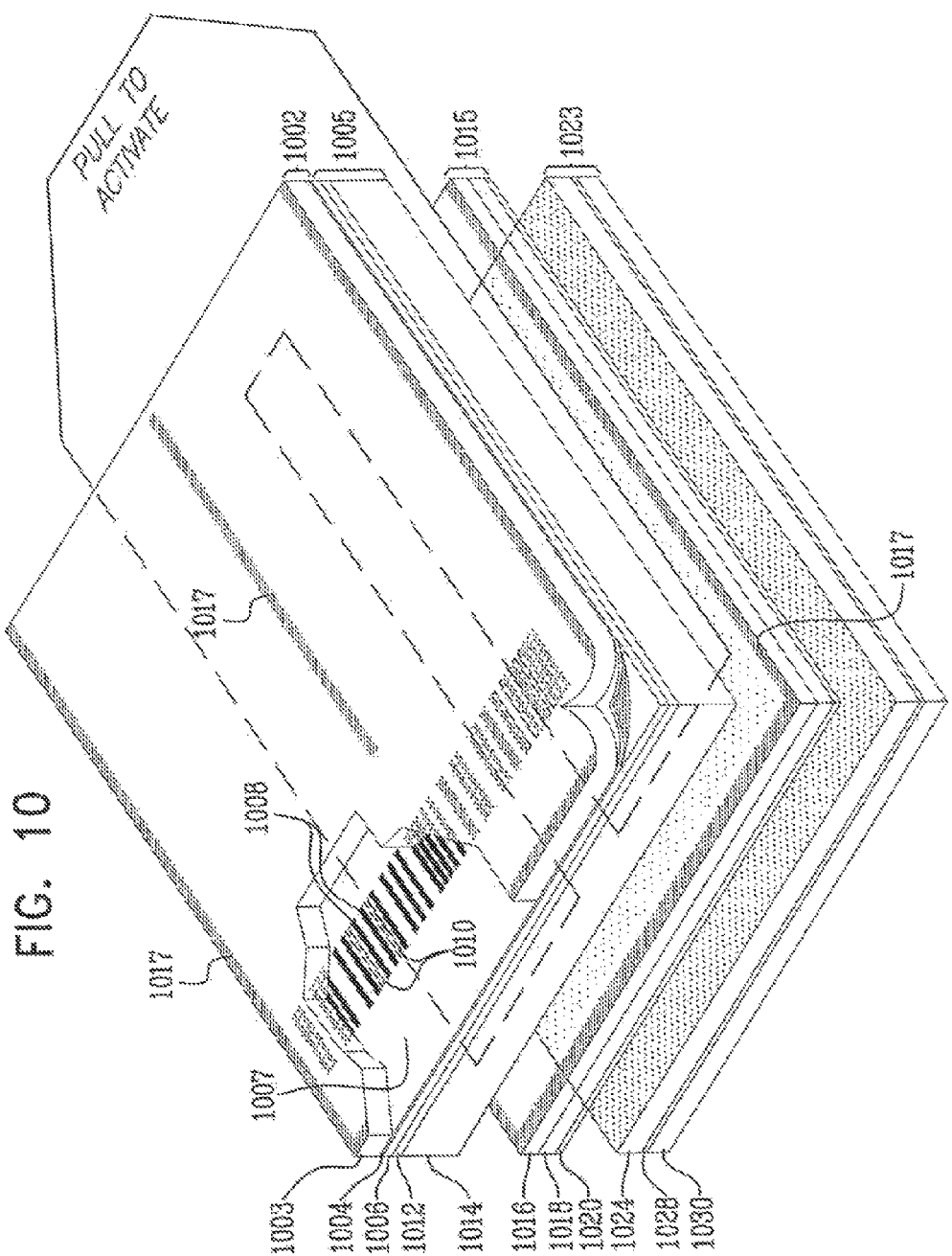
FIG. 10 is a more detailed simplified illustration of the structure of an example of the quality indicator of FIGS. 8A-9G.

Reference is now made to FIG. 10, which is a more detailed simplified illustration of the structure of an example of the quality indicator of FIGS. 8A-9G.

As seen in FIG. 10, the barcode defining layer in FIG. 8A, there indicated by reference numeral 802, and the barcode defining layer in FIG. 9A, there indicated by reference numeral 902, includes four layers Of plastic, divided into two laminates. The outermost laminate in the sense of FIG. 8A is a transparent adhesive laminate 1002, preferably FASSON, PP NG TOP TRANSPARENT, commercially available from FASSON of Mentor, Ohio, a division, of the Avery Dennison Corporation. It is appreciated that this transparent adhesive laminate is manufactured with an additional layer of silicon, which is removed prior to use in order to expose an underlying layer of adhesive material. After removal of the silicon layer, laminate 1002 includes two layers and is 0.066 millimeters thick. The outermost layer in the sense of FIG. 8A is a layer 1003, preferably formed of polypropylene, and disposed behind layer 1003 is an adhesive layer 1004.

Disposed behind laminate 1002 in the sense of FIG. 8A is a 0.2 millimeter thick laminate 1005, preferably a layered laminate, such as layered laminate CAT#: 03166599001, commercially available from Migvan Flexible packaging LTD of Kibbutz Mishmar David, Israel.

Laminate 1005 preferably includes three layers. The outermost layer in the sense of FIG. 8A is a 24 micrometer brick lever 1006, preferably formed of polyester. As noted above with reference to FIGS. 8A and 9A, layer 1006 la preferably printed in such a way as to define a background area 1007, a barcode in the first visible state 1008 and transparent areas 1010. The background area 1007 and the barcode area 1008 are printed with black ink. The background area 1007 primed with black ink is overprinted with white ink, such that the white ink layer faces forward in the sense of FIG. 8A. The transparent areas 1010 are printed with light blue ink, Pantone No. 645, which has a visual appearance similar to that of the black ink overprinted with a white ink. After printing of layer 1006, laminate 1005 is attached to laminate 1002 by the adhesive layer 1004. Disposed behind layer 1006 of laminate 1005 is an additional 24 micrometer thick layer 1012, preferably formed of polyester. Disposed behind layer 1012 is a layer 1014, preferably formed of polyethylene.

It is also seen from FIG. 10 that the back layer indicated in FIG. 8A by reference numeral 821, and in FIG. 9A by reference numeral 921, includes four layers of plastic divided into two laminates.

The innermost laminate in the sense of FIG. 8A is laminate 1015, preferably a transparent adhesive laminate, commercially available front Migvan Flexible packaging LTD of Kibbutz Mishmar David Israel [CAT#: 02166599002]. It is appreciated that this transparent adhesive laminate is manufactured with an additional layer of silicon, which is removed prior to use in order to expose a layer of adhesive material. After removal of the silicon layer laminate 1015 includes two layers of plastic and is 0.09 millimeters thick. The innermost layer in the sense of FIG. 8A is layer 1016, preferably formed of polyethylene, which is used for welding of laminate 1015 to layer 1014 of laminate 1005 along the edges and across the quality indicator, as indicated by reference numeral 1017. The welding across the quality indicator is used to create the partition indicated by reference numeral 827 in FIG. 8A, and by reference numeral 927 in FIG. 9A.

The pull strip indicated by reference numeral 820 in FIG. 8A and by reference numeral 920 in FIG. 9A, the colorable elements indicated by reference numerals 815 and 816 in FIG. 8A, and by reference numerals 915 and 916 in FIG. 9A, the coloring elements indicated by reference numerals 823 and 825 in FIG. 8A, and by reference numerals 923 and 925 In FIG. 9A, the dissolvable activation delay layers indicated by reference numerals 917 and 918 in FIG. 9A, and the solvents indicated by reference numerals 926 and 928 in FIG. 9A are all disposed between layer 1014 and layer 1016.

Disposed behind layer 1016 in the sense of FIG. 8A and also part of laminate 1015 is layer 1018, preferably formed of polypropylene, and disposed behind layer 1018 is an adhesive layer 1020.

Disposed behind laminate 1015 in the sense of FIG. 8A is a transparent adhesive laminate 1023 0.126 millimeters thick, preferably FASSON, PP NO TOP TRANSPARENT, commercially available from FASSON of Mentor, Ohio, a division of the Avery Dennison Corporation. Laminate 1023 includes two layers of plastic. The innermost layer of laminate 1023 in the sense of FIG. 8A is layer 1024, preferably formed of polypropylene. Layer 1024 is preferably printed in black. After printing of layer 1024, laminate 1023 is attached to laminate 1015 through the adhesive layer 1020 of laminate 1015. Disposed behind layer 1024 in the sense of FIG. 8A and also part of laminate 1023 is an adhesive layer 1028. Disposed behind layer 1028 is layer 1030, preferably formed of silicon, which prevents adhesive layer 1028 from adhering to undesired surfaces. Layer 1030 is removed when the quality indicator is used in order to attach the quality indicator to the desired product.

Reference is now made to FIG. 11, which illustrates the structure and operation of a quality management system constructed and operative in accordance with a preferred embodiment of the present invention in the context of a supermarket. In the embodiment of FIG. 11, packaged products 1100 each bear a barcoded quality indicator 1101 of the general type described hereinabove and illustrated in FIGS. 1A-9G and including one or more of the operational and structural features described hereinabove. As seen in FIG. 11, cartons 1102 including packages 1100 bearing quality indicators 1101, bear barcoded quality indicators 1103 of the general type described hereinabove and illustrated in FIGS. 1A-9G and including one or more of the operational and structural features described hereinabove. Preferably, the barcoded quality indicators 1103 are different from the barcoded quality indicators 1101.

As described hereinabove with reference to FIGS. 1A and 2A, it is a particular feature of the present invention that the time and temperature thresholds of the quality indicators 1101 and 1103, placed on the individual packages and the cartons containing them respectively, are preferably related in order to provide highly effective cold chain management.

In the illustrated embodiment, the quality Indicators 1101 and 1103 preferably include an EAN (European Article Number) barcode. When read by a conventional barcode reader 1104 or by a conventional checkout scanner 1106, quality indicators 1101 and 1103 provide barcode reader readable indications of exceedance of one or more thresholds of product quality affecting parameters, such as temperature and/or elapsed time and/or a combination of elapsed time and temperature to an indication interpreter which preferably forms part of or is otherwise connected to a quality indication computer 1108. The quality indication computer 1108 may be remote from the indicator reader.

As indicated above with reference to FIGS. 1A-9G, the quality indicator 1101 preferably includes a first visible state, typically readable by a barcode reader as 7431348787736, a second visible state, typically readable by a barcode reader as 7811348787736, and a third visible state, typically readable by a barcode reader as 7811348782236.

As indicated above with reference to FIGS. 1A-2F, the quality indicator 1103 preferably includes a first visible state, typically readable by a barcode reader as 7431348787750, a second visible state, typically readable by a barcode reader as 7437548787750, and a third visible state, typically readable by a barcode reader as 7437548782250.

The quality indicators 1101 and 1103 may differ in that they have different effective temperature and/or time thresholds and may also indicate exceedance of different quality affecting parameters.

It is further seen in FIG. 11 that in addition to receiving the output indications provided by the indicator reader the quality indication computer 1108 also receives product-related parameters such as product type, manufacturing date and package type, as shown in Table II. Additionally or alternatively, the quality indication computer 1108 may also receive other parameters, for example information relating to the quality indicator, such as the range of parameters sensed by the quality indicator, when the quality indicator was actuated, and whether the quality indicator includes a delayed activation feature.

In the illustrated embodiment, product identification information is entered by scanning additional indicators 1110 and 1112, including, for example, a UPC code, which are attached to packages 1100 and to cartons 1102, respectively. Alternatively, the product-related parameters and the other parameters, such as those relating to the quality indicator may be provided by the quality indicators 1101 and 1103 themselves. As a further alternative, these parameters may be provided by sensors, a priori information otherwise available to the indication interpreter or by manual entry.

TABLE II

| PRODUCT CODE | PRODUCT DESCRIPTION | MANUFACTURING DATE | PACKAGE TYPE |
|---|---|---|---|
| 6789 | FRESH RIB STEAK | 8 MAY 2008 | INDIVIDUAL |

As seen in the illustrated embodiment, the quality indication computer 1108 maintains a database which preferably includes at least an event description table, such as Table III, and a product status table, such as Table IV.

TABLE III

| EVENT BAR CODE | INDICATOR IDENTIFIER | EVENT DESCRIPTION |
|---|---|---|
| 7431348787736 | 1101 | INDICATOR WAS NOT ACTUATED |
| 7431348787750 | 1103 | INDICATOR WAS NOT ACTUATED |
| 7811348787736 | 1101 | INDICATOR WAS NOT EXPOSED TO ≥21 DEGREES CELSIUS FOR ≥ ONE HOUR |
| 7437548787750 | 1103 | INDICATOR WAS NOT EXPOSED TO ≥12 DEGREES CELSIUS FOR ≥ FIVE HOURS |
| 7811348782236 | 1101 | INDICATOR WAS EXPOSED TO ≥21 DEGREES CELSIUS FOR ≥ ONE HOUR |
| 7437548782250 | 1103 | INDICATOR WAS EXPOSED TO ≥12 DEGREES CELSIUS FOR ≥ FIVE HOURS |

Upon receipt of inputs identifying a product as shown in Table II and output indications provided by a quality indicator reader indicating an event described in Table III corresponding to the same product the quality indication computer 1108 is operative to provide product quality status outputs. In order to provide product quality status outputs the quality indication computer 1108 is operative to employ a product status table, such as Table IV, typically including product description data such as product description, package type and indicator identifier, an agent barcode and a product status as follows:

TABLE IV

| PRODUCT CODE | EVENT BAR CODE | PRODUCT DESCR. | PACKAGE | INDICATOR IDENTIFIER | PRODUCT STATUS |
|---|---|---|---|---|---|
| 6789 | 7811348787736 | FRESH RIB STEAK | INDIVIDUAL | 1101 | OK |
| 6789 | 7811348782236 | FRESH RIB STEAK | INDIVIDUAL | 1101 | BAD |
| 5689 | 7437548782250 | FRESH RIB STEAK | CARTON | 1103 | BAD |
| 4321 | 7811348782236 | ORANGES | INDIVIDUAL | 1101 | QUICK SALE |

As seen in the second and the third rows of Table IV, time and temperature thresholds of indicators 1101 and 1103, placed on the individual packages 1100 of a fresh rib steak and the cartons 1102 containing respectively, are preferably related and calibrated with respect to each other based, inter alia, on empirical data. This feature allows for the evaluation of quality of individually packaged products even when it is not possible to open the cartons and examine individual packages, such as for example during transport.

As further seen in Table IV, there may be a great variation in the effect of a given event depending on the type of product. Thus, for example, exposure to 21 degrees Celsius for one hour may cause fresh meat to be rendered unfit for sale but may only mildly affect the quality of oranges.

In accordance with an additional feature of the present invention, the barcode may be read by a consumer employing an imager-equipped telephone or other suitable mobile communicator 1115 which may be identical to mobile communicator 128 in FIG. 1C or 228 in FIG. 2C. The communicator 1115 may image the quality indicators 1101 or 1103 and communicate the image information to a suitably programmed quality indication computer 1117, which may be identical to computer 130 in FIG. 1C or 230 in FIG. 2C, and to the computer 1108, and which is capable of reading the barcode from the image information. The quality indication computer 1117 provides to the user, via SMS or any other suitable communication methodology, an immediate indication of a quality status, such as a GOOD QUALITY indication 1120. This quality status indicates that the product is safe for use. Alternatively, if the user employs a barcode reader-equipped communicator, the communicator can provide to the quality indication computer 1117 an output resulting from reading the barcode. Additionally or alternatively, the quality indication computer 1117 may provide coupons to the user corresponding to the state of the quality indicator.

Based on the scanned barcode and identification of the caller the quality indication computer 1117 provides product status information both to quality assurance inspectors and to consumers. Additionally or alternatively, the quality indication computer 1117 may send messages to the supermarket management regarding remedial steps to be taken, such as refrigeration maintenance instructions.

It will be appreciated by persons skilled in the art that the present invention is not limited by what has been particularly shown and described hereinabove.

Rather the scope of the present invention includes both combinations and sub-combinations of various features of the invention and modifications thereof which may occur to persons skilled in the art upon reading the foregoing description and which are not in the prior art.

The invention claimed is:

1. A barcoded quality indicator operative to provide a machine-readable indication of exceedance of at least one threshold by at least one product quality affecting parameter,
   said barcoded quality indicator being readable by a barcode indicator reader at all times, after first becoming readable, including times prior to, during and immediately following exceedance of said at least one threshold by said at least one product quality affecting parameter,
   said barcoded quality indicator providing a first machine-readable indication prior to said exceedance of said at least one threshold and a second machine-readable indication, different from said first machine-readable indication, following said exceedance of said at least one threshold,
   said barcoded quality indicator comprising:
      a barcode comprising black areas and transparent areas arranged along a barcode axis;
      at least one colorable element at least partially underlying said transparent areas; and
      at least one coloring agent adapted to color said at least one colorable element in response to exceedance of said at least one threshold, said at least one coloring agent passing along a pathway to said at least one colorable element in a time corresponding to said threshold, said pathway being configured such that said coloring agent progressively colors said colorable element in a direction generally perpendicular with respect to said barcode axis, thereby enabling said barcode to be readable while said colorable element is being progressively colored.

2. A barcoded quality indicator according to claim 1 and wherein said barcoded quality indicator comprises a linear barcode.

3. A barcoded quality indicator according to claim 1 and wherein said first and second machine-readable indications comprising at least mutually different alpha-numerical data encoded in said barcoded quality indicators.

4. A barcoded quality indicator according to claim 1 and wherein said barcoded quality indicator continues to provide said second machine-readable indication following said exceedance of said at least one threshold even when said at least one threshold is no longer exceeded.

5. A quality management system according to claim 1 and wherein during exceedance of said threshold said coloring agent colors part of said colorable element such that said first machine-readable indication is provided by portions of said transparent areas lying above areas of said colorable element not colored by said coloring agent read together with areas of said barcode not lying above said colorable element, and said second machine-readable indication is provided by portions of said transparent areas lying above areas of said colorable element colored by said coloring agent read together with areas of said barcode not lying above said colorable element.

6. A quality management system for products comprising:
- a first multiplicity of individual package specific barcoded quality indicators each operative to provide a first individual package machine-readable indication prior to exceedance of at least one threshold by at least one product quality affecting parameter of an individual package, and a second individual package machine-readable indication, different from said first individual package machine-readable indication, following said exceedance of said at least one threshold by said at least one product quality affecting parameter of said individual package, said first and second individual package machine-readable indications comprising at least mutually different alpha-numerical data encoded in said barcoded quality indicators;
- a second multiplicity of outer package specific barcoded quality indicators each operative to provide a first outer package machine-readable indication prior to exceedance of at least one threshold by at least one product quality affecting parameter of an outer package containing a plurality of said individual packages, and a second outer package machine-readable indication, different from said first outer package machine-readable indication, following said exceedance of said at least one threshold by at least one product quality affecting parameter of said outer package, said first and second outer package machine-readable indications comprising at least mutually different alpha-numerical data encoded in said barcoded quality indicators, the thresholds for which indication of exceedance is provided by said outer package specific indicators corresponding to an operative range different from the operative range to which the thresholds for which indication of exceedance is provided by said individual package specific indicators correspond;
- a barcode indicator reader operative to read said barcoded quality indicators and to provide output indications, said barcoded quality indicators being readable by said barcode indicator reader at all times, after first becoming readable, including times prior to, during and immediately following exceedance of said at least one threshold by said at least one product quality affecting parameter; and
- a product type responsive indication interpreter operative to receive said output indications and to provide human sensible, product quality status outputs.

7. A quality management system for products according to claim 6 and wherein indication of exceedance may be provided by said outer package specific indicators associated with outer packages even when indication of exceedance is not provided by said individual package specific indicators attached to the individual packages contained therein.

8. A quality management system for products according to claim 6 and wherein indication of exceedance is not provided by said individual package specific indicators associated with individual packages if an indication of exceedance was not provided by said outer package specific indicators associated with the outer packages containing them.

* * * * *